(12) United States Patent
Shiroishi et al.

(10) Patent No.: US 9,275,672 B2
(45) Date of Patent: Mar. 1, 2016

(54) MAGNETIC HEAD, MAGNETIC RECORDING METHOD AND APPARATUS FOR CONTROLLING MAGNETIC HEAD WITH SPIN TORQUE OSCILLATOR IN A DISK DRIVE

(71) Applicant: HITACHI, LTD., Tokyo (JP)

(72) Inventors: Yoshihiro Shiroishi, Hachioji (JP); Hiroshi Fukuda, Tokyo (JP); Harukazu Miyamoto, Higashimurayama (JP); Junko Ushiyama, Kokubunji (JP); Katsuro Watanabe, Hitachiota (JP); Yoshiyuki Hirayama, Kokubunji (JP); Masukazu Igarashi, Kawagoe (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 13/762,752

(22) Filed: Feb. 8, 2013

(65) Prior Publication Data
US 2013/0229895 A1    Sep. 5, 2013

(30) Foreign Application Priority Data
Mar. 1, 2012    (JP) ................. 2012-045986

(51) Int. Cl.
*G11B 21/02*    (2006.01)
*G11B 5/02*    (2006.01)
(Continued)

(52) U.S. Cl.
CPC .............. *G11B 13/04* (2013.01); *G11B 5/1278* (2013.01); *G11B 5/3146* (2013.01); *G11B 5/23* (2013.01); *G11B 2005/0024* (2013.01)

(58) Field of Classification Search
CPC ........... G11B 13/04; G11B 2005/0024; G11B 5/1278; G11B 5/23; G11B 5/3146; C07D 401/06; C07D 401/14; C07D 405/14; C07D 413/14; C07D 471/04; C07D 498/04; C07D 498/14; C07D 513/14
USPC .......... 369/13.07–13.09, 53.26, 53.37, 13.14, 369/13.05, 13.02, 53.38; 360/75, 59, 360/125.61, 125.44, 125.62, 125.35, 360/125.36, 125.41, 125.51–125.53
See application file for complete search history.

(56) References Cited

U.S. PATENT DOCUMENTS 6,331,966 B1 *  12/2001  Minami et al. ............. 369/13.07
7,616,412 B2    11/2009  Zhu et al.
(Continued)

FOREIGN PATENT DOCUMENTS

JP    7-244801    9/1995
JP    2007-220232    8/2007
(Continued)

OTHER PUBLICATIONS

Y. Shiroishi et al, Future Options for HDD Storage, IEEE Transactions on Magnetics, Oct. 2009, pp. 3816-3822, vol. 45, No. 10.
(Continued)

*Primary Examiner* — Dionne H Pendleton
(74) *Attorney, Agent, or Firm* — Baker Botts L.L.P.

(57) ABSTRACT

A microwave assisted magnetic recording head includes a recording magnetic pole unit that produces a recording field for writing to a perpendicular magnetic recording medium, and a high-frequency magnetic field oscillator that produces a high-frequency magnetic field. The recording magnetic pole unit includes a magnetic core with a write gap portion at which a main recording field component is concentrated, and the high-frequency magnetic field oscillator is disposed in the write gap.

18 Claims, 34 Drawing Sheets

(51) Int. Cl.
  *G11B 27/36* (2006.01)
  *G11B 13/04* (2006.01)
  *G11B 5/127* (2006.01)
  *G11B 5/31* (2006.01)
  *G11B 5/23* (2006.01)
  *G11B 5/00* (2006.01)

(56) References Cited

U.S. PATENT DOCUMENTS

| | | |
|---|---|---|
| 7,957,098 B2 | 6/2011 | Yamada et al. |
| 8,238,060 B2 | 8/2012 | Yamada et al. |
| 8,760,779 B2 * | 6/2014 | Johns et al. .................. 360/31 |
| 2005/0078412 A1 * | 4/2005 | Ohtomo et al. .............. 360/126 |
| 2005/0213250 A1 | 9/2005 | Kurita et al. |
| 2007/0195461 A1 | 8/2007 | Kajitani |
| 2008/0150643 A1 | 6/2008 | Suzuki et al. |
| 2008/0268291 A1 | 10/2008 | Akiyama et al. |
| 2009/0052095 A1 | 2/2009 | Yamada et al. |
| 2009/0080106 A1 * | 3/2009 | Shimizu ............... G11B 5/314 360/75 |
| 2010/0134922 A1 * | 6/2010 | Yamada et al. ......... 360/123.01 |
| 2010/0238581 A1 | 9/2010 | Nakamura et al. |
| 2011/0128648 A1 * | 6/2011 | Ezawa et al. .................... 360/75 |
| 2011/0141629 A1 | 6/2011 | Braganca et al. |
| 2011/0216435 A1 | 9/2011 | Shiimoto et al. |
| 2011/0216436 A1 | 9/2011 | Igarashi et al. |
| 2011/0299192 A1 | 12/2011 | Yamada et al. |

FOREIGN PATENT DOCUMENTS

| | | |
|---|---|---|
| JP | 2008-277586 A | 11/2008 |
| JP | 4255869 | 2/2009 |
| JP | 2009-70541 | 4/2009 |
| JP | 2010-218626 A | 9/2010 |
| JP | 2011-034628 A | 2/2011 |
| JP | 4677589 | 2/2011 |
| JP | 2011-113621 A | 6/2011 |
| JP | 2011-124574 A | 6/2011 |
| JP | 2011-187092 A | 9/2011 |
| WO | WO 2010/053187 A1 | 5/2010 |

OTHER PUBLICATIONS

Xiaochun Zhu et al., Bias-Field-Free Microwave Oscillator Driven by Perpendicularly Polarized Spin Current, IEEE Transactions on Magnetics, Oct. 2006, pp. 2670-2672, vol. 42, No. 10.

Yuhui Tang et al., Narrow Track Confinement by AC Field Generation Layer in Microwave Assisted Magnetic Recording, IEEE Transactions on Magnetics, Nov. 2008, pp. 3376-3379, vol. 44, No. 11.

Jian-Gang Zhu et al., Microwave Assisted Magnetic Recording, IEEE Transactions on Magnetics, Jan. 2008, pp. 125-131, vol. 44, No. 1.

Notice of Reasons for Rejection, mailed Mar. 17, 2015, which issued during the prosecution of Japanese Patent Application No. 2012-045986, which corresponds to the present application. An English translation is attached herewith.

\* cited by examiner

Footprint 183

Footprint 182

STO drive current

STO drive current $I_{WB}(i) < I_w(i+1)$
$I_{STO}(j) < I_{STO}(j+1)$
$i=1,2,\cdots,M-1$
$j=1,2,\cdots,N-1$

FIG. 26

| Head | Zone | Bias write current | STO drive current | TFC input power |
|---|---|---|---|---|
| $H_0$ | $Z_1$ | $I_{WB}01$ | $I_{STO}01$ | $P_{TFC}01$ |
| | $Z_2$ | $I_{WB}02$ | $I_{STO}02$ | $P_{TFC}02$ |
| | . | . | . | . |
| | $Z_n$ | $I_{WB}0n$ | $I_{STO}0n$ | $P_{TFC}0n$ |
| $H_1$ | $Z_1$ | $I_{WB}11$ | $I_{STO}11$ | $P_{TFC}11$ |
| | $Z_2$ | $I_{WB}12$ | $I_{STO}12$ | $P_{TFC}12$ |
| | . | . | . | . |
| | $Z_n$ | $I_{WB}1n$ | $I_{STO}1n$ | $P_{TFC}1n$ |
| . | . | . | . | . |
| $H_m$ | $Z_1$ | $I_{WB}m1$ | $I_{STO}m1$ | $P_{TFC}m1$ |
| | $Z_2$ | $I_{WB}m2$ | $I_{STO}m2$ | $P_{TFC}m2$ |
| | . | . | . | . |
| | $Z_n$ | $I_{WB}mn$ | $I_{STO}mn$ | $P_{TFC}mn$ |

MAGNETIC HEAD, MAGNETIC RECORDING METHOD AND APPARATUS FOR CONTROLLING MAGNETIC HEAD WITH SPIN TORQUE OSCILLATOR IN A DISK DRIVE

CLAIM OF PRIORITY

The present application claims priority from Japanese patent application JP 2012-045986 filed on Mar. 1, 2012, the content of which is hereby incorporated by reference into this application.

BACKGROUND OF THE INVENTION

1. Technical Field

The embodiments discussed herein relate to a magnetic head with the function of inducing magnetization reversal by applying a high-frequency magnetic field to a perpendicular magnetic recording medium, a magnetic recording apparatus including the magnetic head, a magnetic head drive control apparatus, and a method for controlling the same.

2. Related Art

As a result of the evolution of the Internet environment and the increase in the number of data centers spurred by the increasingly widespread use of cloud computing, the amount of information that is generated is rapidly increasing. There seems no doubt that magnetic recording apparatuses, such as magnetic disk drives (HDD) that have the highest recording density and superior bit cost, will continue to be the major storage device in the "age of big data". Thus, the capacity of the magnetic recording apparatus needs to be further increased and higher recording density needs to be achieved for that purpose.

Transition from the longitudinal magnetic recording based on a ring-type longitudinal recording head and a longitudinal magnetic recording medium to the perpendicular recording began in 2005. Increases in recording density have been achieved mainly by the magnetic recording head of a main magnetic pole and magnetic shield pole type and by improvements in perpendicular recording performance enabled by a perpendicular magnetic recording medium referred to as an ECC (Exchange Coupled Composite) medium whose ease of recording was significantly increased by decreasing the crystalline magnetic anisotropy energy $H_k$ on the surface layer (also called "cap layer") side of the magnetic layer. Achieving higher recording density is basically governed by scaling laws, requiring decreases in the track width of the main magnetic pole of a perpendicular magnetic recording head, a head-to-medium magnetic spacing, and the crystallographic grain of the ECC-type perpendicular magnetic recording medium, for example. However, a decrease in the crystallographic grain of the perpendicular magnetic recording medium leads to a decrease in anisotropic energy that would maintain a magnetization state, so that the recorded magnetization state tends to be more readily disturbed by thermal fluctuation. This phenomenon is referred to as a super-paramagnetic effect. Thus, there is supposedly a practical limit to simply extending current technology in the era on the order of 1 Tb/in$^2$, as discussed by Non-patent Document 1. This practical limit may be referred to as "super-paramagnetic limit" or "trilemma".

Developing a technology for overcoming the limit is a major problem in achieving an increase in recording density. Patent Document 1 proposes a spin heating recording method whereby even a high-coercive force medium can be written with a low magnetic field without virtually any increase in medium temperature by utilizing an effective decrease in coercive force due to the absorption of the energy of a high-frequency magnetic field satisfying magnetic resonance conditions by the spin of the magnetic recording medium, the high-frequency magnetic field being supplied to the magnetic recording medium by causing an external high-frequency source to track the movement of the magnetic head. In such a spin heating recording method, because the high-frequency electromagnetic field is applied such that the power is concentrated in a frequency range satisfying the magnetic resonance conditions, the internal degrees of freedom other than spin, such as the plasma vibration and lattice vibration of conduction electrons, are not much excited and only spin can be selectively excited, so that the temperature of the medium as a whole is not increased as would happen by conventional heating. Such a method for increasing recording density by exciting the precession of medium magnetization by applying a microwave-band high-frequency magnetic field to the magnetic recording medium, and magnetically recording information in the perpendicular magnetic recording medium with large magnetic anisotropy energy while decreasing a switching field, is referred to as MAMR (Microwave Assisted Magnetic Recording) (Non-patent Document 1).

In recent years, a practical spin torque oscillator (STO) of a fine structure utilizing a high-frequency magnetic field generation layer (FGL) such that a high-frequency magnetic field is generated by causing a high spin rotation (precession) by spin torque has been proposed, as discussed in Patent Documents 2 and 3 and Non-patent Document 2. Further, Patent Document 4 discloses a method for inducing magnetization reversal with improved efficiency by causing a high-frequency magnetic field oscillator to generate a high-frequency magnetic field (circular polarization magnetic field) rotating in the same direction as the direction of precession of the magnetization of the magnetic recording medium for magnetization reversal in accordance with the recording field polarity. Also, research and development for practical application of the microwave assisted magnetic recording with the above-described features are recently actively being pursued. For example, Patent Documents 3 and 5 propose magnetic heads such that stable and high-frequency magnetic field assisted recording is enabled by adopting a structure in which the STO with low coercive force is disposed adjacent to the main magnetic pole of a perpendicular magnetic head, or between the main magnetic pole and an additional magnetic shield (auxiliary or return pole). These publications also disclose a structure in which the STO is disposed on a medium travel direction side of the main magnetic pole or on the opposite side, and a structure in which the direction in which STO films are layered is substantially perpendicular or parallel to the direction of movement of the medium.

Thus, with regard to the microwave assisted recording, studies have been made on the premise that an increase in recording density is made as an extension of the perpendicular recording technology that has been put to practical application since 2005 with areal density of 133 Gb/in$^2$. The ring-type longitudinal recording head that had been used for longitudinal magnetic recording, in which a ring-type (C-shaped) magnetic core is formed and recording is performed with a strong longitudinal recording field produced from a write gap of the magnetic core, was considered to be not suitable for increasing recording density for perpendicular magnetic recording due to a small write field gradient. Thus, the microwave assisted recording heads proposed by the related art have been based on the perpendicular magnetic recording head (main magnetic pole and magnetic shield pole type recording head) that is currently widely used as a standard perpendicular recording head and that performs recording by using a strong perpendicular recording field emitted from a main magnetic pole.

Patent Document 1: JP 7-244801 A
Patent Document 2: JP 4677589 B
Patent Document 3: U.S. Pat. No. 7,616,412 B2
Patent Document 4: JP 4255869 B
Patent Document 5: JP 2009-70541 A
Patent Document 6: JP 2007-220232 A
Non-patent Document 1: Y. Shiroishi, et al., "Future Options for HDD Storage", IEEE Trans. Magn., Vol. 45, No. 10, pp. 3816-3822 (2009)
Non-patent Document 2: X. Zhu and J.-G. Zhu, "Bias-field-free microwave oscillator driven by perpendicularly polarized spin current", IEEE Trans. Magn., Vol. 42, pp. 2670-2672 (2006)
Non-patent Document 3: Y. Tang and J.-G. Zhu, "Narrow Track Confinement by AC Field Generation Layer in Microwave Assisted Magnetic Recording", IEEE Trans. Magn., Vol. 44, pp. 3376-2379 (2008)
Non-patent Document 4: J-G. Zhu, X. Zhu and Y. Tang, "Microwave Assisted Magnetic Recording", IEEE Trans. Magn., Vo. 144, No. 1, pp. 125-131 (2008)

SUMMARY OF THE INVENTION

Against the above background, the present inventors conducted investigations into ways of increasing recording density for the magnetic recording apparatus by applying a so-called in-gap STO type microwave assisted recording magnetic head in which the STO is disposed in a write gap portion, based on the main magnetic pole and magnetic shield type pole (hereafter referred to as a "main magnetic pole type magnetic pole") suitable for perpendicular magnetic recording.

An increase in recording density may be achieved in the magnetic recording apparatus by two methods: one is to increase the linear recording density in the direction of travel of the magnetic head; and the other is to increase the track density in the track width direction. The microwave assisted recording differs greatly from thermal assisted recording in that the track density can be magnetically determined as described above. In fact, the discussion in Non-patent Document 3 indicates, through a LLG (Landau-Lifshitz-Gilbert) simulation, that a recording field from the STO is sharper and produces smaller blurring than a recording field from the main magnetic pole and is therefore more suitable for narrowing the track. Further, there is the advantage that the thickness of the STO element is smaller than the recording magnetic pole by approximately an order of magnitude, so that a narrow track pattern can be more easily formed. Thus, it was considered that narrow-track, high recording density magnetic recording can be implemented when the recorded track width can be determined by the STO of the main magnetic pole type magnetic pole structure. Accordingly, the present inventors conducted further studies with a view to achieving higher track density by microwave assisted recording with a main magnetic pole and magnetic shield type recording head (hereafter referred to as a "main magnetic pole type magnetic head").

The present inventors initially produced a prototype magnetic head illustrated in FIGS. 35, 36, and 37 as a microwave assisted recording head of the main magnetic pole type magnetic pole structure disclosed in Patent Documents 3 and 5 and Non-patent Document 4. FIGS. 36 and 37 illustrate a structural example of the magnetic head and the perpendicular magnetic recording medium and the magnetic field in the vicinity of the write gap 125 of FIG. 35. In the figures, numeral 110 designates a reproducing head unit; 120 designates a recording head unit; 124 designates a magnetic shield; 130 designates a perpendicular magnetic recording medium; 133 designates a cap layer; 134 designates a high $H_k$ magnetic layer; and 135 designates a soft-magnetic underlayer. In this example, the main magnetic pole type magnetic head including a main magnetic pole 122 with a recorded track width of 40 to 70 nm and an STO element 140 with a narrow track width of 20 to 40 nm which is disposed in the write gap 125 of 40 nm was produced experimentally according to the related art with a view to achieving narrow track recording as described in Non-patent Document 3, for example. The magnetic head was built in a spin stand (recording/reproduction characteristics tester) or an HDD apparatus or in combination with a perpendicular magnetic recording medium used as a standard for perpendicular magnetic recording or a performance-improved medium (130), and the recording/reproduction characteristics and performance of the magnetic head were experimentally evaluated.

FIG. 38 illustrates an example of the recorded track profile obtained when a conventional perpendicular magnetic recording medium with the coercive force of 5.5 kOe was recorded and reproduced by using a microwave assisted recording head including the main magnetic pole with the recorded track width of approximately 45 nm and an STO with the width of approximately 20 nm. By operating the microwave assist element, the high-density signal output was improved by approximately 10% at the time of on-track when the reproducing head was positioned at the center of the recording track, and correspondingly the signal-to-noise ratio (S/N) was also improved by approximately 1 dB at the center of the recording track. However, the half-value width of the recording track was substantially the same and on the order of 60 nm regardless of the presence or absence of the microwave assist element operation. Namely, in either case, the recorded track width was determined by the track width of the main magnetic pole and was greatly larger than the track width of the main magnetic pole. Thus, according to the combination of the microwave assisted recording head of the conventional main magnetic pole type structure and the conventional ECC medium, the recorded track width is determined by the width of the main magnetic pole and becomes greatly larger than the more narrowly set STO element width. Accordingly, it became clear that an increase in recording density in the track width direction cannot be achieved as described in Non-patent Document 3.

The present inventors analyzed the fundamental cause of this problem through a recording field analysis and an LLG simulation taking into account the recording/reproduction process. As a result, it became clear that, with respect to the conventional high coercive force ECC perpendicular medium designed for ease of recording, magnetic recording is performed by the main magnetic pole 122 as well in the conventional main magnetic pole type microwave assisted recording head illustrated in FIG. 35, and therefore the recorded track width is mainly determined by the magnetic field from the main magnetic pole 122, resulting in an increase in the track width. For the simulation, with regard to the perpendicular magnetic recording medium, the average grain pitch was 5 to 6 nm and the grain diameter dispersion was 10 to 20%; the cap layer 133 had a film thickness of 10 nm and saturation magnetization of 500 to 800 emu/cm³; the hard layer 134 had a film thickness of 6 nm and saturation magnetization of 500 to 800 emu/cm³; the anisotropy magnetic field $H_k$ was 30 to 50 kOe; and the damping constant was 0.01 to 0.02. The magnetic head was made of CoFe with saturation magnetic flux density of 2.4T and included a conventional main magnetic pole type magnetic pole with the track width of 40 to 70 nm and the FGL-mounting STO 140 with the film thickness of 10 to 15 nm and the width of 20 to 40 nm disposed in the vicinity of the main magnetic pole in the write gap portion 125 of 30 to 40 nm.

Namely, it became clear that this phenomenon was due to the fact that (1) the ECC medium is easily influenced by the strong demagnetization field from the cap layer which tends to be readily subjected to magnetization reversal and by the recording field from the main magnetic pole, the medium crystallographic grains are readily subjected to magnetization reversal in an area immediately under a side surface of the main magnetic pole where the medium demagnetization field is strong, and the recorded track width is determined by the magnetic field from the main magnetic pole (foot print); and (2) when the magnetization of the ECC medium is reversed, no microwave assist effect is obtained with respect to the opposite magnetization, so that the gain by the microwave assist effect is small.

A physical image of the phenomenon will be described below. FIG. 39 illustrates an evaluation of the applied magnetic field angle dependency, indicated by triangles, of the switching field $H_{sw}$ of a conventional ECC medium in response to the application of uniform external field. This angle dependency is very important because the recording field from the magnetic head has directionality. Generally, a uniaxial magnetic crystallographic grain having an anisotropy magnetic field $H_k$ is known to have magnetization reversal in response to the application of an external magnetic field in accordance with a magnetization reversal mechanism called the Stoner Wohlfarth (SW) model given by the expression (1).

$$H_{sw} = H_k \cdot \left((\sin\theta)^{\frac{2}{3}} + (\cos\theta)^{\frac{2}{3}}\right)^{\frac{3}{2}} \quad (1)$$

It is seen from FIG. 39 that in the conventional ECC medium, the switching field exhibits shallow angle dependency in each case. This result indicates that the Stoner Wohlfarth (SW) index nSW which is defined by an expanded Stoner Wohlfarth (SW) model according to expression (2) may be considered to be approximately 0.9.

$$H_{sw} = |H| \cdot \left((\sin\theta)^{\frac{1}{nSW}} + (\cos\theta)^{\frac{1}{nSW}}\right)^{nSW} \quad (2)$$

It may be considered that, generally, when the recording field from the magnetic head exceeds the switching field given by the asteroid curve according to expression (2), magnetization reversal of the perpendicular magnetic recording medium occurs (because there is dispersion microscopically). Thus, based on this result, an analysis was conducted to clarify the essence of the phenomenon in which narrow track recording was not possible with the conventional microwave assisted magnetic head illustrated in FIG. 35 against expectations.

FIG. 40 illustrates the recording field in the vicinity of the write gap 125 when a conventional ECC-type medium is recorded with a recording magnetic field 121 from the main magnetic pole of the main magnetic pole type magnetic head. FIG. 41 illustrates, as a recording field trajectory (pole figure), the recording field intensity and its direction at a height position 600 of the perpendicular magnetic recording medium in the film thickness direction thereof that may be considered to determine the recording magnetization state, when the medium magnetization reversal is reversed from an upward direction to a downward direction by the recording field 121. FIG. 41 also illustrates the asteroid curve of the magnetic recording medium on the assumption that the representative SW index nSW for a conventional perpendicular magnetic recording medium is 0.9. For the switching field $H_{sw}$, the absolute value of the coercive force measured by a quasi-static VSM method was corrected for frequency dependency. In the following, magnetization reversal in the case in which the main magnetic pole type magnetic head applies to the conventional perpendicular magnetic recording medium a recording field exceeding the switching field of the medium will be considered.

FIG. 6 illustrates the rotation direction of the high-frequency magnetic field from the STO. FIG. 7 illustrates the position dependency of the intensity of the magnetic field. From FIG. 7, it can be seen that the high-frequency oscillation magnetic field is strong in a region on the order of the film thickness of the FGL and provides an assist effect for the perpendicular magnetic recording medium only in the vicinity of this region.

Thus, in FIG. 36, the microwave assist magnetic field has a strong effective recording field immediately under the recording magnetic pole (main magnetic pole) 122 and is effective at a position C sufficiently close to the FGL. However, the microwave assist magnetic field is not effective in regions A and B in which only the effective recording field is strong. A magnetic recording operation for microwave assisted recording will be described in detail later with reference to FIG. 6. In FIG. 38, a track profile which is substantially similar to the track profile for normal recording in which the microwave assist element is turned off is obtained also when microwave assisted recording was performed by the main magnetic pole type magnetic head. Thus, it is extremely important to clarify what is happening in the regions A and B of FIG. 36 during normal magnetic recording by the main magnetic pole magnetic field. Accordingly, an analysis was conducted by focusing on this point, and the result will be described in the following with reference to FIG. 41 illustrating the relationship between the recording field from the main magnetic pole and the medium switching field.

In the main magnetic pole type magnetic head illustrated in FIGS. 35 and 36, being simply composed of the recording magnetic pole 122 of the (narrow track) main magnetic pole and the magnetic shield 124, the recording field has asymmetry such that the recording field has a strong perpendicular magnetic field component from the recording magnetic pole 122 but is weak near the magnetic shield 124 and has complex flows. Thus, as will be understood from the flow of the recording field in FIG. 36 or the recording field trajectory 121 illustrated in FIG. 40, in accordance with the relative head-to-medium movement 100, the recording field 121 to which the medium is subjected is varied in a complex manner in terms of intensity and angle. As illustrated in FIG. 41, the medium is subjected to the strong recording field 121 with the complex and perpendicular component, and medium magnetization reversal begins from an upward direction to a downward direction at around 280°, and then the medium region in which magnetization reversal has occurred (which may be called a "foot print" or a "recording bubble" as it reflects the magnetic pole shape) further expands in response to the strong recording field. Finally, because the main magnetic pole type magnetic head is structured such that the base of the perpendicular recording field is absorbed into the magnetic shield, a recording magnetization state is finalized at the position indicated by a star (315°) in a relatively sharp recording field gradient.

Further, in the conventional high coercive force perpendicular magnetic recording medium 130, a high-saturation magnetization and low-$H_k$ magnetic layer is used for the cap layer 133 so as to help magnetization reversal, so that the demagnetization field is on the order of 6 to 10 kOe. Thus, in the regions A and B (FIG. 36) at the side surface of the recording magnetic pole 122 where a strong effective recording field is produced, recording is performed by the strong recording field from the main magnetic pole 122 alone along the general outline (foot print) of the main magnetic pole with the help of the strong demagnetization field prior to the recording in the microwave assisted recording position C.

Further, when this is followed by assisted recording with the high-frequency magnetic field, the main magnetic pole type magnetic head of the structure of FIG. 36 has the problem that the recording field trajectory is asymmetric, and that the discrepancy between the recording field from the recording magnetic pole 122 and the medium switching field, i.e., the difference between the position 602 at which the recording field is at maximum in FIG. 41 and a recording finalized position 601, becomes large. Namely, at this recording position, the foot print (recording bubble) of the magnetic pole becomes large compared with the foot print at the recording finalized position (601), resulting in a further increase in recording blurring and the recorded track width.

As described above, it was learned that the recorded track width (width across the recording track) is determined by the maximum recording field at the regions A and B in the vicinity of the recording magnetic pole 122 and by the strong demagnetization field from the medium, and that recording occurs along the general outline of the main magnetic pole and, as a result, the track width becomes significantly larger than the track width of the narrow track main magnetic pole, which makes it difficult to achieve narrow track recording and an increase in track density.

Patent Document 5 also discloses a main magnetic pole type magnetic head illustrated in FIG. 37 in which the front-rear positional relationship of the STO and the main magnetic pole is switched from that of FIG. 36. In this structure, the recording magnetic pole 122 and the magnetic shield 124 are disposed oppositely from FIG. 36 with respect to the head travel direction, so that no recording by the recording field occurs prior to the microwave assisted recording, as in FIG. 36. However, in this structure, the thickness of the recording magnetic pole (main magnetic pole) 122 is greater than the recording bit length, and further the recording field gradient is small. Thus, when new information is to be recorded (such as when the medium magnetization is changed from a downward direction to an upward direction), for example, the recording bit at the center of the recording track at a position D in FIG. 37 where sufficient recording has been performed by microwave assist is demagnetized by the strong recording field at positions E and F of the main magnetic pole 122 in accordance with the movement 100 of the magnetic head, and also the width of the recording track is expanded for the same reason as for FIG. 36. In fact, an experiment using the head of FIG. 37 produced the poor results that the track width was wide at approximately 60 nm as in the case of FIG. 36 and that the high-density signal output and S/N were lower than the case of FIG. 36 by approximately 2 dB.

Thus, it became clear that, while some improvements in assist effect, output, and S/N are observed in the application of the main magnetic pole type magnetic head technology (first-generation microwave assisted recording) according to the prior art, such as disclosed in Patent Document 5, there is the significant problem that the increase in track density predicted by Non-patent Document 3 through the LLG simulation involving the application of a very strong high-frequency magnetic field of 2 kOe to a singled layered perpendicular recording medium was not more than the increase according to the related art. The essence of this problem is believed to lie in the fact that, in the conventional perpendicular magnetic recording medium, as described above, partial magnetization reversal occurs due to the strong recording field from the main magnetic pole before the microwave assist effect is exerted, so that the recorded track width is determined by the track width of the main magnetic pole. This means that, according to the conventional microwave assisted recording, when there is a characteristics variation and the like during manufacturing, the problem of the so-called ATI (Adjacent Track Interference) may be caused whereby an adjacent track is demagnetized (i.e., output is decreased) at the time of recording. Accordingly, in order to fully utilize the features of microwave assisted recording and achieve a greater increase in track density than is expected by the trend in the related art, it is necessary to implement countermeasures in the magnetic head, the magnetic recording apparatus, and the recording and reproduction system in view of the above insight, and which is a problem to be solved by the embodiments discussed herein.

An object of the present invention is to provide a magnetic head such that high track density recording exceeding the trend of the related art is enabled for microwave assisted recording, and a high-capacity and highly reliable magnetic recording apparatus that enables high recording density of 1 Tb/in$^2$ or more.

According to an embodiment, a microwave assisted magnetic recording head includes a recording magnetic pole unit that produces a recording field for writing to a perpendicular magnetic recording medium, and a high-frequency magnetic field oscillator that produces a high-frequency magnetic field. The recording magnetic pole unit includes a ring-type (C-shaped) magnetic core with a write gap in which a longitudinal recording field component is produced as a main recording field component. The high-frequency magnetic field oscillator is disposed in the write gap.

According to another embodiment, a magnetic recording apparatus includes a microwave assisted magnetic recording head including a recording magnetic pole that forms a magnetic core, a high-frequency magnetic field oscillator disposed in a write gap of the magnetic pole, a magnetic read sensor element that reads information from a perpendicular magnetic recording medium, and a TFC (Thermal Flying Height Controller) element that controls a clearance between the high-frequency magnetic field oscillator and the perpendicular magnetic recording medium; the perpendicular magnetic recording medium, which cannot be sufficiently recorded only with a recording magnetic pole operation; a unit that controls or processes a recording operation by the recording magnetic pole and the high-frequency magnetic field oscillator and a magnetic reproducing head reproduction operation; and a unit that controls input power to the TFC element. More preferably, the apparatus is provided with a function of adjusting the input power in the manufacturing process or in a use environment.

The above adjustments may be implemented by providing a magnetic head drive control apparatus including a recording signal supply unit that supplies a recording signal to the magnetic core and a drive control unit that supplies a drive signal to the high-frequency magnetic field oscillator with a unit that supplies a preliminary operation current to the magnetic core in accordance with a direct instruction from an MPU and that supplies a recording signal and a high-frequency oscillator drive signal independently in accordance with the timing of a write gate outputted from an HDC.

According to an embodiment, a recording track greatly narrower than the track width of the magnetic core can be recorded, so that a track density far higher than the track density according to related-art technology can be achieved, and a high recording density of 1 Tb/in$^2$ or higher can be easily achieved.

Further, compared to a conventional head, the ring-type magnetic core according to an embodiment can produce a uniform and strong oscillation control magnetic field in the write gap portion substantially perpendicularly to the STO film. Thus, the STO disposed in the write gap can be caused to more stably oscillate such that a strong recording field necessary for recording a high coercive force perpendicular magnetic recording medium can be easily obtained. Further, the high-frequency magnetic field obtained from the high-frequency magnetic field oscillator in this way is sharp compared with the recording field from the recording magnetic pole. Thus, the recording blurring or the curvature of magnetization at the edge of the recording track can be decreased, the reading noise component from the recording track edge can be decreased, and thus a higher S/N than that with the microwave assist head of the conventional perpendicular head structure (main magnetic pole and magnetic shield structure) can be obtained.

In the magnetic recording apparatus according to an embodiment, the write current, clearance, and the STO current (voltage) may be adjusted adaptively during the assembly of the apparatus and, when there is an environment change or a transient phenomenon, these values may be adjusted by taking advantage of the feature of the embodiment that recording with only the recording field cannot be performed, so that the recorded track profile or the recording field distribution in the recorded track width direction can be adjusted. Thus, significantly improvements in the manufacturing yield of the apparatus and performance can be achieved by absorbing magnetic head manufacturing variations. Further, the robustness against an environment change, such as a temperature or atmospheric pressure change, or a transient phenomenon upon return from a recording/reproduction pause status can be significantly increased.

Thus, the second-generation microwave assisted recording head according to an embodiment can provide excellent performance compared with the first-generation microwave assist system of the conventional perpendicular head structure, so that the recording density, particularly the track density, can be greatly increased. Further, when combined with a magnetic head drive control apparatus, an evaluation/adjusting system, or manufacturing equipment related thereto, a high-capacity and highly reliable magnetic recording apparatus with a particularly high recording density, performance, manufacturing yield, and reliability can be provided.

Other problems, configurations, and effects will become apparent from the following description of embodiments.

BRIEF DESCRIPTION OF THE DRAWINGS

FIG. 26 illustrates an example of a parameter control table;

DESCRIPTION OF THE PREFERRED EMBODIMENTS

In the following, embodiments of a microwave assisted magnetic head, a magnetic recording apparatus and the like will be described with reference to the drawings.

[First Embodiment]

Figure 1:
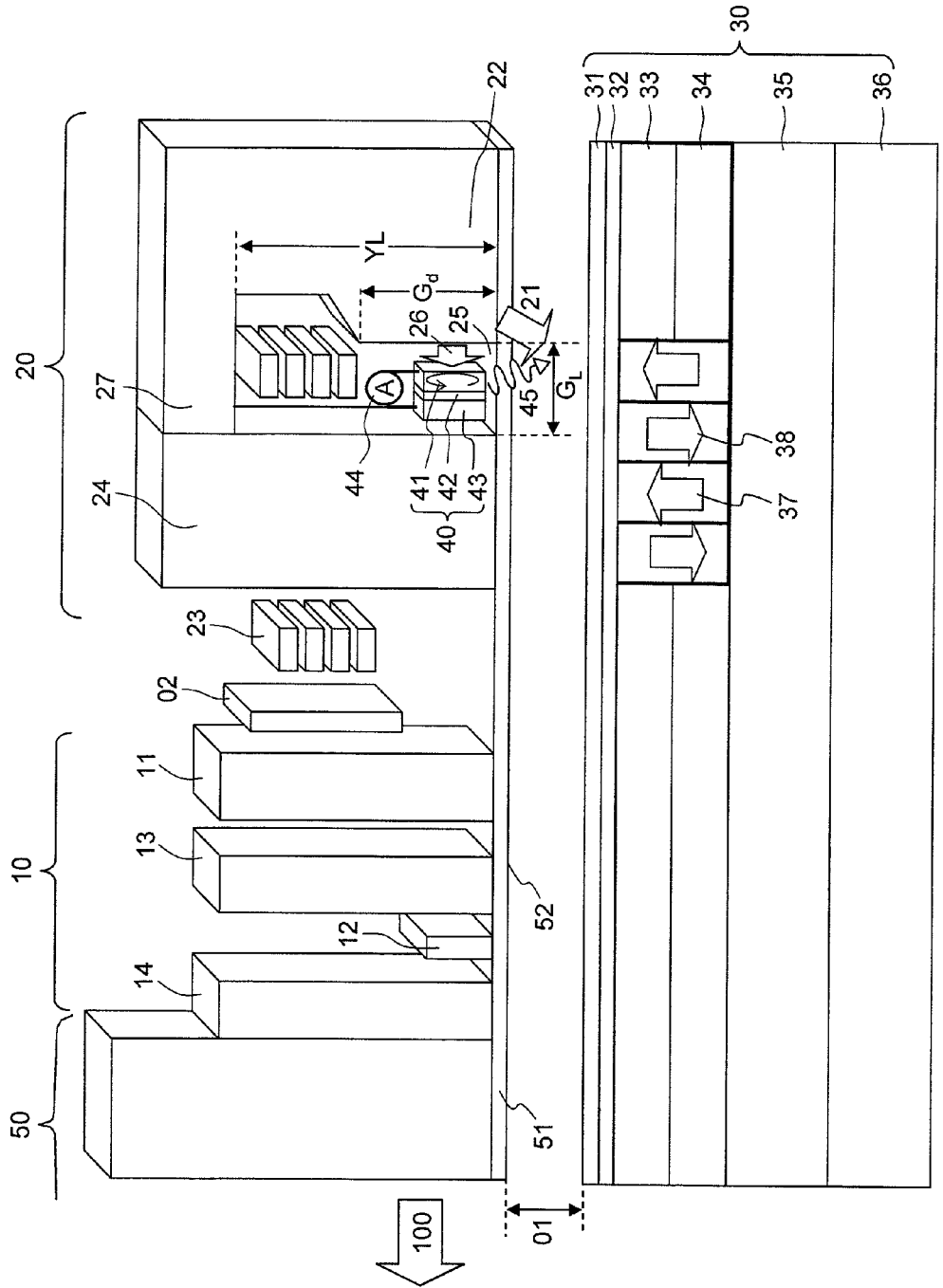
FIG. 1 is a conceptual diagram of an example of a microwave assisted magnetic head according to an embodiment.

FIG. 1 is a schematic diagram of a perpendicular magnetic recording medium and a magnetic head according to an embodiment.

(Perpendicular Magnetic Recording Medium)

A perpendicular magnetic recording medium 30 includes a super-smooth and heat-resistant non-magnetic substrate 36 of glass, Si, plastics, or NiP plated Al, for example. The perpendicular magnetic recording medium 30 further includes, disposed on the substrate 36, a soft-magnetic underlayer 35 of FeCoTaZr and the like; first and second recording layers 34 and 33 of a magnetic film containing CoCrPt, a $L1_2$-$Co_3Pt$ base alloy, a $L1_2$-$(CoCr)_3Pt$ base alloy, a $L1_1$-$Co_{50}Pt_{50}$ base alloy, a m-$D0_{19}$ type $Co_{80}Pt_{20}$ base alloy, $CoCrSiO_2$/Pt, a CoB/Pd magnetic super-lattice, or $L1_0$ type FePt as a major constituent element, and an additive such as $SiO_2$, $TiO_2$, C, B, Ag, Cu, Au, Ni, Fe, Cr, Mn, or Pd which may be added as needed; an overcoat layer 32 of C or FCAC (Filtered Cathodic Arc Carbon), for example; and a lubricant layer 31, for example. The layers may be formed by using magnetron sputtering equipment with an ultrahigh vacuum chamber, overcoat layer forming equipment, and lubricant layer forming equipment, for example. The perpendicular magnetic recording layer may be formed by mixing appropriate oxide, carbide, nitride, boride, or a mixture thereof, such as Ti, Nb, Zr, Cu, Si, or Al, into a target material, and causing a segregation of a non-magnetic material in the crystallographic grain boundary by 0.5 to 2 nm by adjusting the film forming conditions such that the magnetic exchange interaction between the crystallographic grains can be appropriately controlled. Arrows 37 and 38 indicate upward magnetization and downward magnetization, respectively, recorded in the perpendicular magnetic recording medium.

Figure 2:
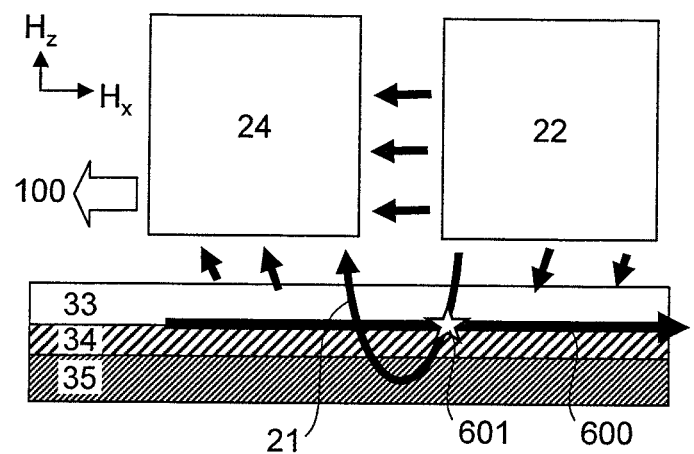
FIG. 2 is a schematic diagram illustrating a magnetic field in the vicinity of a write gap portion of a microwave assisted magnetic head according to an embodiment.
Figure 3:
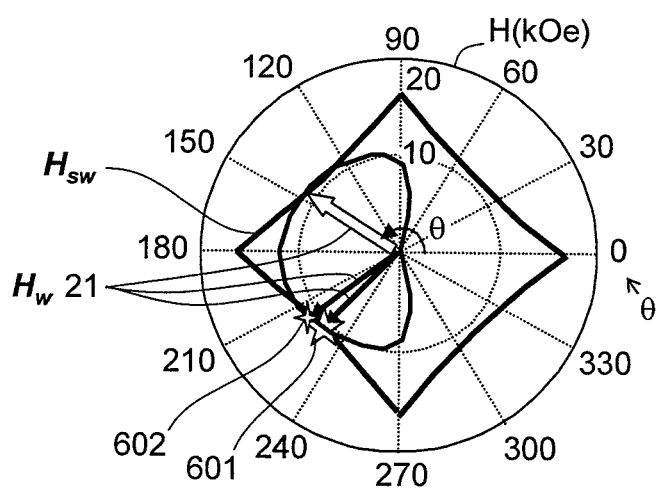
FIG. 3 illustrates the relationship (magnetic recording operation) between the recording field trajectory by the microwave assisted magnetic head and the switching field $H_{sw}$ of a perpendicular magnetic recording medium.

According to the present embodiment, a structure suitable for narrow track magnetic recording by the second-generation microwave assist system is obtained by increasing the average anisotropy magnetic field of a magnetic film so as to achieve high coercive force such that sufficient recording does not take place with the magnetic field from the conventional main magnetic pole type magnetic head. FIG. 2 schematically illustrates a magnetic field in the vicinity of the write gap of the microwave assisted magnetic head portion according to the present embodiment. FIG. 3 illustrates an example of the pole figure trajectory (asteroid) of the switching field of the high coercive force perpendicular magnetic recording medium according to the present embodiment. While the angle dependency of the switching field of the high coercive force perpendicular magnetic recording medium is rather deep compared with a conventional perpendicular medium, the size and anisotropy magnetic field $H_k$ are higher by approximately 30 to 40%. Thus, the switching field (asteroid) cannot be exceeded by the magnetic field intensity from the main magnetic pole illustrated in FIG. 41, so that sufficient recording does not take place. A ring-type magnetic pole head according to an embodiment to be described later has a strong magnetic field and is capable of recording, while not sufficient.

The structure of the perpendicular magnetic film is not limited to the two-layer structure but may include a single-layer structure, a composition graded type film structure, or a multi-layer structure of three or more layers, as long as the structure has high coercive force. Further, an intermediate layer for controlling magnetic coupling may be disposed between the respective layers as needed. When the configuration of the perpendicular magnetic film or the magnetic characteristics of the perpendicular magnetic recording are close to those for a single-layer medium, the resonant frequency of the magnetization of the perpendicular magnetic film and the oscillation frequency of the high-frequency oscillator (STO) 40 in the high-frequency magnetic field may preferably be not much different from each other. In the case of the multi-layer structure, by relatively increasing the damping constant α of the perpendicular magnetic recording medium magnetic layer, the degree of freedom of absorption of energy from the high-frequency magnetic field can be adjusted, so that the oscillation frequency of the STO can be lowered.

Further, at least one non-magnetic layer for controlling the characteristics may be disposed between the soft-magnetic underlayer 35 and the substrate 36, or at least one non-magnetic intermediate layer of Ru, for example, for controlling the characteristics may be disposed between the soft-magnetic underlayer 35 and the magnetic layer 34 so as to increase the crystallographic orientation, crystallographic grain size, magnetic characteristics, uniformity and the like of the magnetic layers 34 and 33. In addition, an intermediate layer of a non-magnetic or magnetic material may be further provided. The soft-magnetic underlayer 35 of CoFeTaZr and the like may have a two-layer structure sandwiching Ru and the like so as to improve soft-magnetic characteristics or uniformity. While in the example of FIG. 1 the magnetic layers 33 and 34 and the like are disposed on one side of the substrate 36, these layers may be disposed on both sides of the non-magnetic substrate 36. While the magnetic layers are successive films in the perpendicular magnetic recording medium 30 according to the present embodiment, the magnetic layers may include a discreet track film or a patterned film with a magnetic pattern on the order of 10 nm formed on the substrate.

(Magnetic Head)

The magnetic head includes a reproducing head unit 10, a recording head unit 20 with a ring-type magnetic core, and a thermal expansion element unit (TFC: Thermal Flying Height Controller) 02 for clearance control as described in Patent Document 4, for example, which are formed on a slider 50 that travels over the perpendicular magnetic recording medium 30 with a clearance 01 in the direction of the arrow 100. The TFC includes a thin film of a heat-generating resistive element of the order of 50 to 150Ω which is made of a high-specific resistance, high-thermal expansion material, such as NiCr or W, and insulated by an alumina film and the like. The TFC adjusts the clearance between the recording head unit or the reproducing head unit and the perpendicular magnetic recording medium 30 to approximately 0.5 to 2 nm. The TFC may be provided at two or more locations. In this case, the wiring for the respective TFCs may be either independent or in series. The wiring for the input of input power is omitted.

Figure 18:
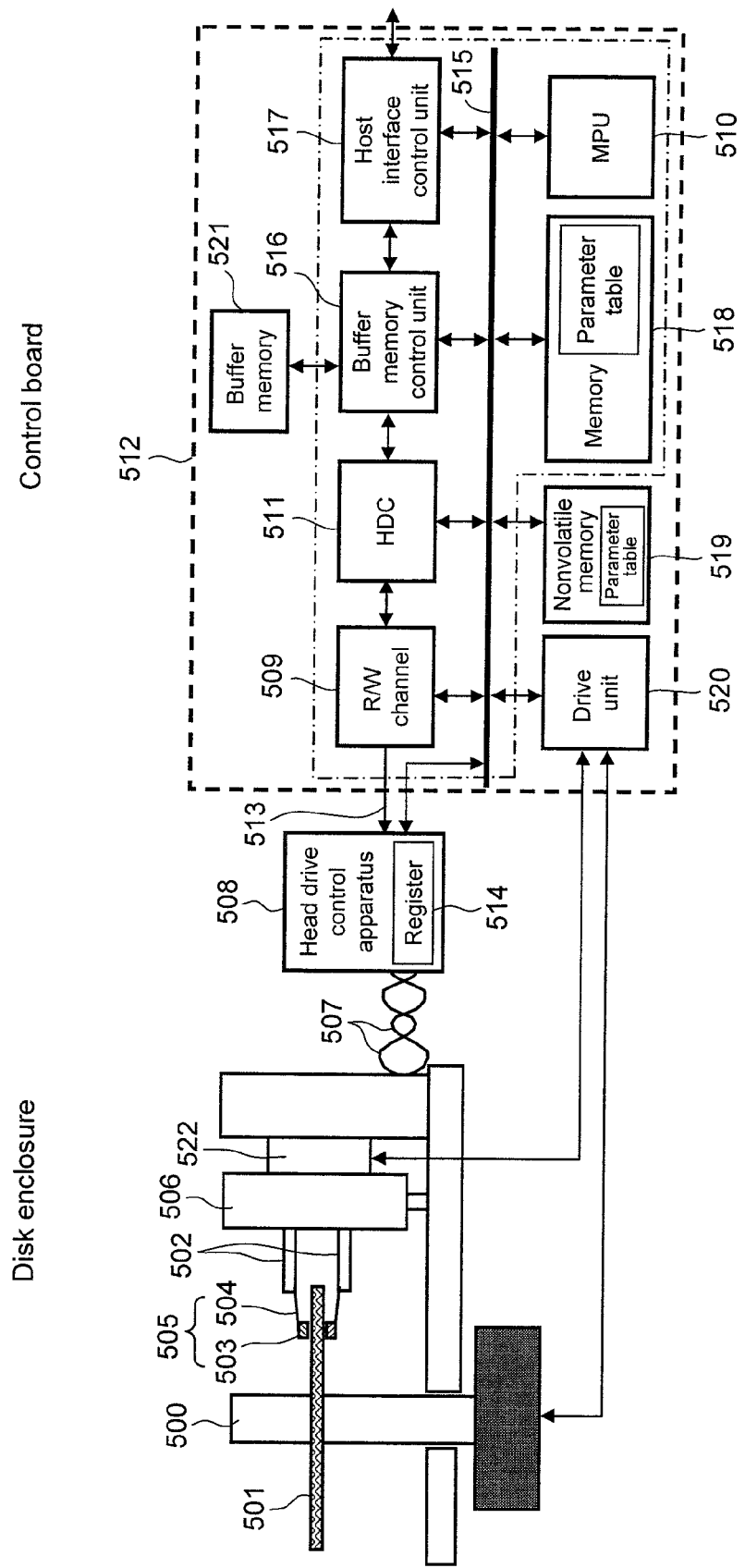
FIG. 18 is a conceptual diagram of an example of a magnetic head drive control apparatus and a magnetic recording apparatus according to an embodiment.
Figure 19:
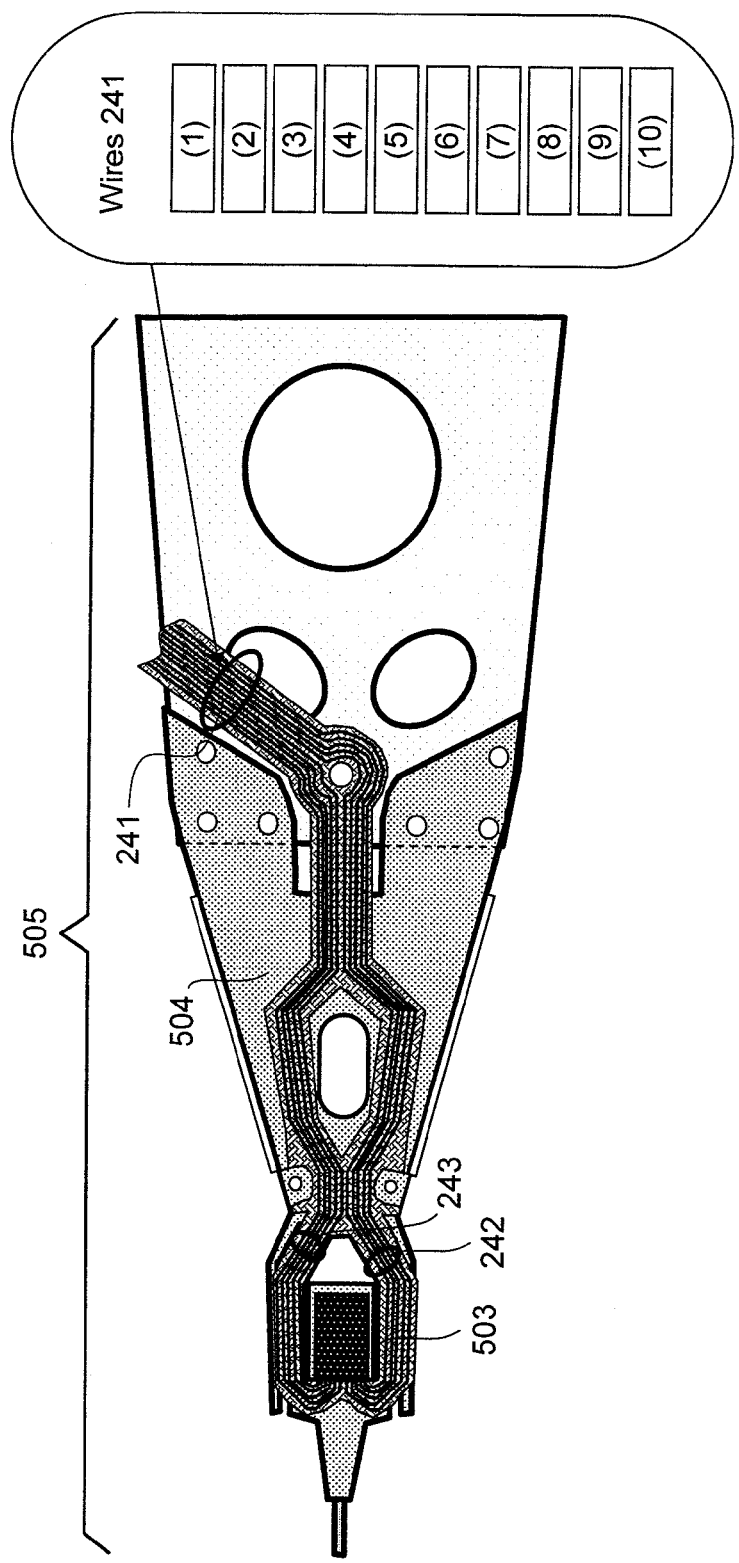
FIG. 19 illustrates a head gimbal assembly according to an embodiment.

The head overcoat layer 51 is made of CVD-C, FCAC and the like, with a bottom surface 52 providing an air bearing surface (ABS) for the magnetic head. The head overcoat layer may be omitted. The slider 50 is made of an $Al_2O_3$—TiC ceramics and the like, and is etched such that, as described in Patent Document 6, a negative pressure can be generated at the ABS surface whereby the magnetic head magnetic pole portion is floated by approximately 5 to 10 nm along the entire circumference of the perpendicular magnetic recording medium. The slider 50 is mounted on a suspension (plate spring) with element drive wiring and further mounted on a magnetic recording apparatus as a head gimbal assembly (HGA) as will be described later (FIGS. 18 and 19). According to the present embodiment the slider is of a femto type on the order of 0.85 mm×0.7 mm×0.23 mm; however, depending on the application, a thin femto type with the height on the order of 0.2 mm, or a long-femto type with the length on the order of 1 mm may be employed.

The reproducing head unit 10 includes a magnetic shield layer 11 that magnetically shields the reproducing head unit from the recording head unit; a reproduction sensor element 12; an upper magnetic shield 13 for increasing reproduction resolution; and a lower magnetic shield 14, for example. The reproduction sensor element 12 reproduces a signal from the medium. The reproduction sensor element 12 may have a TMR (Tunneling Magneto-Resistive) effect, a CPP (Current Perpendicular to Plane)-GMR (Giant Magneto-Resistance) effect, or an EMR (Extraordinary Magneto-Resistive) effect. The reproduction sensor element 12 may include a sensor utilizing a STO (Spin Torque Oscillator) effect. The reproduction sensor element 12 may be of a $Co_2Fe\,(Al_{0.5}Si_{0.5})/Ag/Co_2Fe\,(Al_{0.5}Si_{0.5})$ scissors sensor type in which Heusler alloy films are layered, or a differential type. The element width $T_{wr}$, the element height $H_s$, and the magnetic shield interval $G_s$ (reproduction gap) of the reproduction sensor element 12 may be designed and processed in accordance with a desired recording track density or recording density. For example, $T_{wr}$ is on the order of 50 nm to 5 nm. A reproduction output terminal is not illustrated.

The recording head unit 20, which is one of the most important parts of the present embodiment, includes first and second recording magnetic poles 22 and 24 for producing a strong and uniform STO oscillation control magnetic field (hereafter referred to as "oscillation control magnetic field") 26 and a recording field 21 at the write gap portion 25; a high-frequency magnetic field oscillator unit (STO) 40 disposed in the write gap 25 for controlling the rotation direction and oscillation frequency and the like of a high-frequency magnetic field 45 via an oscillation control magnetic field 26; and a coil 23 for magnetizing the recording magnetic poles, for example. The first and second recording magnetic poles 22 and 24 have a substantially magnetically symmetrical ring-type structure with a greater volume in the vicinity of the write gap portion 25. While the coil 23 is a Cu thin film and the like wound around the recording magnetic pole 24 according to the present embodiment, the coil 23 may be formed around a rear-end portion 27 of the recording magnetic pole or the first recording magnetic pole 22. The coil 23 may include a multi-layer winding. The write gap 25 may be formed with a non-magnetic thin film, such as an $Al_2O_3$, $Al_2O_3$—$SiO_2$ film, by sputtering or CVD process.

According to the present embodiment, in order to ensure a uniform and strong magnetic field in the write gap, the magnetic poles have a magnetic layer film thickness of 40 nm to 3 μm in the vicinity of the gap portion. The write gap length $G_L$ is determined in view of the thickness of the STO 40; the uniformity and intensity of the STO oscillation control magnetic field 26 in the write gap; the intensity and write field gradient of the recording field 21; the track width; and the gap depth $G_d$, for example. The gap depth $G_d$ may be greater than the track width or gap length of the recording magnetic pole from the viewpoint of magnetic field uniformity. According to the present embodiment, the track width of the first recording magnetic pole 22 on the trailing side (rearwardly of the head travel direction) is 40 to 250 nm and more preferably 50 to 100 nm; the gap depth is 40 to 700 nm and more preferably 50 to 500 nm; and the gap length is 20 to 200 nm and more preferably 30 to 80 nm. In order to increase frequency response, the yoke length YL and the number of coil turns may preferably be minimized, such as on the order of 0.5 to 10 μm and 2 to 8 turns, respectively. Particularly, for a magnetic head of a high-speed transfer compatible magnetic recording apparatus for servers or enterprise purposes, the yoke length may be 0.5 μm or more and 4 μm or less and more preferably not more than 2 μm, and the magnetic head may have a multi-layer structure in which magnetic thin films with high-saturation magnetic flux density are layered via a magnetic or non-magnetic intermediate layer with high specific resistance as needed.

The first recording magnetic pole 22 may be formed as a single-layer or multi-layer film from a soft-magnetic film with high-saturation magnetic flux density of FeCoNi, CoFe, a NiFe alloy and the like through a thin film forming process, such as plating, sputtering, or ion beam deposition. The width $T_{WW}$ of the recording element may be designed in accordance with a desired recording field or recording density and obtained by a semiconductor process. For example, the width is on the order of 200 nm to 30 nm. The magnetic pole in the vicinity of the write gap portion may have a flat film structure parallel to the write gap surface, or surround the STO 40. Preferably, in order to increase the recording field intensity, a high-saturation magnetic flux material may be used in the vicinity of the write gap portion and formed to become narrower toward the write gap portion. The second recording magnetic pole 24 is also formed from a soft-magnetic alloy thin film of a CoNiFe alloy or a NiFe alloy, for example, as in the first recording magnetic pole 22, with a controlled shape.

Figure 4:
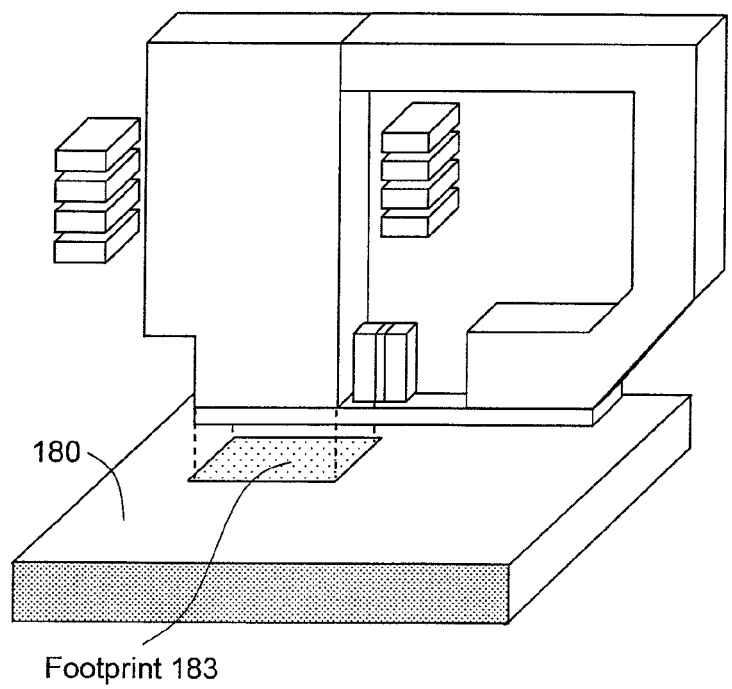
FIG. 4 illustrates the foot print of a main magnetic pole type magnetic head.
Figure 5:
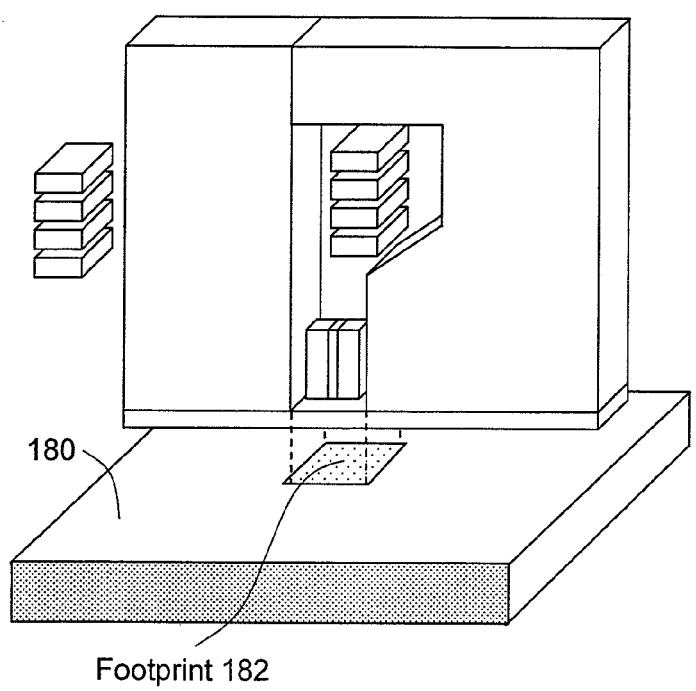
FIG. 5 illustrates the foot print of a ring-type recording head.

In a conventional main magnetic pole type magnetic head, as described above, the recording field is concentrated at the main magnetic pole such that magnetic recording is determined by the main magnetic pole. As illustrated in FIG. 4, when a recordable perpendicular magnetic recording medium 180 is recorded statically, the resultant mark of recording (magnetization reversal region; foot print; or recording bubble) 183 has a shape substantially corresponding to the shape of the main magnetic pole. In contrast, in the ring-type longitudinal recording head according to the present embodiment, the recording field is concentrated at the write gap portion such that magnetic recording is determined by the write gap. Thus, as illustrated in FIG. 5, when the recordable perpendicular magnetic recording medium 180 is statically recorded, the resultant mark of recording; i.e., the foot print 182, has substantially the shape of the write gap.

According to the present embodiment, as described above, the magnetic pole structure is such that the recording field is concentrated at the write gap portion. Thus, as will be described in detail later, a strong and uniform magnetic field which is indispensable for efficient oscillation of the STO (FGL) can be obtained in the gap. Accordingly, the oscillation performance and recording assist effect of the STO 40 can be significantly increased compared with the conventional main magnetic pole type head structure. Further, while the size and volume of the main magnetic pole of the main magnetic pole type magnetic head needs to be decreased so that finer recording can be performed, recording can be determined by the write gap portion in the case of the ring-type magnetic pole, so that the volume of the magnetic pole can be increased with no limit in the thickness direction of the magnetic pole and therefore the recording field intensity can be increased. Further, as will be described in detail later, the polarity in the write gap can be well matched with the STO, so that the recording field and the high-frequency magnetic field can be effectively superposed with each other with respect to the perpendicular magnetic recording medium and thereby narrow track recording can be performed, which is particularly preferable.

The high-frequency oscillator unit (STO) 40 includes a high-frequency magnetic field generation layer FGL 41 of a soft-magnetic alloy such as FeCo or NiFe, a hard magnetic alloy such as CoPt or CoCr, a magnetic alloy with a negative perpendicular magnetic anisotropy energy such as $Fe_{0.4}Co_{0.6}$, $Fe_{0.01}Co_{0.99}$, or $Co_{0.8}Ir_{0.2}$; a Heusler alloy such as CoFeAlSi, CoFeGe, CoMnGe, CoFeAl, CoFeSi, or CoMnSi; a Re-TM amorphous alloy such as TbFeCo; or a magnetic super-lattice such as Co/Fe, Co/Ir, Co/Ni, or CoFeGe/CoMnGe. The high-frequency oscillator unit (STO) 40 further includes an intermediate layer 42 of a non-magnetic conductive material such as Au, Ag, Pt, Ta, Ir, Al, Si, Ge, Ti, Cu, Pd, Ru, Cr, Mo, or W, and a spin injection layer 43 for providing spin torque to the high-frequency magnetic field generation layer FGL. Except for special cases, current is caused to flow from the spin injection layer side of the STO by a DC (direct current) power supply (voltage drive or current drive) 44 so as to drive FGL microwave oscillation. By using a material with perpendicular magnetic anisotropy energy in the spin injection layer, oscillation of the FGL can be stabilized. For example, a magnetic super-lattice thin film material such as Co/Pt, Co/Ni, Co/Pd, CoCrTa/Pt, or CoPt/Pd may be preferably used. While oscillation stability may be slightly lost, the same material as that of the FGL may also be used.

While omitted in FIG. 1, in order to control the film quality/film characteristics of the spin injection layer or the high-frequency oscillation layer, or to increase oscillation efficiency and reliability, an underlayer or a cap layer of a single-layer thin film or an alloy thin film of Cu, Pt, Ir, Ru, Cr, Ta, or Nb, for example, or a layered thin film thereof, may be provided. Because the STO is formed after the reproduction element is formed, the process of forming the STO should preferably not adversely affect the characteristics of the reproduction element. While in FIG. 1 the drive current source (or voltage source) and a pair of electrodes are schematically designated by the numeral 44, the recording magnetic poles 22 and 24 may be magnetically coupled but electrically insulated via the recording head rear-end portion 27 and each may be electrically connected to the sides of the STO in the gap portion such that the recording magnetic poles 22 and 24 can also function as the electrodes.

The material, configuration, and magnetic anisotropy energy of the respective magnetic layers may be determined such that the spin injection efficiency, high-frequency magnetic field intensity, oscillation frequency, and the effective magnetic anisotropy energy including a demagnetization field can be most suitable for the high-frequency oscillation and microwave assisted recording. For example, the saturation magnetization $M_s$ of the FGL may preferably be increased because increasingly higher frequency magnetic field can be obtained in proportion to the saturation magnetization of the FGL. Further, while a greater film thickness provides a higher high-frequency magnetic field, too much thickness may tend to disturb magnetization. Thus, the film thickness may be preferably 1 to 100 nm, more preferably 5 to 40 nm, and further more preferably 7 to 25 nm. With regard to the element size, when a strong STO oscillation control magnetic field on the order of 8 to 9 kOe or more is applied, uniform rotation of the FGL magnetization in film plane can be induced and the STO can stably oscillate whether the material is a soft-magnetic material, a hard magnetic material, or a negative perpendicular magnetic anisotropy energy material as long as the size of the FGL element is approximately 100 nm or smaller. The width $W_{FGL}$ of the FGL 41 may be designed and processed in accordance with the desired recording field or recording density. By the ring-type magnetic pole according to the present embodiment, a magnetic field on the order of 8 to 9 kOe or more can be readily obtained in the write gap. Thus, the size of the FGL element may be 100 nm to 3 nm. When the FGL element size is on the order of 40 nm or less, development of a magnetic domain structure can be suppressed. Thus, the element size may be more preferably 40 nm to 5 nm. When the width is less than 3 nm, the influence of thermal fluctuation or the element side surface increases, resulting in unstable oscillation. When combined with shingled write recording (SWR) as will be described later, $W_{FGL}$ may be preferably 2 to 3 times the recorded track width.

In order to obtain high spin injection efficiency, the film thickness of the non-magnetic intermediate layer 42 is preferably on the order of 0.2 to 4 nm. For the spin injection layer 43, because oscillation of the FGL can be stabilized by using a material with perpendicular magnetic anisotropy energy, a magnetic super-lattice material such as Co/Pt, Co/Ni, Co/Pd, or CoCrTa/Pd may preferably be used. Oscillation is stabilized when the film thickness is 5 to 100 nm and more preferably 5 to 40 nm. Further, in order to stabilize the high-frequency magnetization rotation of the FGL 41, a rotation guide ferromagnetic layer with a configuration similar to that of the spin injection layer 43 may be disposed adjacent to the FGL 41. The order in which the spin injection layer 43 and the FGL 41 are layered may be reversed.

(Effect)

The high-frequency magnetic field from the FGL 41 most strongly interacts with the magnetization at the uppermost surface of the perpendicular magnetic recording medium, thus assisting magnetization reversal. Thus, the state of the high-frequency magnetic field at the uppermost surface of the perpendicular magnetic recording medium will be described first.

Figure 6:
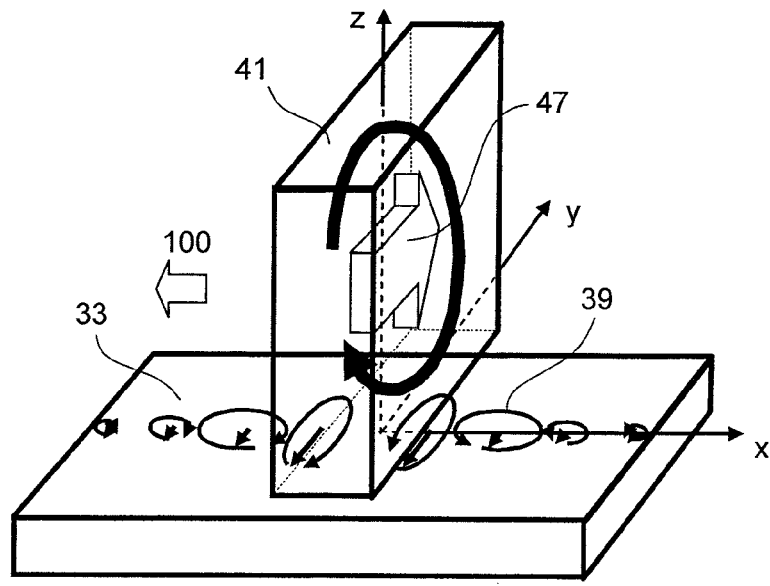
FIG. 6 illustrates the rotation direction of the high-frequency magnetic field from a high-frequency magnetic field generating element.
Figure 7:
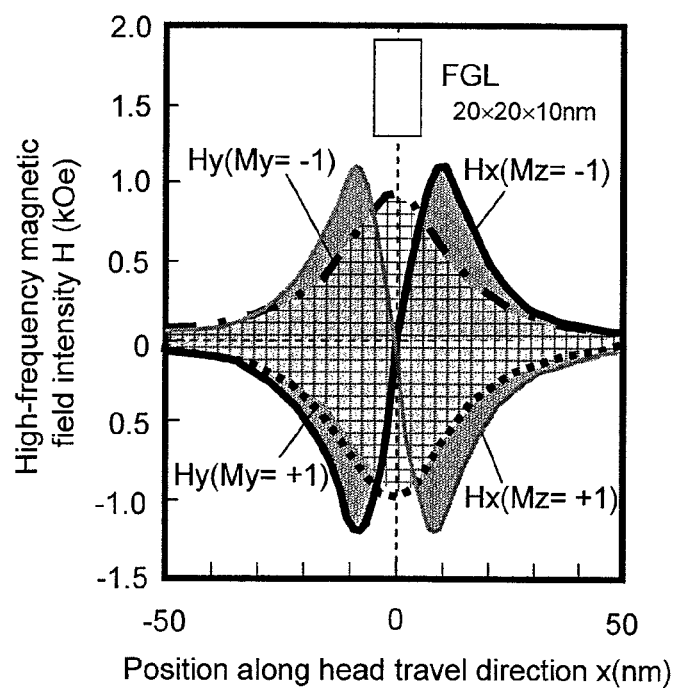
FIG. 7 illustrates the position dependency of the high-frequency magnetic field intensity.

FIGS. 6 and 7 illustrate the result of analysis by magnetic field calculation in an example in which the FGL 41 including a Co/Fe film with a film thickness of 10 nm, a width of 20 nm, and a height of 20 nm was disposed above the surface of the uppermost magnetic layer 33 of the perpendicular magnetic recording medium by 4 nm, and the high-frequency magnetic field was generated by rotating the magnetization 47 (saturation magnetization $M_s$: 2.3 T) at high speed. FIG. 6 shows the result of analysis of the direction of rotation of the high-frequency magnetic field 39 to which the medium magnetization is subjected at respective positions on the uppermost surface of the magnetic layer of the perpendicular magnetic recording medium. FIG. 7 illustrates the result of analysis regarding the position x dependency of the magnetic field intensity maximum value. These results may be understood as follows.

When the magnetization 47 of the FGL is oriented upward (+z-direction) (a state of Mz=+1 in FIG. 6), a leftward strong x-component magnetic field is generated at the medium position to the right of the FGL, while a rightward strong x-component magnetic field is generated at the medium position to the left of the FGL ($H_x$(Mz=+1) in FIG. 7). Then, when the magnetization 47 is rotated by 90° and oriented toward the back (+y-direction) (My=+1 in FIG. 6), a strong forward (−y-direction) y-component magnetic field is generated at the medium position immediately under the FGL ($H_y$(My=+1) in FIG. 7). When the magnetization 47 is further rotated by 90° and oriented downward (−z-direction), the magnetic field direction is reversed from the upward magnetization and an x-component magnetic field is generated ($H_x$(Mz=−1) in FIG. 7). Finally, when the magnetization 47 is further rotated by 90° and oriented forward (−y-direction), a strong backward (+y-direction) y-component magnetic field is generated at the medium position immediately under the FGL ($H_y$(My=−1) in FIG. 7). The z-component magnetic field is omitted as it does not contribute to much the assist effect as a rotating magnetic field.

Thus, as the magnetization M of the FGL is rotated as illustrated in FIG. 6, high-frequency magnetic fields with different rotation directions are generated at the regions to the left and right of the FGL. Accordingly, the direction of medium magnetization that can assist magnetization reversal differs between the left and right regions with respect to the FGL, and therefore the head needs to be designed with particular care, as will be discussed later. Further, it will be seen quantitatively from FIG. 7 that strong high-frequency assist magnetic fields $H_x$ and $H_y$ are generated in the immediate vicinity of the sides of the FGL, in areas of one or twice the film thickness.

Thus, it has been learned that the assist effect can be obtained only in a very narrow region on the order of the film thickness on both sides of the FGL element. Accordingly, the positional relationship between the recording magnetic pole and the FGL needs to be determined in view of the above insight such that the greatest assist effect can be obtained, as will be described below.

Figure 8:
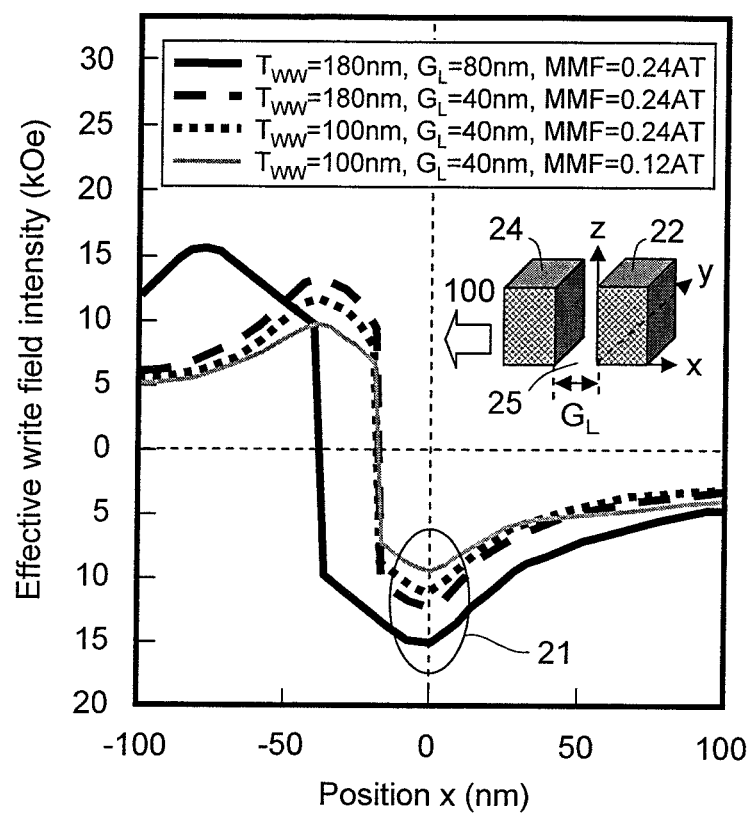
FIG. 8 illustrates the position and magneto-motive force dependency of the effective recording field intensity of the microwave assisted magnetic head according to an embodiment.

FIG. 8 illustrates the position and magneto-motive force (MMF) dependency of the effective recording field intensity of the ring-type longitudinal recording head according to the present embodiment, in which the switching efficiency of the recording field is reflected in view of the angle dependency (FIG. 3) of the switching field of the perpendicular magnetic recording medium. The MMF is the product of the write current and the number of turns of coil.

Figure 9:
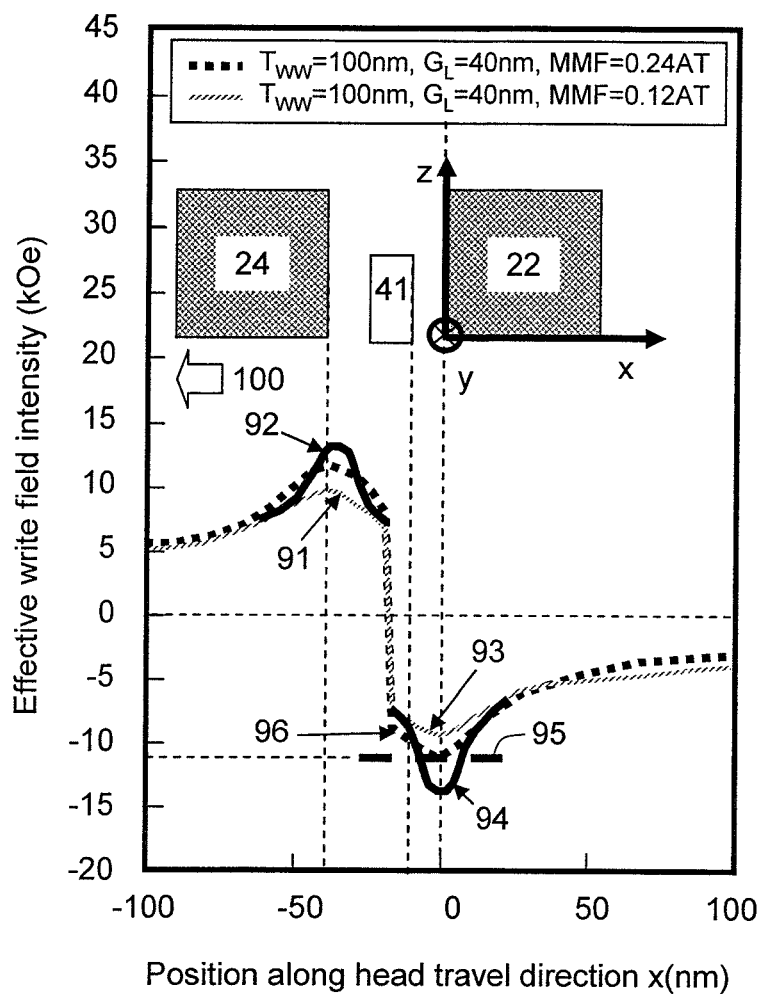
FIG. 9 illustrates the effect of superposition of the effective recording field and the effective high-frequency magnetic field in the microwave assisted magnetic head according to an embodiment.

The high-frequency oscillation magnetic field from the FGL also has opposite polarities of the assist magnetic field (and its effect) between the front and rear sides of the FGL as described above, and the both can be clearly superposed upon each other according to the present embodiment. In the ring-type magnetic pole structure according to the present embodiment, the recording magnetization state is finalized by the recording field on the trailing side of the magnetic head. Thus, it is important to fine-adjust the position of the FGL (STO) such that the high-frequency oscillation magnetic field becomes the strongest at that position. Namely, the position at which the $H_x$ and $H_y$ (more desirably the effective magnetic field) of the high-frequency magnetic field component from the FGL is at a maximum and the position at which the intensity of the effective recording field from the recording magnetic pole is at a maximum may preferably be aligned with each other. This may be achieved by setting the write gap length to be two to five times the FGL film thickness, and installing the FGL of an appropriate material, film thickness, track width, and element height at substantially the center of the write gap in accordance with the required recording field intensity, the spin injection layer, or underlayer film thickness, for example. Such an example is illustrated in FIG. 9. This effect will be described in detail later.

Further, a LLG simulation shows that, in order to allow a strong high-frequency magnetic field to be efficiency generated, the FGL 41 may preferably have a film thickness of 1 to 100 nm and more preferably 5 to 40 nm. It has been also learned that the element width and element height may preferably be substantially the same so that a magnetic domain structure is not readily formed and a stable magnetization rotation can be achieved, and that the oscillation control magnetic field 26 applied to the STO 40 may preferably be perpendicular to the STO and uniform in the plane.

Figure 10:
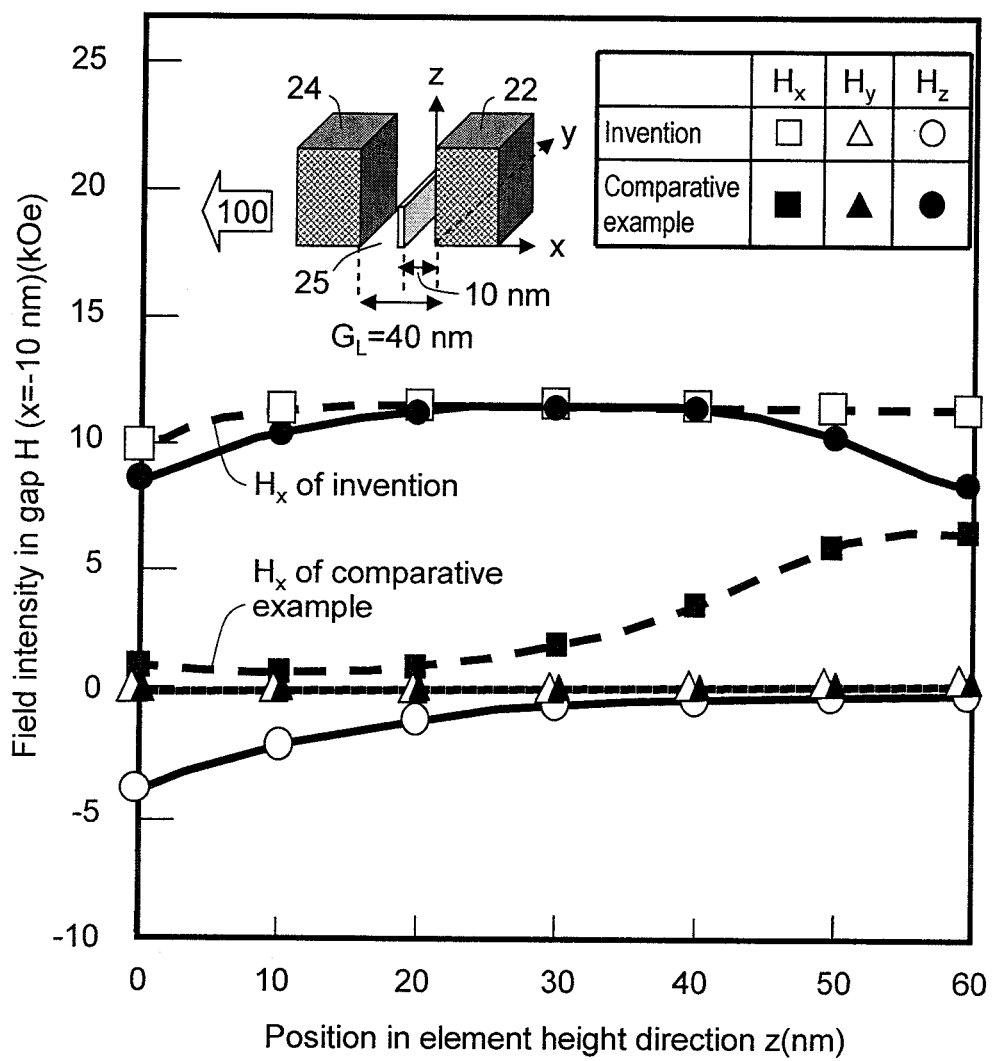
FIG. 10 illustrates a comparison of the magnetic field distribution in the write gap of the microwave assisted magnetic head according to an embodiment with a comparative example.
Figure 11:
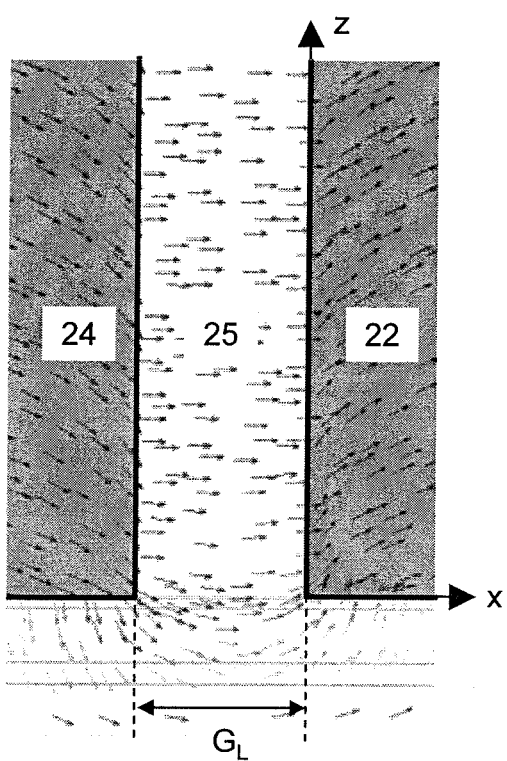
FIG. 11 illustrates the magnetic field distribution in the write gap of the microwave assisted magnetic head according to an embodiment.

FIGS. 10 and 11 illustrate a magnetic field distribution at the write gap portion of the ring-type magnetic core according to the present embodiment as calculated by simulation. From FIG. 11, it will be seen that the recording field is horizontal in the write gap portion and perpendicular to the STO film in the write gap, and that the magnetic field intensity $H_x$ in the write gap direction is highly uniform. Although the effects of the $H_x$ and $H_y$ of the high-frequency magnetic field influencing the microwave assisted recording differ somewhat, the concept for optimizing the assist effect is the same. Thus, in the following, the high-frequency magnetic field $H_x$ will be described as an example for simplicity's sake.

With regard to the high-frequency magnetic field $H_x$, the strongest value is obtained at a position spaced apart from the FGL by a distance on the order of the film thickness (FIG. 7). Thus, in order to obtain the highest effective write field gradient, this position may preferably be aligned with the position at which the effective recording field is the strongest (x=0 in FIG. 8), as described above. Thus, in an example in which the STO element was disposed at the position x of approximately −10 nm, the element depth z-direction dependency of the magnetic field intensity at this position was investigated. In the present example, it is quantitatively seen that the magnetic field $H_x$ in the write gap that corresponds to the STO oscillation control magnetic field 26 is stronger than that of the main magnetic pole type magnetic head according to a comparative example by approximately an order of magnitude, that the magnetic field $H_x$ is substantially perpendicular to the plane of x=−10 nm, and that the intensity distribution is highly uniform compared with the comparative example. For example, when the FGL element height is 40 nm, the distribution of $H_x$ in the magnetic pole structure according to the example is 11%, which is one fifth of the 55% in the structure according to the comparative example. Thus, in the ring-type longitudinal recording head according to the present embodiment, the magnetization rotation of the STO disposed in the write gap is significantly more uniform in the STO film than according to the conventional head, so that highly stable oscillation can be obtained.

Further, as will be easily seen from the recording field vector illustrated in FIG. 11, in the ring-type longitudinal recording head according to the present embodiment, the recording field is oriented in substantially the x-axis direction substantially uniformly in the entire region of x=−10 to −20 nm corresponding to the film thickness of the FGL in the write gap 25, so that the magnetic field can be applied perpendicularly within the range of plus or minus several degrees with respect to the FGL film surface. In contrast, in the conventional main magnetic pole type magnetic head, the magnetic field direction is sharply changed in the area of x=−10 to −20 nm. While the recording field becomes closer to being perpendicular to the FGL film surface with increasing distance from the recording magnetic pole, on average the recording field is inclined toward the -z-direction by 10° to 20°. When the magnetic field applied to the STO is shifted from the perpendicular direction with respect to the film surface by 10° or more, the magnetization rotation direction of the FGL layer is inclined and the high-frequency oscillation magnetic field is decreased to approximately one half or less. Thus, the ring-type magnetic pole according to the present embodiment can provide approximately twice as much oscillation magnetic field intensity as that of the conventional main magnetic pole type magnetic head. This is extremely significant for microwave assisted recording, in which the high-frequency oscillation magnetic field intensity plays an extremely important role. Thus, it has been confirmed that in the ring-type magnetic pole structure according to the present embodiment, the STO can more stably oscillate than according to the conventional structure, and that approximately twice as strong a high-frequency magnetic field can be generated. Accordingly, the ring-type magnetic pole structure according to the present embodiment is particularly suitable for microwave assisted recording.

It will be seen from FIG. 8 that the absolute value of the effective recording field of the magnetic head according to the present embodiment increases as the write gap length $G_L$, the magneto-motive force MMF, or the track width $T_{WW}$ is increased. According to the present embodiment, the write gap length $G_L$ is in the range of 20 to 150 nm in view of the features of the magnetic field in the write gap, uniformity, and the thickness of the STO, for example.

Figure 35:
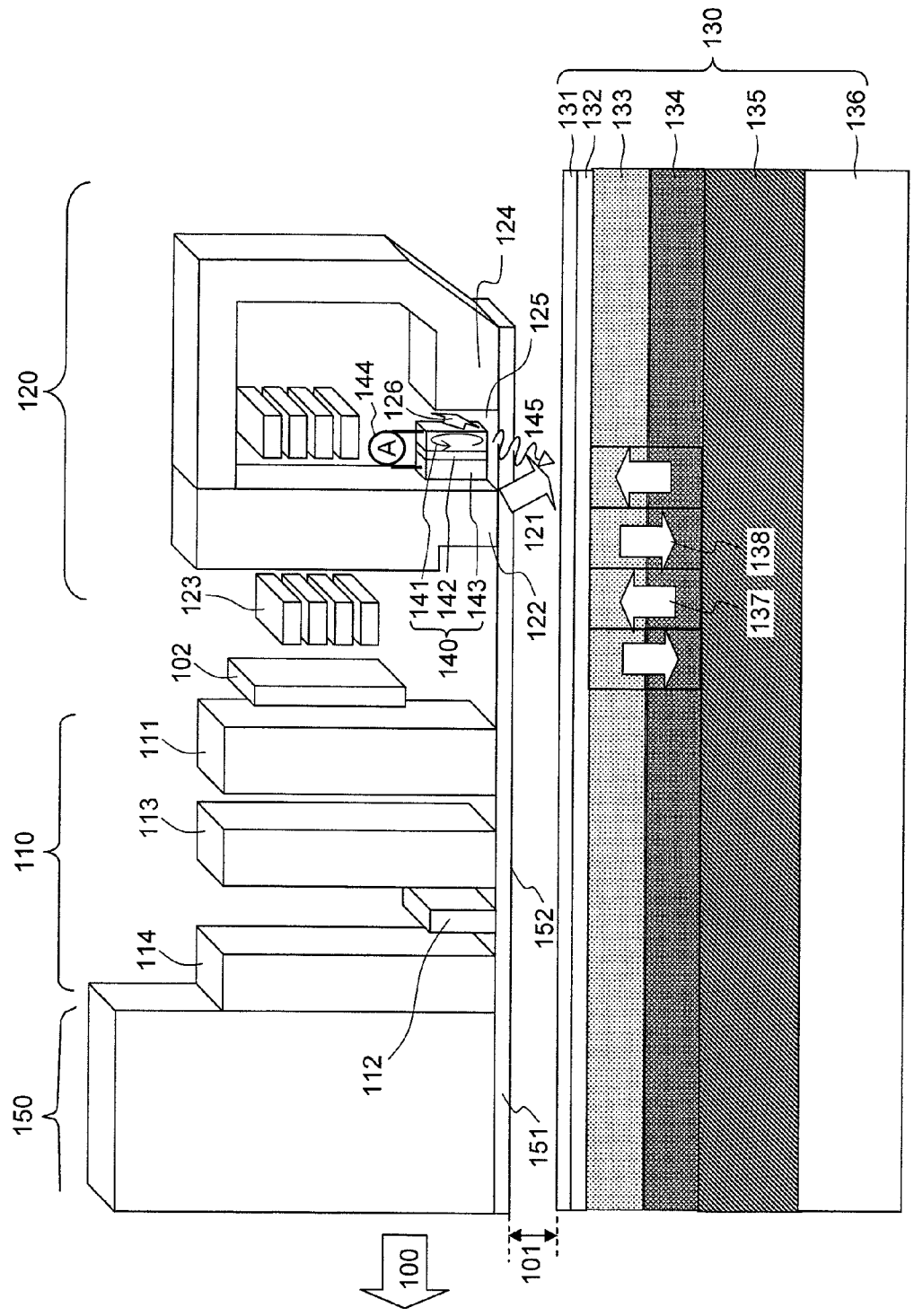
FIG. 35 illustrates the structure of a main magnetic pole type microwave assisted magnetic head and a perpendicular magnetic recording medium according to related art.

As described above, according to the magnetic head of the present embodiment, the STO oscillation control magnetic field 26 can be applied to the STO in a significantly better manner compared with the conventional main magnetic pole type magnetic head. Trial production and evaluation of a microwave assisted recording head according to the present embodiment showed that the variation in oscillation characteristics was small and that strong high-frequency oscillation characteristics can be obtained with a yield higher than in the case of a combination with a conventional main magnetic pole type magnetic pole by 20 to 30 points. Further, in the microwave assisted magnetic head according to the present embodiment, the in-gap magnetic field $H_x$ corresponding to the STO oscillation control magnetic field 26 was stronger than that according to the conventional microwave assist head (comparative example) illustrated in FIG. 35 by approximately an order of magnitude. Thus, in a combination with the STO of the present structure, a high-frequency microwave oscillation magnetic field of 25 to 30 GHz or higher, which is higher than in the case of a combination with the conventional main magnetic pole type magnetic pole by 10 GHz or more, can be readily induced. Accordingly, the microwave assisted recording head of the magnetic pole structure according to the present embodiment in combination with the present STO has a high $H_k$ and is particularly suitable as a recording head for a high coercive force perpendicular magnetic recording medium which requires high-frequency microwave assist.

[Second Embodiment]

In the present embodiment, a detailed example of the magnetic head according to the first embodiment will be described.

Figure 38:
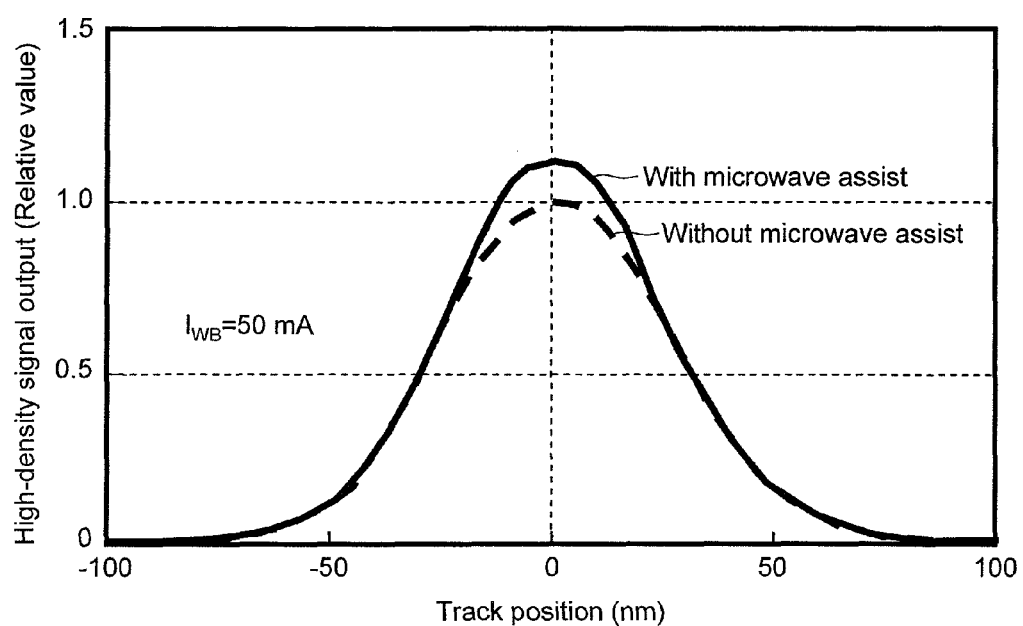
FIG. 38 illustrates the effect of assisted recording by the conventional microwave assisted magnetic head with respect to the recorded track profile of a conventional perpendicular magnetic recording medium.
Figure 39:
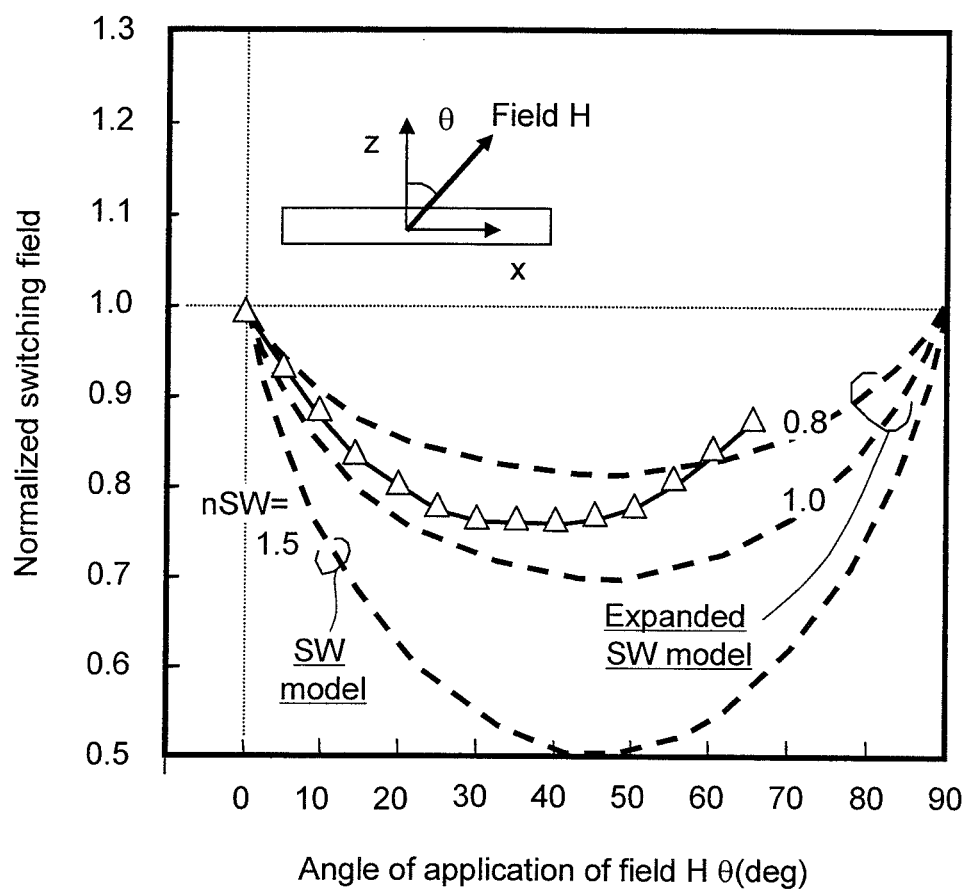
FIG. 39 illustrates the applied magnetic field angle dependency of the switching field $H_{sw}$ in a conventional ECC medium.

As described in the Summary with reference to FIG. 38, in the conventional magnetic head, the magnetization of the perpendicular magnetic recording medium is reversed immediately under the main magnetic pole, particularly in a region in the vicinity of the side of the main magnetic pole that is under the strong influence of the demagnetization of the field perpendicular magnetic recording medium such that recording takes place even only with the magnetic field from the main magnetic pole. As a result, the recorded track width is determined by the magnetic field width from the main magnetic pole, and desired narrow track magnetic recording cannot be performed even by microwave assisted magnetic recording. Thus, according to the present embodiment, attention is focused on important parameters of the perpendicular magnetic recording medium, such as the crystal magnetic anisotropy field $H_k$, the saturation magnetization $M_s$, the coercive force $H_c$, the damping constant $\alpha$, the crystallographic grain size, orientation, dispersion of $H_k$ or grain size, and grain boundary segregation state. Then, a high coercive force configuration is adopted in which the layer configurations and magnetic characteristics are controlled by adjusting material, film deposition process, film thickness, intermediate layer, underlayer, additives and the like such that sufficient recording does not take place with the conventional main magnetic pole type magnetic head or the recording magnetic pole according to the embodiment but sufficient recording can be performed only when the recording field from the STO is applied in a superposed manner. In the following, a magnetic recording magnetization process of the magnetic head according to the embodiment and the effect of narrow track recording with respect to the high coercive force perpendicular magnetic recording medium, for example, will be described.

First, the effective recording field from the recording magnetic pole and the STO (FGL) of the magnetic head according to the present structure was determined by simulation. FIG. 9 illustrates the structure of the microwave assisted magnetic recording head according to the present embodiment in which the FGL 41 with a film thickness of 15 nm is disposed in the gap portion 25 of the recording head with a track width $T_{WW}$=100 nm and a gap length $G_L$=40 nm, at a position spaced apart from the first recording magnetic pole 22 by 10 nm. The effective recording field obtained when the magnetic head was driven with a magneto-motive force (MMF) of 0.12 AT and an FGL magnetic field of 1.3 kOe is illustrated.

Figure 40:
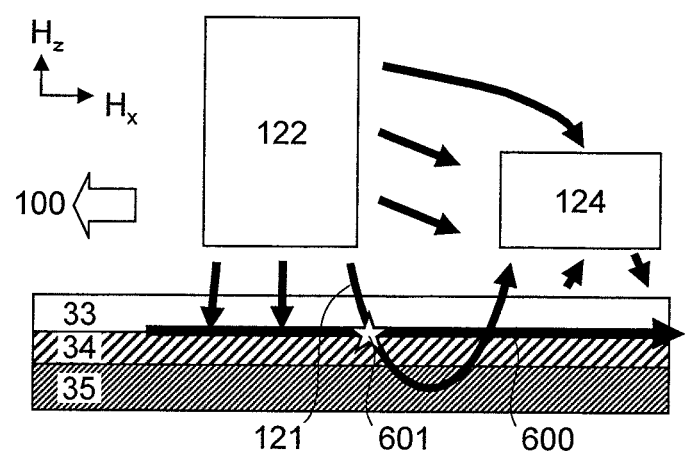
FIG. 40 schematically illustrates the magnetic field in the vicinity of the write gap portion of a conventional main magnetic pole type magnetic head.

In the present magnetic head, recording fields with different polarities are applied across the center of the gap as a boundary. Thus, an opposite recording field 91 is initially applied by the second recording magnetic pole 24, and therefore no magnetization reversal occurs at the main magnetic pole with the help of the demagnetization field from the perpendicular magnetic recording medium, as in the case of the magnetic head according to the comparative example illustrated in FIG. 40. Further, as illustrated in FIG. 9, an assist magnetic field 92 from the FGL also supports in a synchronized manner in preventing "spontaneous" reversal of magnetization. This means that, prior to the desired reversal occurs, the medium magnetization is aligned in a direction in which the greatest assist effect can be obtained, so that overwriting can be advantageously performed under certain conditions regardless of history, as opposed to the case of the conventional main magnetic pole type.

Furthermore, in the head according to the present embodiment, the magnetic field intensity is high compared with the conventional main magnetic pole type head such that the delay time before the FGL can re-oscillate by changing the rotation direction in accordance with a change in the recording polarity of the recording field can be decreased, which is preferable in narrowing the magnetization transition length. Thus, in the magnetic head according to the present embodiment, as the head travels in the direction 100, the FGL disposed in the write gap portion 25 can apply an assist magnetic field 94 effectively and instantaneously which promotes magnetization reversal in a desired direction (downward in FIG. 9) in synchronism with the recording field 93 from the first recording magnetic pole 22. Thus, narrow-track and high-S/N overwriting and magnetic recording can be implemented by the sharp "magnetic field assisted microwave recording".

In the ring-type recording head according to the present embodiment, the recording field is substantially saturated when the magneto-motive force reaches approximately 0.12 AT, as illustrated in FIG. 8. Thus, the recording field is increased only by approximately 20% even by doubling the magneto-motive force to 0.24 AT. In the following, a specific adjustment procedure that utilizes this feature will be described.

First, (i) a critical magneto-motive force (a critical write current value is $I_{WC}$ (0)) that gives a critical effective recording field 96 as a lower limit value for allowing the perpendicular magnetic recording medium to be recorded only with the ring-type longitudinal recording head is determined, and a bias magneto-motive force (0.12 AT in the present example; a bias write current value is $I_{WB}(0)$) smaller than the critical magneto-motive force by a predetermined amount is set. Even when the ring-type longitudinal recording head is magnetized with the bias write current, the perpendicular magnetic recording medium cannot be substantially recorded. The switching characteristics of the perpendicular magnetic recording medium illustrated in FIG. 3 are average values of the macroscopic characteristics of the perpendicular magnetic recording medium as a whole. In magnetic recording in a fine region of the recording track on the order of several tens of nanometers, the switching field has a distribution due to the characteristics distribution on a crystallographic grain basis. Thus, in a recording and reproducing experiment, it may be considered that a maximum output is not obtained by recording with the critical write current but a large reproduction output suddenly starts to be obtained.

After the above adjustments, (ii) a predetermined STO magnetization current $I_{STO}$ is applied to the STO, the ring-type longitudinal recording head is energized with the bias write current, and the high-frequency magnetic field 94 is superposed with the bias effective recording field 93, whereby an effective recording field (93+94) which is greater than the switching field 95 of the perpendicular magnetic recording medium is applied thereto, thus performing sharp magnetic recording.

(iii) Preferably, the difference between the critical effective recording field 96 and the bias effective recording field 93 may be smaller than the effective value 94 of the high-frequency assist magnetic field from the FGL, such as on the order of ½. The write current may include an overshoot; in this case, the current value may be the maximum value of the overshoot.

Meanwhile, in the conventional main magnetic pole type magnetic head structure, the recording field intensity is small because of the relatively small volume of the main magnetic pole. Further, in a write current region where the recording field is substantially saturated, the recording field is hardly increased even when the magneto-motive force is increased; conversely, the recording field may leak out from other positions of the magnetic pole. As a result, the information on a recording track in proximity to the magnetic pole position at which the leakage of recording field is occurring is degraded (ATI: Adjacent Track Interference, FTI: Far Track Interference), so that the complementary optimization as according to the present embodiment can hardly be achieved.

Thus, in the case of the high coercive force perpendicular magnetic recording medium and the magnetic head according to the present embodiment, the switching field of the high coercive force perpendicular magnetic recording medium, the recording field, and the high-frequency recording field are adjusted such that the switching field 95 of the high coercive force perpendicular magnetic recording medium can be located at substantially the center of the superposed effective recording field of the effective recording field 93 and the high-frequency assist magnetic field 94. Because magnetic recording can be performed by applying the sharp high-frequency assist magnetic field from the STO to the strong bias magnetic field from the ring-type magnetic core, narrow track magnetic recording far superior to the related art can be performed. Further, in the magnetic head according to the present embodiment, the difference between the maximum value of the effective recording field and the recording finalizing magnetic field is small (FIG. 3), so that the influence of recording blurring is small, which is preferable from the viewpoint of achieving a narrow track recording. Furthermore, by using the FGL with proper material, structure, film thickness and the like, an extremely high write field gradient on the order of 3 kOe/nm can be obtained, so that extremely high S/N can be advantageously achieved.

In the foregoing, the recording magnetization process has been discussed while mainly focusing on the trajectory of the recording head magnetic field vector. A detailed analysis requires discussion of the switching characteristics of the medium magnetization and the asteroid curve in the state in which microwave assist is being applied. From the result of calculation by simulation in FIG. 12, it is seen that when the high-frequency magnetic field of the order of 1 to 1.2 kOe or more is applied, the absolute value of the switching field of the perpendicular magnetic recording medium can be substantially minimized when the direction of application of the external magnetic field is on the order of 30°±15°. Meanwhile, in the case of the effective magnetic field from the ring-type longitudinal recording head magnetic pole according to the present embodiment, the switching field is substantially minimized at 45°±15° (225°±15)°, as illustrated in FIG. 3. Thus, in view of the fact that the residual magnetization is finalized in a very small region to which a magnetic field at an angle centered at 30° to 60° is applied, the foregoing overall understanding based on the trajectory of the magnetic field vector of the recording head may be considered correct. According to the present embodiment, it has also been confirmed that, through an LLG simulation that was performed in parallel in which the above assumptions were not employed, the above concept correctly and quantitatively represents the essential matter.

Figure 13:
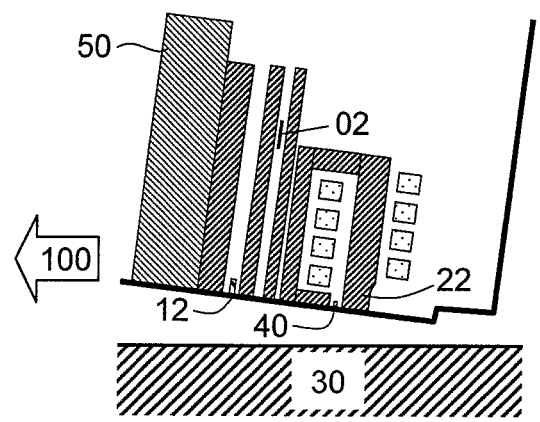
FIG. 13 illustrates an example of a combination of a high coercive force perpendicular magnetic recording medium and the microwave assisted magnetic head according to an embodiment.
Figure 14:
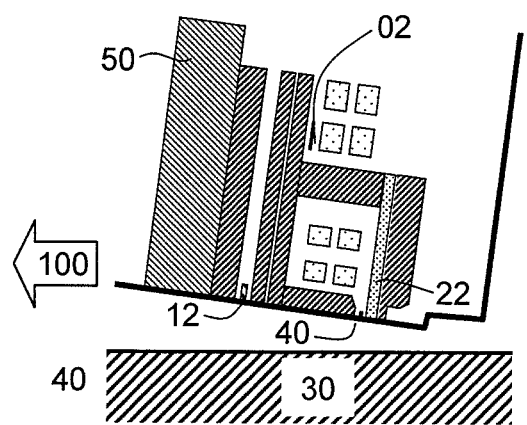
FIG. 14 illustrates an example of a combination of the high coercive force perpendicular magnetic recording medium and the microwave assisted magnetic head according to an embodiment.
Figure 15:
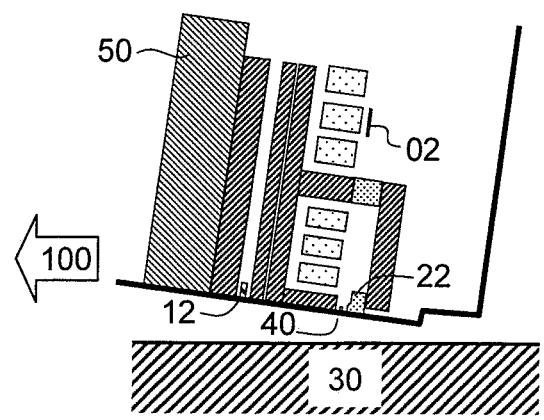
FIG. 15 illustrates an example of a combination of the high coercive force perpendicular magnetic recording medium and the microwave assisted magnetic head according to an embodiment.

FIGS. 13 to 15 are schematic cross sectional views of examples of the magnetic head of the magnetic recording apparatus according to the present embodiment and the perpendicular magnetic recording medium 30. The magnetic head is mounted on the femto slider 50 with a width of 0.7 mm. Regarding the ring-type magnetic pole of the recording unit, major portions of the first magnetic pole and the second recording magnetic pole 24 are made of FeCoNi, with various recorded track widths $T_{WW}$. In the magnetic heads illustrated in FIGS. 14 and 15, the magnetic material of the first recording magnetic pole 22 is changed from FeCoNi to CoFe in the vicinity of the write gap portion. For clearance control, the TFC 02 of a W (tungsten)-thin film with a resistance 100Ω is disposed as illustrated. The head protection film 51 is FCAC (1 nm) in each case. The perpendicular magnetic recording medium 30 includes the soft-magnetic underlayer of a CoFeTaZr soft-magnetic thin film formed on the substrate via a Ru intermediate layer by sputtering, on which there are further formed a Ru layer (10 nm) as an orientation/crystallographic grain size control layer; a two-layer or single-layer magnetic layer; a C-overcoat layer; and a lubricant layer. The details of the apparatuses are as follows.

(1) Configuration of the magnetic recording apparatus illustrated in FIG. 13
  Slider 50: Femto type (0.85×0.7×0.23 mm)
  Sensor element 12: TMR ($T_{wr}$=20 nm)
  First recording magnetic pole 22: FeCoNi ($T_{ww}$=100, 80 nm)
  STO 40: CoFeGe (10 nm)/Cu (2.5 nm)/Co/Ni (10 nm)
  FGL width: $W_{FGL}$=24 nm
  Medium substrate: 3.5 inch NiP-plated Al alloy substrate
  Medium structure: Lubricant layer (1 nm)/C (1.2 nm)/ CoCrPt(SiTi)O$_2$C(2 nm)/CoCrPtSiO$_2$C (10 nm)/Ru (10 nm)/CoFeTaZr (10 nm)/Ru (0.5 nm)/CoFeTaZr (10 nm)

(2) Configuration of the magnetic recording apparatus illustrated in FIG. 14
  Slider 50: Thin femto type (0.85×0.7×0.2 mm)
  Sensor element 12: CPP-GMR ($T_{wr}$=18 nm)
  First recording magnetic pole 22: CoFe ($T_{ww}$=100, 65 nm)
  STO 40: Co/Fe (11 nm)/Cu (3 nm)/Co/Ni (9 nm)
  FGL width: $W_{FGL}$=22 nm
  Medium substrate: 2.5 inch glass substrate
  Medium structure: Lubricant layer (0.7 nm)/C(1 nm)/ CoCrPtNi(SiTi)O$_2$C (11 nm)/Ru (10 nm)/CoFeTaZr (15 nm)/Ru (0.5 nm)/CoFeTaZr (15 nm)

(3) Configuration of the magnetic recording apparatus illustrated in FIG. 15
  Slider 50: Thin long-femto type (1×0.7×0.2 mm)
  Sensor element 12: TMR ($T_{wr}$=20 nm)
  First recording magnetic pole 22: CoFe($T_{ww}$=100, 50 nm)
  STO 40: Co/Fe (12 nm)/Cu (2 nm)/Ni/Co (8 nm)
  FGL width: $W_{FGL}$=20 nm
  Medium substrate: 2.5 inch glass substrate
  Medium structure: Lubricant layer (0.5 nm)/C (1 nm)/ CoCrPtFe(SiTi)O$_2$C (3 nm)/CoCrPtAuSiO$_2$C (7 nm)/ Ru (10 nm)/CoFeTaZr (20 nm)/Ru (0.5 nm)/CoFeTaZr (20 nm)

The above slider was mounted on a suspension as will be described later with reference to FIG. 19 and used as the HGA according to the present embodiment. The above perpendicular magnetic recording media were mounted on a spin stand (recording/reproduction characteristics evaluation tester), and the respective recording/reproduction characteristics were evaluated while adjusting or optimizing the bias write current to the ring-type magnetic core, the STO drive current $I_{STO}$ from the spin injection layer to the FGL layer, and the TFC control power $P_{TFC}$, for example. As a result, the recorded track width was 27 nm, 25 nm, and 23 nm in the apparatus configurations of FIGS. 13, 14, and 15, respectively. The magnetic pole width $T_{WW}$ of the ring-type longitudinal recording head was 100 nm and 80 nm in the case of FIG. 13; 100 nm and 65 nm in the case of FIG. 14; and 100 nm and 50 nm in the case of FIG. 15. It was confirmed that, as opposed to the perpendicular recording head type microwave assisted recording illustrated in FIG. 38, the recorded track width was determined by the respective STO element width $W_{FGL}$ in each case, i.e., 24 nm, 22 nm, and 20 nm, so that a significantly narrow track was obtained. An even more detailed evaluation of the recording track magnetization state revealed that, at the recording track edge, the curvature of the recording magnetization was smaller than that by the conventional microwave assisted recording technology according to the comparative example by approximately 50%, and that an excellent recording magnetization state was obtained at the center of the recording track, with an improvement in S/N of approximately 2 dB.

[Third Embodiment]

According to the present embodiment, another magnetic head that provides a particularly strong high-frequency oscillation magnetic field will be described.

Figure 16:
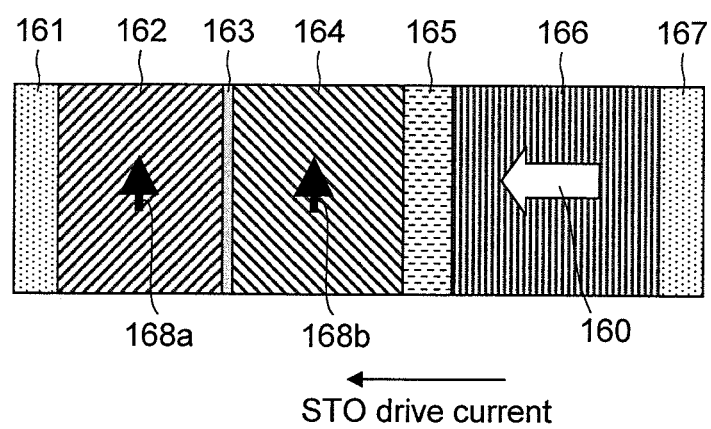
FIG. 16 is a schematic cross sectional view of the STO of a layered FGL structure.

In order to generate a strong high-frequency magnetic field, it is preferable to increase particularly the saturation magnetic flux density and the film thickness while suppressing the development of a magnetic domain structure in the FGL. The present inventors conducted studies and have found that, as illustrated in FIG. 16, the development of the magnetic domain structure can be suppressed by layering the first and second FGLs 162 and 164 of a magnetic alloy with negative perpendicular magnetic anisotropy energy, such as Fe$_{0.4}$CO$_{0.6}$, Fe$_{0.01}$Co$_{0.99}$, or Co$_{0.8}$Ir$_{0.2}$; a Heusler alloy such as CoFeGe, CoMnGe, CoFeAl, CoFeSi, or CoMnSi; or a magnetic super-lattice such as Co/Fe, Co/Ir, Co/Ni, or CoFeGe/CoMnGe, in which the demagnetization field is also taken into consideration such that the magnetization tends to be oriented in the plane, via a coupling layer 163 of a non-magnetic conductive material, such as Au, Ag, Pt, Ta, Nb, Ir, Al, Si, Ge, Ti, Cu, Pd, Ru, Rh, Cr, Mo, or W, while adjusting the film thickness such that the FGLs can be ferromagnetically coupled. Numerals 168a and 168b designate the magnetization of the first and second FGL layers, respectively, which are strongly ferromagnetically coupled to each other. Numeral 160 designates the perpendicular magnetization of the spin injection layer 166.

A drive current is supplied to the STO from a DC power supply on the side of the spin injection layer 166 so as to drive microwave oscillation of the FGL. The first and second FGLs 162 and 164 may preferably have a film thickness of 2 to 25 nm from the viewpoint of suppressing the magnetic domain structure. In FIG. 16, numerals 161 and 167 designate an underlayer and a cap layer, respectively, which may include a single-layer thin film of Pt, Ir, Ru, Cr, Ta, Nb, or Zr, an alloy thin film, or a layered thin film thereof. Numeral 165 designates an intermediate layer of a non-magnetic conductive material, such as Au, Ag, Pt, Ta, Ir, Al, Si, Ge, Ti, Cu, Pd, Ru, Cr, Mo, or W.

By using a material with perpendicular magnetic anisotropy energy for the spin injection layer 166, oscillation of the FGL can be stabilized. For example, a magnetic super-lattice material such as Co/Pt, Co/Ni, Co/Pd, or CoCrPt/Pd may preferably be used. While oscillation stability may be slightly decreased, the same material as that of the FGL may also be used. While a large film thickness is preferable for the underlayer or the cap layer, an appropriate film thickness may be set in view of the write gap length. For example, a sufficient effect may be obtained when the film thickness is 1 to 15 nm.

Good magnetic coupling was observed when the film thickness of the coupling layer was in a specific film thickness region, such as 0.1 nm or more and 0.7 nm or less, 1.2 nm or more and 1.6 nm or less, or 2.7 nm or more and 3.2 nm or less of Cu or Ta in the case of a layered structure of CoFe and Cu or CoIr and Ta. Particularly, the best magnetic domain control effect was obtained when the film thickness was 0.2 nm or more and 0.6 nm or less. Similar effects were obtained in the case of a layered structure of a Co/Ni artificial lattice film and a Ta film, a Co/Fe artificial lattice film and a Cu film, a CoFeGe layer and an Au thin film, or a CoMnGe layer and an Ag thin film, or in the case of three layers of CoMnGe or CoFeGe. However, when Ag was used for the intermediate layer, a greater film thickness was preferable. While a similar phenomenon was observed when the intermediate layer was a magnetic thin film of FeSi or NiFe, not much magnetic domain structure suppressing effect was obtained.

Thus, the thickness of the FGL film can be effectively increased by suppressing the magnetic domain structure with the layered FGL, and 1.8 times or more strong high-frequency oscillation magnetic field can be obtained. Based on this discovery, the STO was formed by layering the first and second FGL layers of CoFeGe or Co/Fe with a film thickness of 10 nm via coupling layers of Cu or Ta with film thicknesses of 0.2 nm, 0.3 nm, 0.4 nm, and 0.6 nm, and further by layering with a Co/Ni spin injection layer with a film thickness of 12 nm via a Cu layer with a film thickness of 2 nm. Then, microwave assisted magnetic heads in which the STO was disposed in the ring-type magnetic core of the structures illustrated in FIGS. 13 to 15, with the write gap length $G_L$ of 40 nm, were prepared. The distance between the tip of the magnetic pole 22 and the surface of the FGL was 10 nm and the STO element height was 30 nm. A slider with this recording unit, a recording and reproduction unit, a TFC unit and the like mounted thereon was installed on the suspension to obtain a HGA, and the recording/reproduction characteristics of the HGA were evaluated on the spin stand by using the high coercive force perpendicular magnetic recording medium described with reference to FIGS. 13 to 15, while adjusting or optimizing the write current to the respective ring-type magnetic core, the STO drive current, the TFC control power and the like. As a result, in each of the magnetic head structures, a narrow track narrower than in the case of the head according to the second embodiment by approximately 0.5 nm was formed even with a relatively low STO drive current compared with the second embodiment, and the S/N was increased by approximately 1 dB, indicating that excellent microwave assisted recording can be performed.

Further, according to an evaluation of the recording performance of the magnetic heads according to the present embodiment with the use of a high coercive force perpendicular magnetic recording medium with the crystal magnetic anisotropy field $H_k$ increased by approximately 20%, while recording was difficult with the magnetic head described with reference to the first and the second embodiments, sufficiently good recording was performed with the magnetic heads according to the present embodiment, and an increase in the S/N by approximately 2 dB and 1 dB with respect to the first and the second embodiments, respectively, was obtained. Thus, the magnetic heads including the layered FGL according to the present embodiment can provide enhanced recording performance because the strength of the high-frequency oscillation magnetic field can be increased substantially in inverse proportion to the FGL film thickness, so that sufficient recording can be performed in the perpendicular magnetic recording medium with very high coercive force of 7 to 8 kOe or more, which is particularly preferable.

[Fourth Embodiment]

According to the present embodiment, the magnetic head with yet another structure which is particularly superior in recording field gradient will be described.

Figure 17:
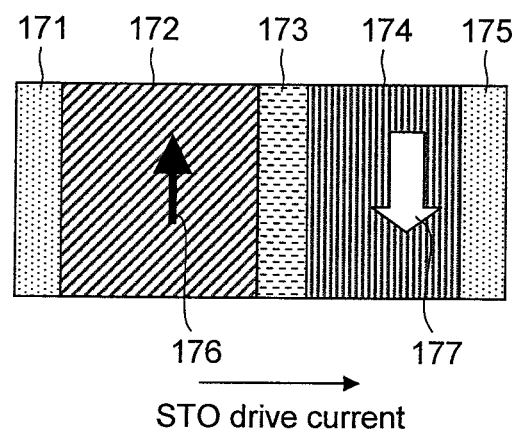
FIG. 17 is a schematic cross sectional view of the STO of an antiferromagnetically coupled structure.

FIG. 17 illustrates the structure. In this structure, a FGL 172 of a magnetic alloy with negative perpendicular magnetic anisotropy energy, such as $Fe_{0.4}Co_{0.6}$, $Fe_{0.01}Co_{0.99}$, or $Co_{0.8}Ir_{0.2}$, a Heusler alloy such as CoFeGe, CoMnGe, CoFeAl, CoFeSi, or CoMnSi, or a magnetic super-lattice such as Co/Fe, Co/Ir, Co/Ni, or CoFeGe/CoMnGe, in which the demagnetization field is also taken into consideration such that the magnetization can be effectively oriented in the plane, and a spin injection layer 174 of a magnetic film such that the magnetization can be oriented in the longitudinal direction of the film surface are layered via a non-magnetic intermediate layer 173 of a non-magnetic conductive material of Au, Ag, Pt, Ta, Nb, Ir, Al, Si, Ge, Ti, Cu, Pd, Ru, Rh, Cr, Mo, or W with a film thickness of 1 to 4 nm such that the magnetization of the FGL 172 and that of the spin injection layer 174 can be antiferromagnetically coupled. As opposed to the third embodiment or the normal STO, the STO drive current is caused to flow from the FGL 172 to the spin injection layer 174 such that not only the magnetization of the FGL 172 but also the magnetization of the spin injection layer 174 can be rotated at high speed while being anti-ferromagnetically coupled.

It has also been confirmed that the oscillation can be more stabilized even at higher frequencies by using a material similar to that of the FGL for the spin injection layer and decreasing the film thickness compared with the FGL, or by designing the FGL such that the material-dependent magnitude of the magnetic anisotropy field and the effective demagnetization field of the spin injection layer in the film surface perpendicular direction to be substantially balanced with each other in opposite directions. Preferably, the film thickness of the spin injection layer 174 and the FGL 172 is 3 to 30 nm, whereby the spin injection layer 174 and the FGL 172 can be stably coupled to each other and be simultaneously rotated at high speed. In FIG. 17, numerals 171 and 175 designate an underlayer and a cap layer, respectively, which may include a single-layer thin film of Pt, Ir, Ru, Cr, Ta, Nb, or Zr, an alloy thin film, or a layered thin film thereof. While a greater film thickness is preferable for these layers, the film thickness may be set in view of the write gap length. A sufficient effect may be obtained when the film thickness is 1 to 15 nm.

Thus, in the STO according to the present embodiment in which not only the magnetization of the FGL but also the magnetization of the spin injection layer is rotated at high speed, an approximately 10% increase in the oscillation magnetic field and an approximately 10 to 20% increase in high recording field gradient can be obtained immediately under the STO, although being close to linear deflection, so that particularly excellent compatibility with the ring-type magnetic pole that can generate a strong base magnetic field can be obtained.

An example of the element structure of FIG. 17 was produced such that the FGL 172 of a Fe/Co magnetic super-lattice thin film with a film thickness of 12 nm, and the spin injection layer 174 of a Ni/Co magnetic super-lattice with a smaller film thickness than that of the FGL, namely 9 nm, were layered via Cu of a film thickness of 3 nm. The element structure was combined with the ring-type magnetic pole illustrated in FIG. 15 such that the STO could be energized by the magnetic poles 22 and 24. The write gap length $G_L$ was 45 nm, the distance between the tip of the magnetic pole 22 and the surface of the FGL was 15 nm, and the STO element height was 20 nm. Two orders of layering of the FGL 172 and the spin injection layer 174 from the magnetic pole 24, namely 172/174 and 174/172, were analyzed while the thickness and the like of the underlayer and the cap layer were adjusted as needed.

A slider provided with the recording and reproduction unit according to the present embodiment and the TFC unit was installed on a suspension (which will be described later with reference to FIG. 19) to obtain a HGA, and the recording/reproduction characteristics were evaluated on the spin stand by using the high coercive force perpendicular magnetic recording medium described with reference to FIG. 15, while adjusting or optimizing the write current to the ring-type magnetic core, the oscillation control current to the FGL, the TFC control power and the like. As a result, a decrease in the track width by approximately 1 nm and an increase in the S/N by 2 dB over the second embodiment were observed. Thus, it was confirmed that microwave assisted recording with superior recording field sharpness corresponding to a 10% increase in the write field gradient can be performed.

Further, the recording/reproduction characteristics were evaluated by using the HGA (which may be hereafter referred to as the "magnetic head") according to the present embodiment with its excellent write field gradient, and the high coercive force perpendicular magnetic recording medium described with reference to FIG. 15, in the case of shingled write recording with the track pitch set to be substantially one half the FGL element width. As a result, it was confirmed that the recording can be performed in the recording track of the order of 15 nm, 14 nm, or 13 nm, which are significantly narrower than the track width 24 nm, 22 nm, or 20 nm of the FGL. Thus, sharp recording can be performed with approximately twice as high a track density as that of a system other than the shingled write recording system.

[Fifth Embodiment]

The magnetic head and the high coercive force perpendicular magnetic recording medium according to the first or the fourth embodiment provide excellent fundamental characteristics for increasing the track density, as evaluated on the spin stand. According to the present embodiment, a configuration of the magnetic head drive control apparatus and the magnetic recording apparatus, a magnetic recording operation by the magnetic head suitable for recording or reproducing the high coercive force perpendicular magnetic recording medium, a method for adjusting the apparatus and a performance optimizing method utilizing the features of the magnetic head, and the effects of the methods will be described.

(Magnetic Head Drive Control Apparatus and Magnetic Recording Apparatus)

FIG. 18 illustrates the magnetic recording apparatus and the magnetic head drive control apparatus according to the present embodiment that are provided with the magnetic head and the high coercive force perpendicular magnetic recording medium illustrated in FIGS. 13 to 15. The magnetic recording apparatus includes a spindle motor 500; a high coercive force perpendicular magnetic recording medium 501; a high-rigidity arm 502; a HGA (which may hereafter be referred to as the "magnetic head") 505 including a magnetic head slider 503 with an STO, recording and reproduction elements, a clearance control TFC and the like, and a high-rigidity suspension 504; an actuator 506; a magnetic head drive control apparatus (R/W-IC) 508 including a STO drive control function for producing a STO drive signal (drive current signal or drive voltage signal) for driving the STO, a recording amplifier, a reproduction pre-amplifier and the like; a R/W channel 509 functioning as a recording modulation unit and a reproduction demodulation unit; a microprocessor (MPU) 510; a disk controller (HDC) 511; a buffer memory control unit 516 for controlling a buffer memory 521; a host interface control unit 517; a memory unit 518 which may include a RAM for storing a control program and control data; a nonvolatile memory unit 519 which may include a flash memory or a FROM for storing a control program and the like; a drive unit 520 including a voice coil motor (VCM) driver, a spindle motor driver and the like; and an MPU bus 515, for example.

The HGA 505 is connected to the magnetic head drive control apparatus 508 via a signal line and performs recording and reproduction by selecting one magnetic head with a head selector signal based on a recording instruction or a reproduction instruction from a higher-level apparatus (not illustrated) as a host. The R/W channel 509, the MPU 510, the HDC 511, the buffer memory control unit 516, the host interface control unit 517, and the memory 518 may be formed as a single LSI (SoC: System on Chip). Numeral 512 designates a control board on which the LSI, the drive unit, the nonvolatile memory and the like are mounted. To the high-rigidity suspension or the high-rigidity arm, a damper including a vibration absorbing/suppressing body and the like may be attached for further suppression of vibrations as needed. Preferably, the high-rigidity suspension 504 or the slider 503 may be provided with a position fine-adjusting mechanism (a dual-stage actuator or a micro-stage actuator) including a piezoelectric element, an electromagnetic element, a thermal deformation element and the like, whereby high-speed, high-accuracy positioning can be performed when the track density is high.

However, when the micro stage actuator is mounted on the slider 503, the total number of wiring 241 becomes 10, as illustrated in FIG. 19. In order to perform a stable and high-speed seek over the perpendicular magnetic recording medium, the wiring 241 over the flexure or the suspension may to be symmetric so as to ensure seek performance. Thus, the wiring pattern needs to be separated into two portions 242 and 243 of five wires each, located above and under the slider. For this purpose, one of the recording, reproduction, or micro actuator control wiring may be separated. Because the slider width of the femto slider 503 according to the present embodiment is 0.7 mm and thus small, the wiring implementation density of the slider connection pad and the wiring 243 becomes extremely high, greatly increasing high-frequency signal interference. Thus, the connection pad and wiring need to be arranged carefully. Accordingly, preferably, at least two wires for recording (W, W), two wires for reproduction (R, R), or two wires for micro actuator control (M, M) each may be handled as a pair of adjacent wires as a combination of adjacent wires, and at least one of two wires for TFC driving (T, T) or two wires for STO driving (S, S), which are driven with a low DC voltage or current and therefore do not pose much interference to the reproduction signal system, may be separated and disposed between the pairs of wires. The pairs of wiring may be in the form of layered wires or arranged side by side on the same plane. When the layered wiring arrangement is adopted, the TFC drive layered wiring or the STO drive wiring may preferably be disposed between the layered wires as needed.

According to the present embodiment, a micro actuator is mounted on the HGA 505 for highly accurate positioning. For the two recording wires (W, W), the two reproduction wires (R, R), the two micro actuator control wires (M, M), the two TFC drive wires (T, T), and the two STO drive wires (S, S), the wires (1) to (10) illustrated in FIG. 19 may be arranged in the order of STTWWSMMRR, TSSWWTMMRR, STTRRSM-MWW, SWWTTSRRMM, TWWSSTMMRR, or TRRMMSSWW, or GTWWSMMRR, GTRRSMMWW, or SGWWTMMRR by sharing one wire as a ground wire G with a STO wire, wherein G is the common ground wire for the TFC and the STO. Instead of the micro actuator, an ECS (Embedded Contact Sensor) for contact detection (E, E) may be provided as needed. In this case, too, the wires may be separated such that, for example, the arrangement is TRREETSSWW, ETTRRESSWW, or SEERRSTTWW, or RRSSETGWW by sharing one wire with the TFC wire as the ground wire G.

By the above arrangement, the entry of a high-frequency component into the STO can be prevented at the time of high-frequency write current recording into the magnetic core or, conversely, by using the STO wire and the adjacent portion of the reproduction element wires as the ground line, an erroneous operation of the reproduction element due to the influence of the STO wiring on the reproduction element can be suppressed, so that stable apparatus operation can be obtained at all times. The same also applies when the micro actuator and reproduction element wires are adjacent to each other. The above also applies to the case in which a dual stage actuator is mounted on the suspension.

Referring back to FIG. 18, the MPU 510 is a main control apparatus for the magnetic recording apparatus and performs servo control necessary for a recording or reproduction operation, positioning the magnetic head and the like. For example, the MPU sets a parameter necessary for its operation in the register 514 included in the R/W-IC. Various values, such as a predetermined temperature, a clearance control value (TFC input power value) for each perpendicular magnetic recording medium region, a STO drive current value, a preliminary current value, a write current value, an overshoot amounts thereof, a timing time, and a time constant for an environment change, for example, may be independently set in various registers as needed, as will be described later.

The R/W channel 509 is a signal processing circuit. The R/W channel 509 outputs a signal 513 encoding recording information transferred from the disk controller 511 to the R/W-IC at the time of recording information. At the time of information reproduction, the R/W channel 509 outputs reproduction information obtained by decoding a reproduction signal outputted from the magnetic head 505 after being amplified by the magnetic head drive control apparatus, to the HDC 511.

The HDC 511 provides an interface between the magnetic recording apparatus and the higher-level host system (not illustrated). The HDC 511 performs recording/reproduction information transfer control, data format conversion, and an ECC process by outputting a write gate for indicating the start (recording timing) of recording of information for writing write data 513 to the perpendicular magnetic recording medium to the R/W channel 509, for example.

The magnetic head drive control apparatus (R/W-IC) 508 is a drive integrated circuit for generating at least one type of recording signal (write current) corresponding to the write data 513 supplied from at least the R/W channel 509 in response to the input of the write gate, and supplying the recording signal to the magnetic head together with a STO drive signal (drive current signal or drive voltage signal) with a controlled energization timing. The magnetic head drive control apparatus (R/W-IC) 508 includes at least a ring-type head drive circuit, a ring-type head drive current supply circuit, a STO delay circuit, a STO drive current supply circuit, and a STO drive circuit. The magnetic head drive control apparatus also includes a register in which a write current value, a STO drive current value, a TFC input power value, an operation timing and the like are set from the MPU. The respective register values may be changed depending on conditions such as the region of the perpendicular magnetic recording medium, ambient temperature, and atmospheric pressure. Preferably, the magnetic head drive control apparatus (R/W-IC) 508 may provide an interface with the host system and be provided with the function of supplying a bias write current to the magnetic head in accordance with a direct instruction from the MPU, which, as a main control apparatus for the magnetic recording apparatus, controls the recording or reproduction operation (such as transferring recording or reproduction data) and the magnetic head positioning servo control. The magnetic head drive control apparatus (R/W-IC) 508 may also include the function of starting the recording operation in accordance with the timing of the write gate outputted from the HDC. Thus, the magnetic head drive control apparatus according to the present embodiment can freely set the operation timing for the MPU indicating an operation of the magnetic recording apparatus, the means for supplying a preliminary current or a recording signal in accordance with the input of the write gate indicating information recording, and the STO drive control unit, or corresponding current waveforms and current values, clearance control power, and the preliminary current or write current to the recording magnetic pole.

In the following, an outline of the recording or reproduction operation in the magnetic recording apparatus according to the present embodiment will be described. In accordance with an information recording or reproducing instruction from the host, such as a personal computer, or the higher-level system, the perpendicular magnetic recording medium 501 is rotated at a predetermined rotating speed by the spindle motor 500 under the control of the MPU 510, which is the main control apparatus for the magnetic recording apparatus. Further, a position on the medium is detected by the reproduction element by using a signal from servo information which is recorded in the perpendicular magnetic recording medium in advance during the manufacturing process for the magnetic recording apparatus. The high-rigidity actuator 506 moves or controls the magnetic head HGA 505 via the high-rigidity arm 502 in accordance with the VCM 522 driven by a VCM drive control unit of the drive unit 520, such that the magnetic head is moved to a predetermined recording track of the perpendicular magnetic recording medium at high speed and with high accuracy (seek operation). At that position, a stable following operation for the magnetic head is performed. Then, on the track, recording or reproducing of information is performed in accordance with a firmware program in the MPU as follows.

At the time of information recording, as a recording instruction and write data are received by the host interface control unit 517 from the host, the MPU 510 decodes the recording instruction and stores the write data in the buffer memory 521 as needed. Then, the data is converted by the HDC 511 into a predetermined data format and an ECC code is attached to the data through an ECC process. A recording/modulation system in the R/W channel 509 performs scrambling, RLL code conversion, and recording compensation (write pre-compensation), while the HDC outputs a write gate for indicating the start of data recording (recording timing) for writing the write data 513 to the perpendicular magnetic recording medium to the R/W channel 509. In response to the input of the write gate, a recording signal (write current) corresponding to the write data 513 supplied from the R/W channel 509 is produced, which is supplied, together with an STO drive signal (drive current signal or drive voltage signal) with controlled energization timing, to the recording head unit of the magnetic head 503 via the FPC wiring 507, whereby the data is recorded in the predetermined recording track of the perpendicular magnetic recording medium by the microwave assisted method.

Meanwhile, at the time of information reproduction, as a reproduction instruction is received by the host interface control unit 517 from the host, magnetization information recorded in the perpendicular magnetic recording medium is read by the magnetic head 503 selected and positioned as in the case of recording, and the reproduction signal is amplified by the R/W-IC and transmitted to the R/W channel 509, where the signal is decoded. After errors are detected and corrected by ECC process in the HDC, the signal is buffered in the buffer memory 521 and the reproduction data is transferred from the host interface control unit 517 to the host.

(Magnetic Recording Operation)

Figure 20:
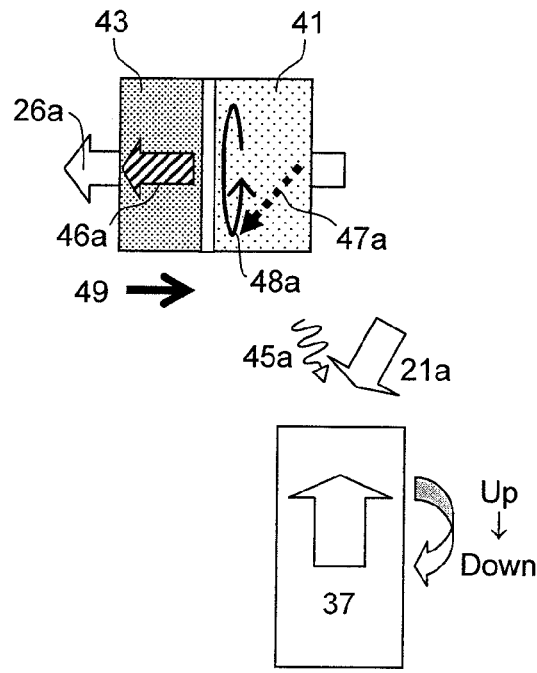
FIG. 20 illustrates an example of the relationship between the recording field and the high-frequency magnetic field when performing microwave assisted magnetic recording for a high coercive force perpendicular magnetic recording medium.
Figure 21:
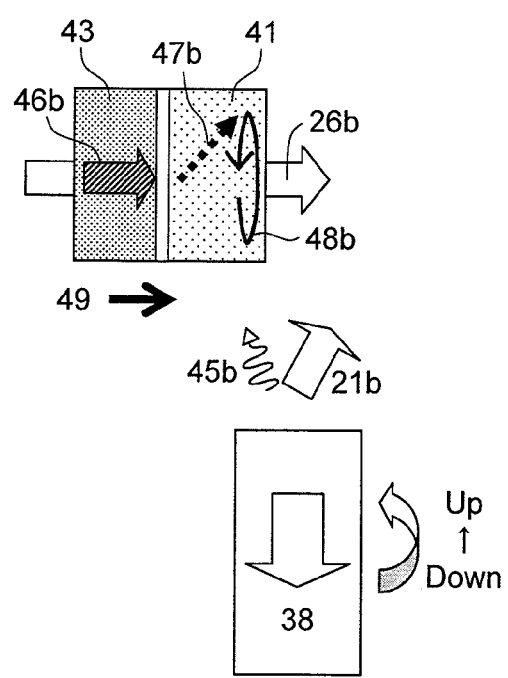
FIG. 21 illustrates an example of the relationship between the recording field and the high-frequency magnetic field when performing microwave assisted magnetic recording for the high coercive force perpendicular magnetic recording medium.

FIGS. 20 and 21 schematically illustrate the magnetization state of each layer of the high-frequency magnetic field generating element when microwave assisted magnetic recording is performed in the high coercive force perpendicular magnetic recording medium by using the STO according to the embodiment. Arrows 46a and 46b designate the magnetization of the spin injection layer 43; 47a and 47b designate the magnetization of the FGL 41; arrows 48a and 48b designate the rotation direction of the magnetization 47a and 47b of the FGL; an arrow 49 designates the direction of a DC current (STO drive current) supplied to the STO from the power supply 44.

In the in-gap type FGL 41, when the recording field exceeds a predetermined level in a state in which the STO drive current 49 is being applied, the FGL performs high-frequency oscillation a predetermined delay time later such that the high-frequency magnetic field is applied to the perpendicular magnetic recording medium. When the direction (polarity) of the write current is reversed, the recording magnetic pole generates a recording field of the opposite direction, and the FGL performs high-frequency magnetic field oscillation in accordance with the opposite recording field a predetermined delay time later. Thereafter, these operations are repeated in accordance with write current reversal. According to the present embodiment, as illustrated in FIG. 11, the FGL drive control magnetic field 26a and 26b from the magnetic core is applied to the FGL surface perpendicularly and uniformly, so that strong high-frequency magnetic field can be stably generated with very high efficiency. Further, the intensity of the FGL drive control magnetic field is greater than that of the conventional main magnetic pole type by several tens of percentage points, so that the ability of the high-frequency oscillation magnetic field to track the recording signal (switching performance in high-frequency rotating magnetic field direction) is high. In the following, a magnetic recording operation in which magnetization reversal of the perpendicular magnetic recording medium, namely magnetic recording, is performed in view of the above features and processes.

FIG. 20 is a conceptual diagram illustrating an example in which the upward magnetization 37 recorded in the magnetic layer of the perpendicular magnetic recording medium is rewritten for downward magnetization. In this case, the coil of the ring-type recording head is energized with a write current such that the first recording magnetic pole 22 produces a downward recording field 21a. At this point, a strong oscillation control magnetic field 26a is applied to the STO in the write gap portion substantially perpendicularly and uniformly, whereby the magnetization of the spin injection layer 43 and the magnetization of the FGL 41 are oriented leftward. By supplying a current 49 to the STO in advance, the magnetization 47a of the FGL 41 rotates at high speed in the anticlockwise direction (in the direction of the arrow 48a) with high tracking ability with respect to the recording signal, and a strong circularly polarized high-frequency magnetic field 45a that assists an anticlockwise precession of the upward magnetization 37 of the perpendicular magnetic recording medium is generated in a region to the right of the FGL (see FIG. 6). Eventually, with the help of the assist effect from the high-frequency magnetic field (magnetic field for microwave assist recording) 45a, the upward magnetization 37 of the perpendicular magnetic recording medium is reversed downward by the downward recording field 21a such that the information is rewritten.

The oscillation frequency is determined by the sum of the oscillation control magnetic field 26a and the anisotropy magnetic field of the FGL 41. Thus, when the FGL 41 is formed of a soft-magnetic material or a negative perpendicular magnetic anisotropy energy material, for example, the anisotropy magnetic field is small, so that the oscillation frequency of the FGL 41 is determined by the intensity of the oscillation control magnetic field 26a. In FIG. 20, no such assist effect is produced when the medium magnetization is downward.

Next, an example in which the downward magnetization 38 recorded in a magnetic layer of a magnetic recording medium is conversely rewritten in upward direction will be described with reference to a conceptual diagram of FIG. 21. First, a uniform and strong oscillation control magnetic field 26b is applied to the spin injection layer 43 and the FGL 41 in an opposite direction (rightward) from the direction of FIG. 20 so as to cause the direction of the magnetizations 46b and 47b of the spin injection layer 43 and the FGL 41, respectively, to be switched at high speed to the opposite direction (rightward) from FIG. 20. In this state, the magnetization 47b of the FGL 41 in the energized state is rotated at high speed in a direction (direction of arrow 48b) opposite to the direction of FIG. 20 in accordance with the recording signal as viewed from the magnetic recording medium. From the oppositely rotating magnetization 47b of the FLG 41, a circularly polarized high-frequency magnetic field is generated in a region to the right of the FGL that has the opposite property from that of FIG. 20; namely, the property to assist the precession of the downward recording magnetization 38 (i.e., assisting upward reversal). Eventually, through the efficient assist effect of the highly responsive and strong high-frequency magnetic field 45b, the downward magnetization 38 of the magnetic recording medium is reversed upward by the upward recording field 21b such that the information is rewritten.

The above magnetization reversal mechanism explains the failure to obtain the microwave assist effect when the magnetization of the magnetic recording medium is reversed by the magnetic field from the main magnetic pole prior to the application of a microwave, as discussed above in the Summary.

Figure 41:
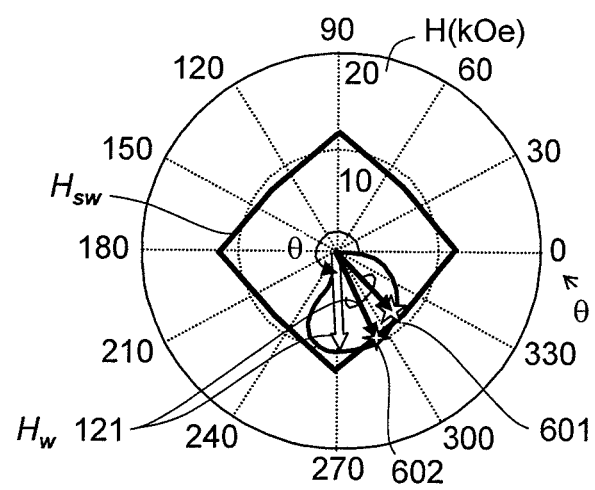
FIG. 41 illustrates the relationship (magnetic recording operation) between the recording field trajectory of a conventional main magnetic pole type magnetic head and the switching field $H_{sw}$ of a perpendicular magnetic recording medium.

While FIG. 3 illustrates the pole figure trajectory (asteroid) of the switching field of the high coercive force perpendicular magnetic recording medium according to the embodiment, the anisotropy magnetic field $H_k$ and the coercive force $H_c$ are higher than those of the conventional medium by approximately 30% to 40%, so that, as will be seen from FIG. 41, the medium cannot be recorded by the conventional main magnetic pole type magnetic head. In contrast, the ring-type magnetic heads illustrated in FIGS. 1, 2, and 13 to 15 have an overwhelmingly greater volume of the recording magnetic pole than that of the conventional main magnetic pole type magnetic head, so that the resultant high recording field is tens of percentage points higher. Thus, these heads are suitable as a high magnetic field recording head. In addition, as illustrated in FIG. 3, the magnetic field intensity has a strong longitudinal recording field component ($\theta=180°$) and is highly symmetric with respect to the x-axis such that magnetization reversal takes place in the second and third quadrants. In the third quadrant in which recording is finalized, magnetization reversal starts at around 210° and recording is finalized at around 230° (indicated by a start mark), indicating that very efficient recording can be performed. Namely, the ring-type longitudinal recording head according to the embodiment has a high potential for promoting magnetization reversal even in the high $H_k$, high S/N perpendicular magnetic recording medium that cannot be sufficiently recorded with the conventional main magnetic pole type magnetic head. Further, in the present magnetic heads, the discrepancy between the maximum effective recording field (602) and the recording finalizing magnetic field (601) is small, so that an excessive widening of the recorded track width by the recording field can be suppressed, which is particularly preferable.

Figure 22:
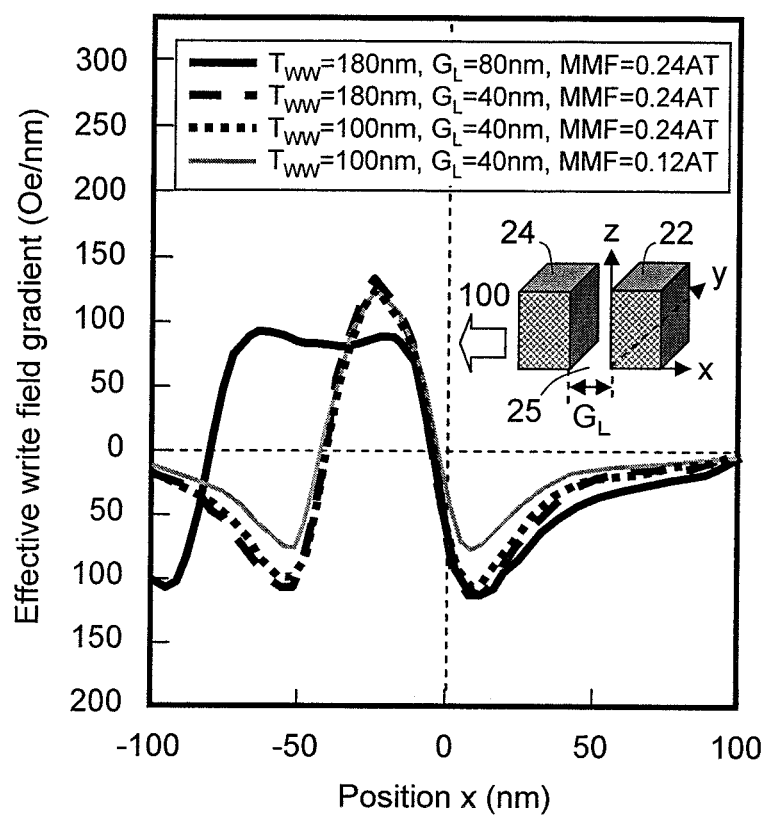
FIG. 22 illustrates the position dependency of the gradient of the effective recording field of the microwave assisted magnetic head according to an embodiment.

However, in an actual magnetic recording operation, it is important to evaluate the write field gradient because the recording density-related characteristics, such as the S/N, are determined eventually by the write field gradient as well as the recording field intensity. Thus, in the ring-type longitudinal recording head according to the embodiment, the sharpness of the effective recording field was determined in view of the angle dependency of the switching field of the perpendicular magnetic recording medium. The result is illustrated in FIG. 22. It is seen from FIG. 22 that in the case of the magnetic head according to the embodiment, the effective write field gradient is 100 Oe/nm, which is lower than the corresponding value by the related-art technology (200-300 Oe/nm). However, as will be seen from FIG. 8, when $T_{WW}$ is 180 nm, $G_L$ is 80 nm, and MMF is 0.24 AT, the effective write field is 15 kOe, which is approximately 1.5 times that of the conventional head. Accordingly, if the write field gradient can be increased, recording density can be increased by approximately twofold or more by this effect alone over the related art.

Thus, according to the recording head of the present structure, an extremely high recording field on the order of 15 kOe or more can be easily obtained. However, as will be seen from that fact that the ring-type magnetic pole structure has not been adopted for perpendicular magnetic recording, the write field gradient is very low at a fraction of that according to the main magnetic pole type magnetic head. The effective write field gradient is a magnetic pole structure-sensitive characteristic related to the difficulty of magnetic pole saturation, the pulling strength of magnetic field and the like. Although some improvements in effective write field gradient may be made as needed, any significant improvement may not be expected. Thus, the recording magnetic pole of the present structure may have room for improvement in terms of recording field gradient.

The high-frequency oscillation magnetic field according to the embodiment has the following features. FIG. 7 illustrates the position dependency of the high-frequency magnetic field generated by the FGL with a film thickness of 10 nm. While the effect of the high-frequency magnetic fields $H_x$ and $H_y$ in influencing microwave assisted recording may slightly differ between the high-frequency magnetic fields, the concept for optimizing the assist effect is the same. Thus, in the following, the high-frequency magnetic field $H_x$ will be described by way of example for simplicity's sake. Because the cross sectional area of the FGL is small, the magnetic field intensity is on the order of 1.1 kOe for the $H_x$ component, and the recording field gradient is also on the order of 100 Oe/nm at a maximum, which is not large. However, as illustrated by the external applied magnetic field angle dependency of the perpendicular magnetic recording medium switching field in FIG. 12, the switching field in the vicinity of 30° to 40° is decreased to 22% to 27% of $H_k$ by the assist effect of the high-frequency magnetic field of approximately 1.1 kOe. Thus, the effective magnetic field intensity is on the order of 4 kOe which is approximately four times that of the actual magnetic field, and the effective write field gradient reaches approximately 400 Oe/nm.

Figure 12:
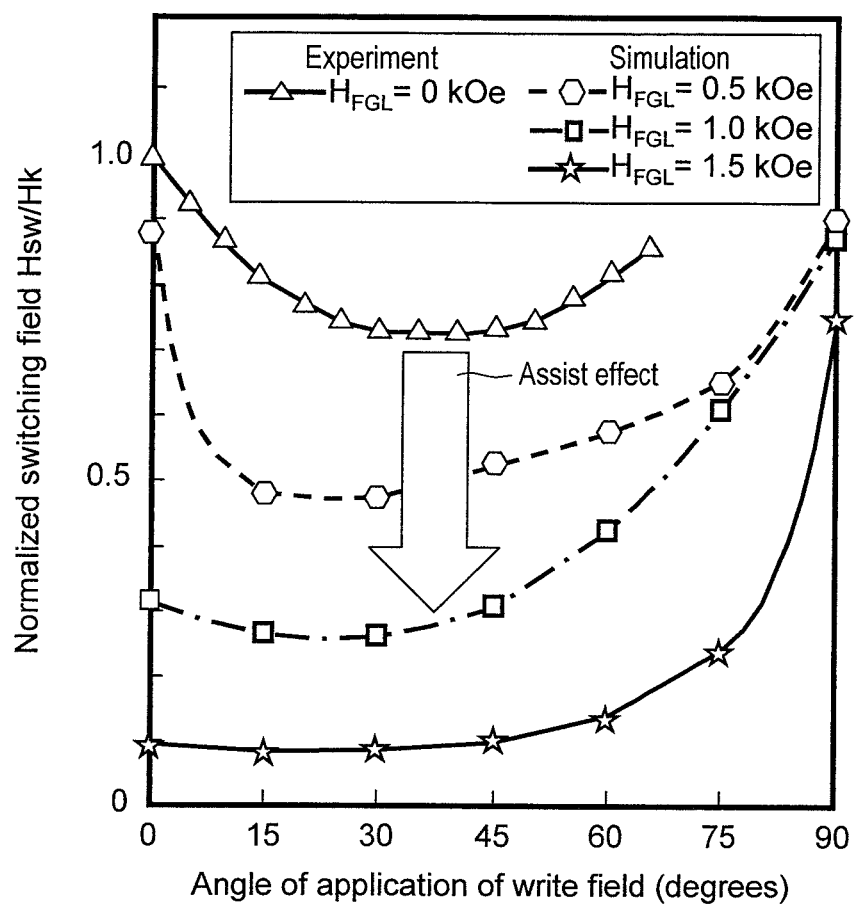
FIG. 12 illustrates the recording field angle dependency of a medium switching field upon application of the high-frequency magnetic field.

Further, when the FGL film thickness is 14 nm and the actual magnetic field intensity is increased by a factor of 1.5 to approximately 1.5 kOe, the switching field in the vicinity of 30° to 40° in FIG. 12 when $H_{FGL}$ is 1.5 kOe is sharply decreased to approximately 10% of $H_k$, so that the assist effect is significantly improved and the effective write field gradient reaches as much as 1.5 kOe/nm. It has been confirmed through a simulation similar to that of FIG. 7, in which the film thickness of the FGL, the STO drive DC current value and the like were varied, that the effective write field gradient on the order of 3 kOe/nm can be obtained when the film thickness of the FGL is 30 nm. Thus, it has been learned that the effective recording field for microwave assisted recording (FGL recording) can be significantly increased to a maximum of the order of 3 kOe/nm. The same reasoning also applies to the microwave assist effect by $H_y$.

Thus, the advantages of the effective recording field of the ring-type longitudinal recording head and that of STO, which are complementary to each other with regard to magnetic field intensity and recording field gradient, can be fully utilized while the respective shortcomings are compensated if they can be combined such that the following can be achieved: (1) that the head is designed such that magnetic recording can be performed by applying a broad and yet extremely strong recording field compared with that from the conventional head close to the switching field, and superposing a weak and yet sharp microwave magnetic field on this base line such that a sharp effective magnetic field that exceeds the switching field of the high coercive force perpendicular magnetic recording medium is produced; and (2) that magnetization reversal of the perpendicular magnetic recording medium by the magnetic field from the recording magnetic pole does not occur prior to the appearance of the microwave assist effect, while demagnetization by the broad magnetic field from the recording magnetic pole after recording by the FGL is completed is prevented.

The above is the main focus of the present invention, which may be referred to as the concept of "magnetic field assisted microwave magnetic recording" in which recording by the FGL is assisted by the recording field, rather than the "microwave assisted magnetic recording" in which recording by the magnetic pole magnetic field is assisted by the high-frequency oscillation magnetic field (microwave) from the FGL. In this sense, the present concept may be referred to as a "second-generation microwave assisted recording".

(Optimization Method and Effect)

As illustrated in FIGS. 13 to 15, the ring-type longitudinal recording head according to the embodiment with the write gap length of 40 nm was evaluated and selected on the spin stand for magnetic head selection by using the high coercive force perpendicular magnetic recording medium (FIG. 3) with the switching field of approximately 11 kOe, and the effect of the embodiment was confirmed by mounting the head on the magnetic recording apparatus illustrated in FIG. 18 through the following procedure.

Namely, first, by using the high coercive force perpendicular magnetic recording medium, a recording/reproduction experiment and selection for the magnetic head were performed on the magnetic head selection spin stand with a clearance of 1.5 nm. Then, with respect to the magnetic head that satisfied the specifications, the critical write current $I_{WC}$ (0), the bias write current $I_{WB}$ (0), the STO drive current $I_{STO}$ (0) such that a substantially maximum output (saturation output; $E_{max}$) can be obtained, and the effective track width MCW (Magnetic Core Width) were determined. Preferably, in view of the switching field distribution and the like mentioned above, the value of the bias write current $I_{WB}$ (0) may be adjusted such that, when recording or reproduction is performed only with $I_{WB}$ (0) while the STO drive current is turned off, the reproduction output is not more than 10% and more preferably not more than 5% of the saturation output $E_{max}$. Preferably, the magnetic disk may be selected with a magnetic head which is an equivalent to the above acceptable product as needed. Because the medium according to the embodiment can hardly be recorded or reproduced with the conventional main magnetic pole type perpendicular magnetic recording head, the tester (such as the spin stand) for selecting the magnetic head and the perpendicular magnetic recording medium was implemented with the adjustment procedure according to the present embodiment.

Then, a plurality of the magnetic disks was mounted on a media servo track writer, and predetermined servo information was recorded by using the bias write current $I_{WB}$ (0) and the STO drive current $I_{STO}$ (0) which were determined by the same procedure as described above and with reference to the MCW value. The media servo track writer include: a recording/reproduction function unit (which may be provided with a damper as needed) including a plurality of the magnetic heads with the STO disposed in the write gap of the ring-type magnetic pole for applying the high-frequency magnetic field onto the magnetic disks during data recording, the magnetic heads being disposed on a high-rigidity suspension with increased rigidity against disturbance and a high-rigidity arm; a magnetic disk flutter/vibration suppressing mechanism such as a shroud; a high-inertia moment actuator; at least one set of recording signal supply means that supply a magnetomotive force corresponding to the recording lower limit of the perpendicular magnetic recording medium to the ring-type magnetic pole at the time of data recording; and at least one drive control means that applies the high-frequency magnetic field from the STO to the magnetic disk during data recording, for example. The media servo track writer has the function of recording a high-quality servo signal in the plurality of the magnetic disks simultaneously. With regard to the recording of the servo information, first a reference spiral servo track was recorded on the perpendicular magnetic recording medium at constant speed with reference to predetermined original disk information, for example. Then, based on the reference spiral servo track, servo information including a 4-burst ½ or ⅔ pitch servo burst pattern, a differential phase servo burst pattern and the like were recorded on the entire surface of the perpendicular magnetic recording medium. The recording/reproduction circuit systems and the like may vary between the spin stand and the media servo writer, and therefore the proper recording conditions for each may differ. Further, the evaluation of the magnetic head or the perpendicular magnetic recording medium may be performed via a sampling inspection or a simplified inspection for increasing production efficiency. Thus, in order to obtain the best-quality servo pattern suitable for the narrow track recording according to the present embodiment, the key parameters, such as $I_{WB}$ (0), the STO drive current $I_{STO}$ (0), and the MCW, may preferably be evaluated or adjusted as needed by the media servo track writer itself provided with the function similar to the spin stand, in accordance with the perpendicular magnetic recording medium.

Figure 36:
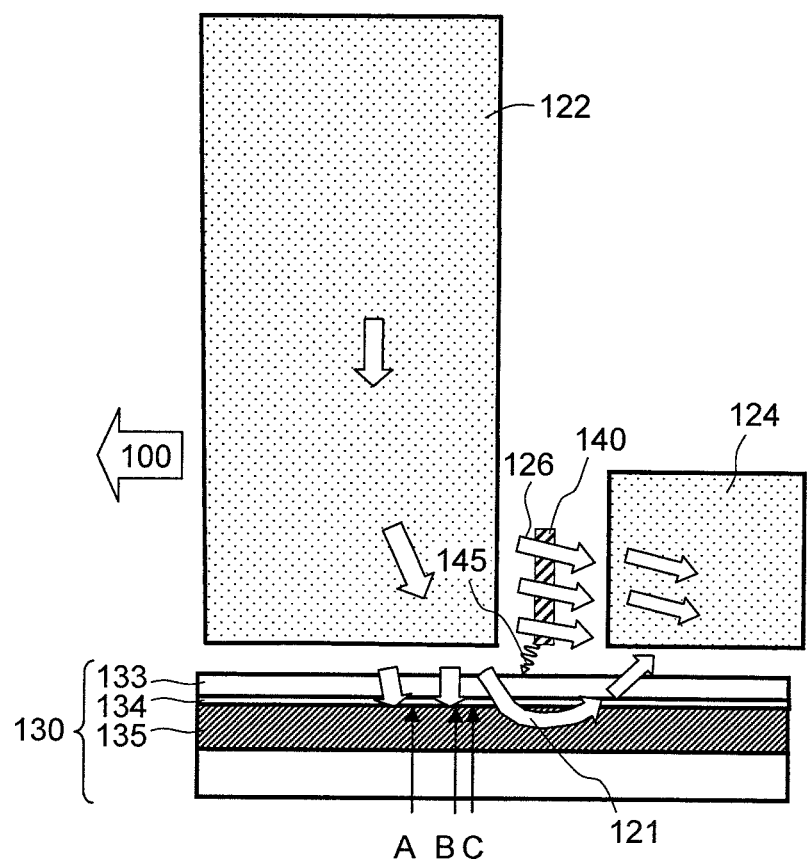
FIG. 36 illustrates a structural example and a magnetic field in the vicinity of the write gap of the conventional microwave assisted magnetic head.
Figure 37:
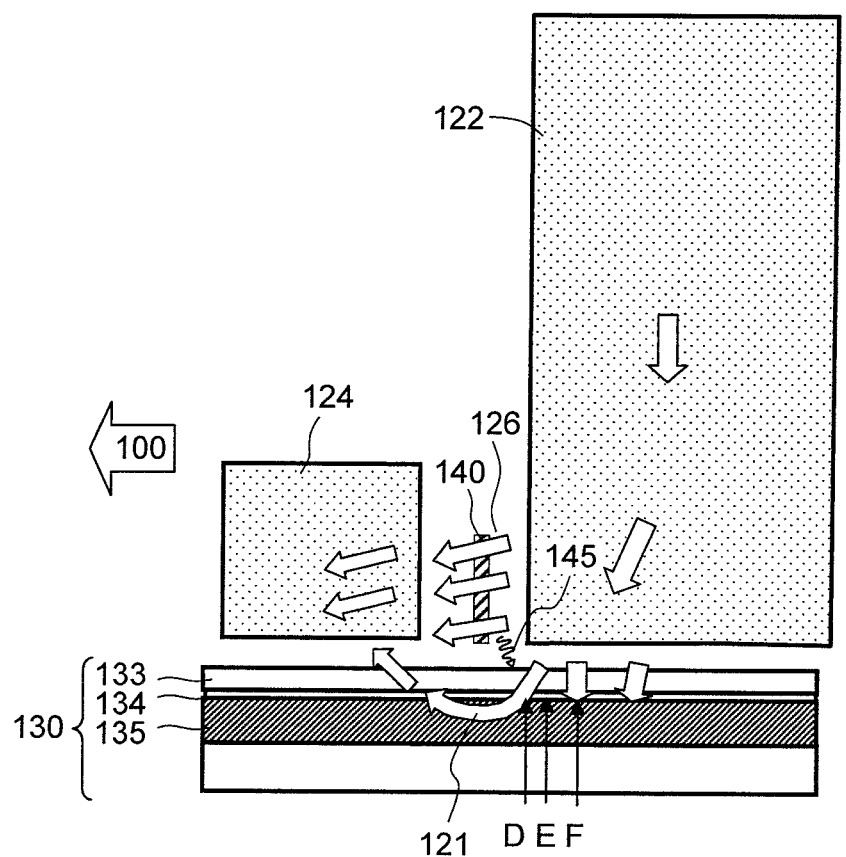
FIG. 37 illustrates a structural example and a magnetic field in the vicinity of the write gap of the conventional microwave assisted magnetic head.

Further, two of the magnetic heads according to the present embodiment and one perpendicular magnetic recording medium were built in the 2.5 inch- or 3.5 inch-type magnetic recording apparatus according to the present embodiment illustrated in FIG. 18, and, for misalignment between the servo track trajectory on the medium side and the rotation trajectory of the magnetic recording apparatus, the RRO (Repeatable Run Out) correction was performed in each zone for the primary eccentricity due to axial misalignment and a feed-forward correction was performed for higher-order misalignment, and the recording/reproduction characteristics were evaluated. As a result, the recorded track width was 27 nm, 25 nm, and 23 nm for the apparatuses of FIGS. 13, 14, and 15, respectively. The magnetic pole width $T_{WW}$ of the ring-type head was 100 nm and 80 nm in the case of FIG. 13; 100 nm and 65 nm in the case of FIG. 14; and 100 nm and 50 nm in the case of FIG. 15. The recorded track widths were determined by the respective STO element width $W_{FGL}$ of 24 nm, 22 nm, and 20 nm, thus indicating that a significant decrease in track width can be achieved. Further, the S/N was also increased by approximately 2 dB compared with the value by the main magnetic pole type magnetic head according to the comparative example illustrated in FIG. 36. Thus, excellent characteristics were exhibited not only by the increase in track density but also by the increase in S/N, as in the case of the evaluation on the spin stand, indicating that a high-capacity apparatus can be provided.

Further, the magnetic head according to the present embodiment and the conventional ECC medium were built in the magnetic recording apparatus according to the present embodiment, and the characteristics were evaluated. As a result, an increase in performance by approximately 1 dB was obtained compared with the combination of the conventional main magnetic pole type magnetic head and the conventional ECC medium. Thus, the magnetic recording apparatus provided with the magnetic head and the magnetic head drive apparatus according to the present embodiment and the method for adjusting the same can provide an excellent effect.

A similar effect was obtained when the constituent elements illustrated in FIGS. 13 to 15, such as the position of the TFC 22, the magnetic pole structure, the reproduction element material, and the width or position of the FGL, were exchanged between the respective configurations.

The present embodiment has been described with reference to the example in which the dual stage actuator is not mounted on the slider. However, even when the dual stage actuator including a piezoelectric element, for example, is mounted on the suspension, the above-described adjusting unit may be simply added and obviously the basic method for optimization does not vary. While the foregoing example involves one perpendicular magnetic recording medium and two magnetic head sliders, one magnetic head slider may be provided for one perpendicular magnetic recording medium, or the number of the perpendicular magnetic recording medium or the magnetic head slider may be increased depending on the purpose. While the present embodiment has been described with reference to a magnetic disk drive (HDD), it goes without saying that the concept of the present embodiment may be applied to other magnetic recording apparatuses, such as a magnetic tape apparatus.

[Sixth Embodiment]

As described above, the magnetic head and the magnetic recording apparatus essentially have excellent fundamental characteristics for achieving high track density, and can provide a high-capacity apparatus. However, the magnetic characteristics or asteroid curve of the actual perpendicular magnetic recording medium may vary due to manufacturing variations, ambient temperature and the like during the production of the magnetic recording apparatus. Further, the magnetic head may have performance variation or ambient temperature dependency due to manufacturing process variations in the recording magnetic pole or the high-frequency oscillator. As will be readily seen from the difficulty in achieving a narrow track in the comparative example due to write broadening, it is important to suppress a change in the switching field 95 and the like illustrated in FIG. 9 and to suppress write blurring or write broadening in the narrow track recording technology according to the present embodiment, which may not be an issue in the case of the conventional microwave assisted recording method. Namely, in order to fully utilize the merits of microwave assisted recording and enable recording or reproduction with the high track density without degradation of information recorded in an adjacent track due to write broadening, which is a feature of the present embodiment, it is necessary to compensate for the performance variation caused by the manufacturing process variations in the recording head or the perpendicular magnetic recording medium, and to fine-adjust the recording magnetization state finalized position (indicated by the star mark in FIG. 3), which is determined by the recording magnetization process in the perpendicular magnetic recording medium, on the apparatus level.

In the following, a clearance correction method will be described which involves the write current $I_{WB}$ to the recording magnetic pole 22 (coil 23), the drive current $I_{STO}$ to the STO 40, and the TFC 02 in a combination of the perpendicular magnetic recording medium described with reference to FIGS. 13 to 15 and the magnetic head according to the present embodiment. Further, a method for providing a high-performance, high-capacity, and highly reliable magnetic recording apparatus at high apparatus assembly yield by adjusting or optimizing the apparatus parameters such that, even when a proximate track is recorded a plurality of times, the magnetization state of a narrow track is not substantially degraded by the recording field from the wide, ring-type magnetic core will be described.

(Optimization Method and Effect)

Figure 23:
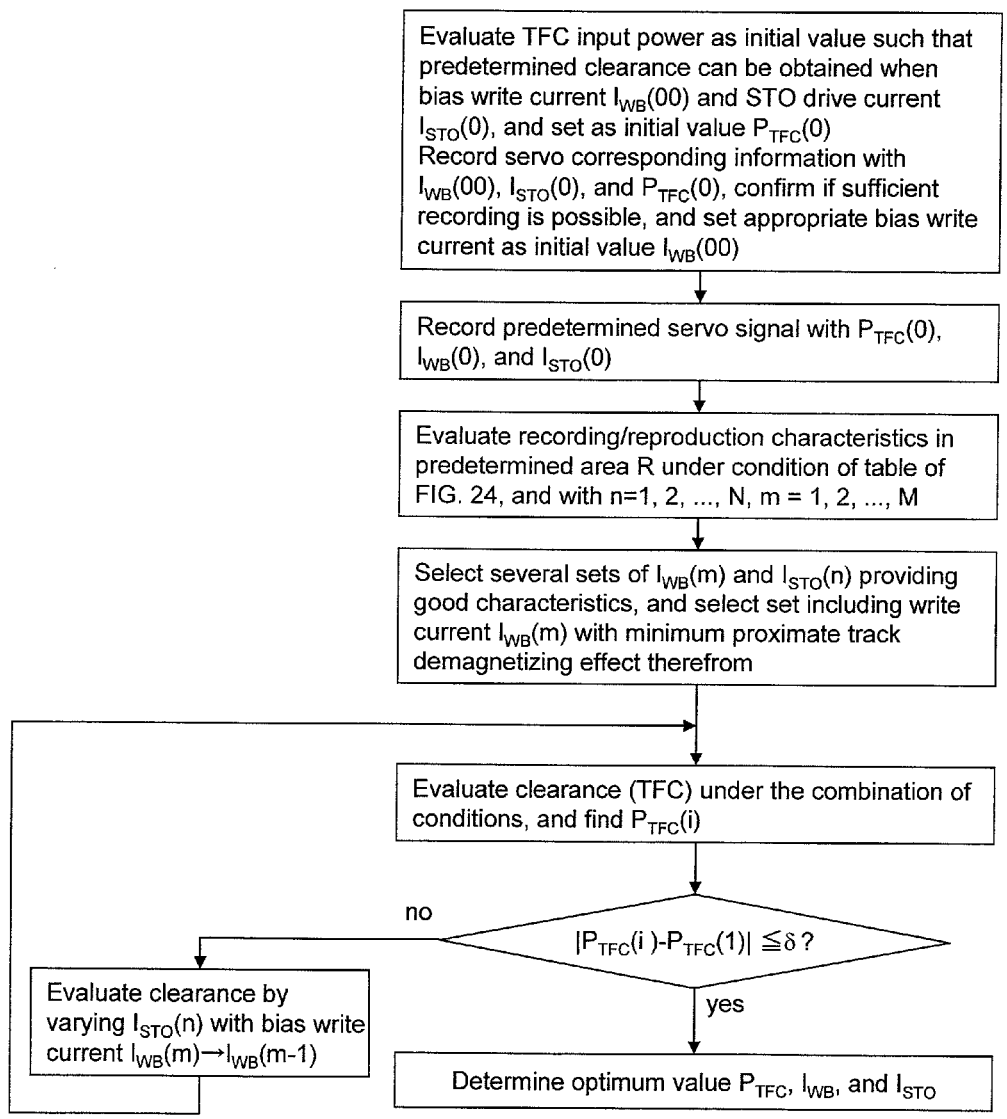
FIG. 23 illustrates an example of an apparatus manufacturing parameter setting flowchart.

FIG. 23 is a flowchart for building a perpendicular magnetic recording medium that passed the selection test and the magnetic head according to the present embodiment in 1.8 inch-type, 2.5 inch-type, and 3.5 inch-type magnetic recording apparatuses, for example, which are provided with the magnetic head drive control apparatus according to the present embodiment, and for adjusting the magnetic recording apparatuses including a servo track writer. According to the present embodiment, an MEMS-type micro stage actuator is mounted on the slider, and a control system for the actuator is mounted on the magnetic recording apparatuses. While in the present example the rotating speeds of the respective apparatuses are 4200 rpm, 15000 rpm, and 7200 rpm, the rotating speed may be 5400 rpm, 10000 rpm, and 5400 rpm, or a variable rotating speed may be used. While the respective numbers of the perpendicular magnetic recording medium and the magnetic head that are mounted are 1 and 2, 2 and 4, and 5 and 10 according to the present embodiment, obviously other combinations may be adopted.

Figure 25:
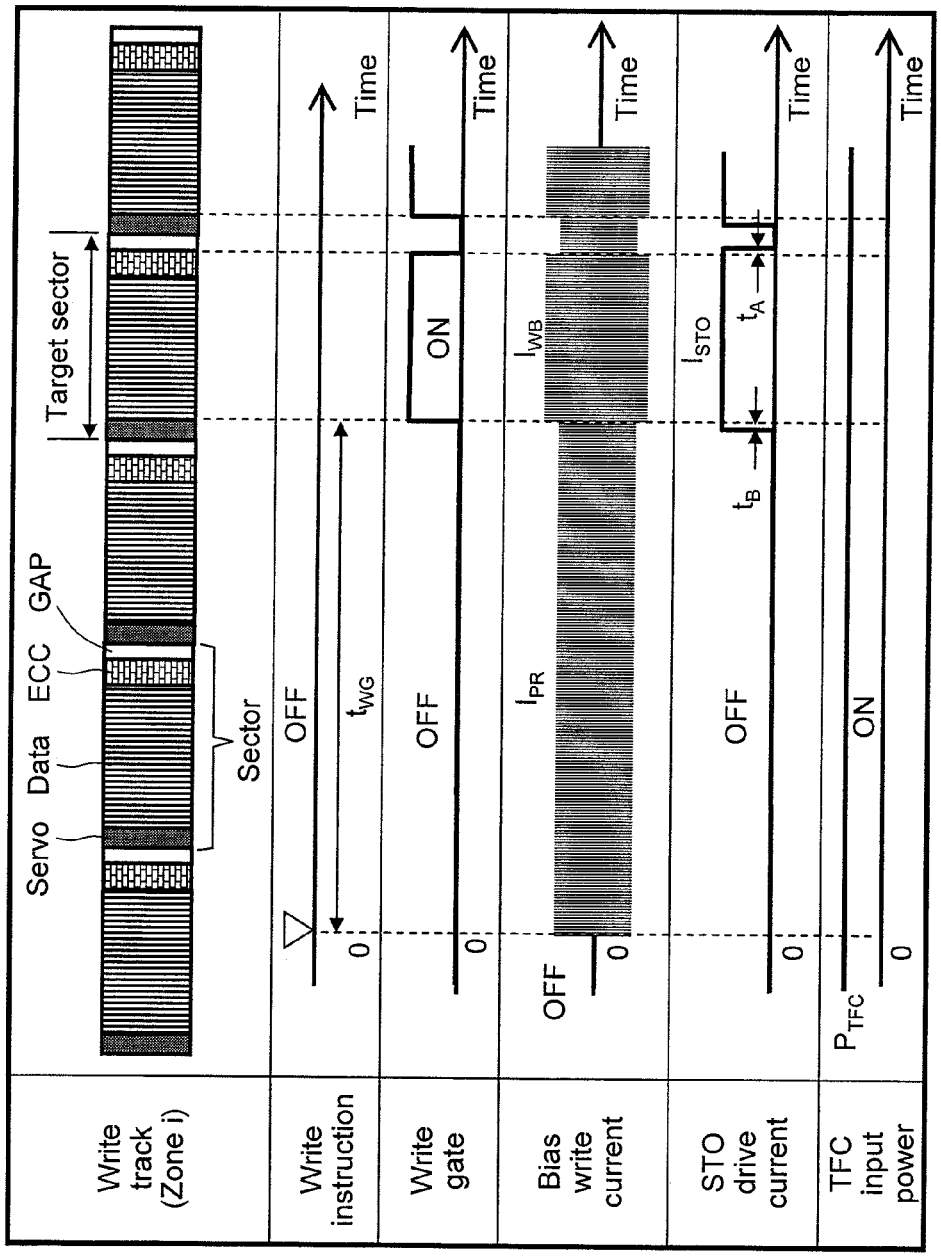
FIG. 25 is a time chart illustrating a recording operation from a recording operation pause status.

In the magnetic head drive control apparatus according to the present embodiment, as illustrated in the time chart of FIG. 25, in accordance with the input of a write gate indicating at least information recording, the operation timings for the recording signal supply means and the STO drive control means, current waveforms and current values for energizing such means, a clearance control power, a write current for the recording magnetic pole and the like are set. First, after the magnetic recording apparatus of FIG. 18 is assembled by using the magnetic head drive control apparatus, four of the magnetic heads, and two perpendicular magnetic recording media, the input power to the TFC is adjusted ($P_{TFC}(0)$) such that, with the predetermined bias write current $I_{WB}(00)$ and STO drive current $I_{STO}(0)$ applied, the STO can ensure a predetermined clearance (1.2 nm according to the present embodiment) from the perpendicular magnetic recording medium in a predetermined region thereof. This may be performed by applying power to the TFC in a successive manner, and, upon detection of contact with the perpendicular magnetic recording medium, decreasing the input power at that time by an amount corresponding to the predetermined clearance. The relationship among the clearance, the amount of thermal expansion, and the amount of input power to the TFC is clarified in advance.

Then, it is determined whether sufficient recording can be performed with the bias write current $I_{WB}(00)$, the STO drive control current $I_{STO}(0)$, and the TFC input power $P_{TFC}(0)$ according to the initial setting. When sufficient recording cannot be performed by the STO with such base recording power, the above operation is repeated while increasing the write current by approximately 5% until sufficient output can be obtained, so that the bias write current $I_{WB}(0)$ can be determined. After the bias write current is determined, servo information is recorded at a predetermined position of the perpendicular magnetic recording medium with the $I_{WB}(0)$, $I_{STO}(0)$, and $P_{TFC}(0)$ with reference to the value of the recording STO width (MCW), and the value of the MCW is re-evaluated as needed. Based on the finally confirmed MCW value, a servo signal including a ½ pitch pattern, a differential phase servo pattern, and a null-servo pattern is recorded on the entire surface of the magnetic disk. In each step, the micro stage actuator may be controlled by a standard method. The differential phase servo pattern may be particularly preferable as a servo pattern with which high positioning accuracy can be obtained even when the signal amplitude is small, and with which a further narrowing of the track can be expected. Preferably, the above control function may be provided in the magnetic recording apparatus as the servo track writer (STW) function for recording servo information in accordance with the present embodiment.

Figure 24:
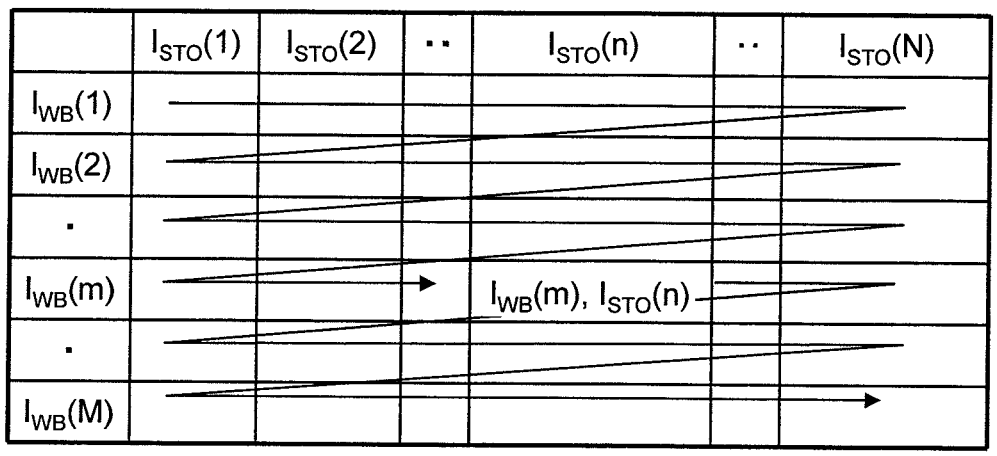
FIG. 24 illustrates a table for optimizing $I_{WB}$ and $I_{STO}$.

Further, at a predetermined track position in each zone from the inner periphery to the outer periphery of the perpendicular magnetic recording medium (circumferential region), or in a region (zone), the recording/reproduction characteristics are evaluated while $I_{WB}$ and $I_{STO}$ in the combinations of the bias write current $I_{WB}(m)$ and the STO drive current $I_{STO}(n)$ described in a table for $I_{WB}$ and $I_{STO}$ optimization illustrated in FIG. 24 are varied such that several combinations can be determined by which particularly high performance in certain aspects, such as output, overwrite (0/W), and bit error rate, can be obtained. The values in the table of FIG. 24 may be stored in the memory 518 as a parameter control table (see FIG. 26), and the evaluation may be performed by setting a necessary parameter in the register 514 as needed. The obtained parameter may be stored in the buffer 521 or the memory 518. In the present example, $I_{STO}$ is varied while $I_{WB}$ is maintained constant. Preferably, $I_{WB}$ may be varied while $I_{STO}$ is maintained constant, although a more stable result may be obtained by the former.

Next, in the same manner as described above, a current value for the $I_{WB}$ bias write current such that the proximate track recording interference characteristics, such as the ATI (adjacent track interference) and the FTI (far track interference), can be minimized is determined. Specifically, only the recording magnetic pole is energized while the STO drive current $I_{STO}$ is set to zero (=$I_{STO}$ (1)), the write current dependency of the reproduction output is evaluated, the write current $I_{WB}$ such that a predetermined value MIN of the maximum output $E_{max}$ (such as 5% of $E_{max}$) can be obtained is determined, and a combination that includes the $I_{WB}$ is selected from the above combinations. When there is more than one such combination, a combination with the lowest $I_{WB}$ may be selected as the optimum values. Preferably, an optimum combination of $I_{WB}$ (m) and $I_{STO}$ (n) such that the best anti-ATI characteristics can be obtained may be selected by evaluating the proximate track recording interference characteristics (ATI and FTI) simultaneously. If the ATI does not satisfy a predetermined value by the former method, the value of MIN or $I_{WB}$ may be decreased or adjusted as needed, and then similar optimization and performance confirmation may be performed. The resultant parameters may be stored in the buffer 521 or the memory 518.

Then, based on this combination of parameters, the input power $P_{TFC}$ to the TFC and the clearance are measured again. If the clearance does not correspond to the predetermined value (1 nm in the present example) for the apparatus specifications (i.e., if the input power $P_{TFC}$ (i) is not in a predetermined value range), the write current $I_{WB}$ is decreased by a notch, the amount of energization $I_{STO}$ to the STO is optimized, and it is evaluated again whether the clearance is in the predetermined range. The process is repeated until the clearance falls in the predetermined range, whereby the final optimum values for $I_{WB}$, $I_{STO}$, and $P_{TFC}$ are determined. While not described herein, compensation of the timing of the write current $I_W$ in accordance with the recording pattern, i.e., the so-called write pre-compensation, may be automatically performed. The optimum values are stored in the memory unit in the form of a parameter table. The optimum values are appropriately set in the register of the magnetic head drive control apparatus by the MPU at the time of a recording or reproduction operation, and used for controlling the magnetic recording apparatus operation.

When the characteristics of the magnetic recording apparatuses according to the present embodiment that was adjusted as described above were evaluated, the characteristics were extremely good in terms of both track density and recording density, and the respective recording densities of 2.2 Tb/in$^2$, 2.5 Tb/in$^2$, and 2.8 Tb/in$^2$ were observed, indicating that high recording density of approximately 1.5 times that according to the conventional microwave assist technology can be achieved. After recording and reproduction were repeated 200 times in the same track, the bit error rate in the proximate track was evaluated, and the amount of degradation was within the range of error in each of the apparatuses according to the embodiments illustrated in FIGS. 13, 14, and 15, thus indicating no degradation of practical concern. Further, the manufacturing yield of the magnetic recording apparatuses was increased by 20 points or more compared with that of the related-art technology, indicating that a high-capacity and highly reliable magnetic recording apparatus can be obtained at high yield. When the micro actuator was operated, an improvement in positioning accuracy or performance by approximately 15% over when the micro actuator was not operated was achieved, which is particularly preferable.

It has been confirmed that, when the perpendicular magnetic recording medium with the coercive force on the order of 5 to 5.5 kOe as measured by the VCM is mounted on the magnetic recording apparatuses provided with the magnetic head drive control apparatus according to the present embodiment, a recording density of 1 Tb/in$^2$ or more, specifically, 1.1 Tb/in$^2$, 1.2 Tb/in$^2$, and 1.4 Tb/in$^2$, can be achieved.

[Seventh Embodiment]

According to the present embodiment, an example of another high track density magnetic recording apparatus will be described.

FIG. 18 illustrates the magnetic recording apparatus according to the present embodiment including the magnetic head of the configuration of FIG. 13 with the structure in the vicinity of the write gap portion 22 illustrated in FIGS. 27 to 30; the high coercive force perpendicular magnetic recording medium described with reference to FIG. 14; and the head drive control apparatus according to the embodiment. In FIGS. 27 to 30, the upper figure is a lateral cross sectional view and the lower figure is a view as seen from the ABS surface.

Figure 27:
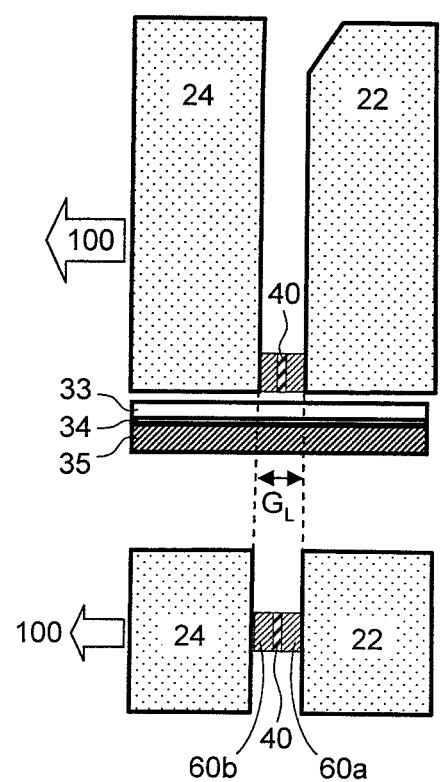
FIG. 27 illustrates a structural example in the vicinity of the write gap of the microwave assisted magnetic head according to an embodiment.
Figure 28:
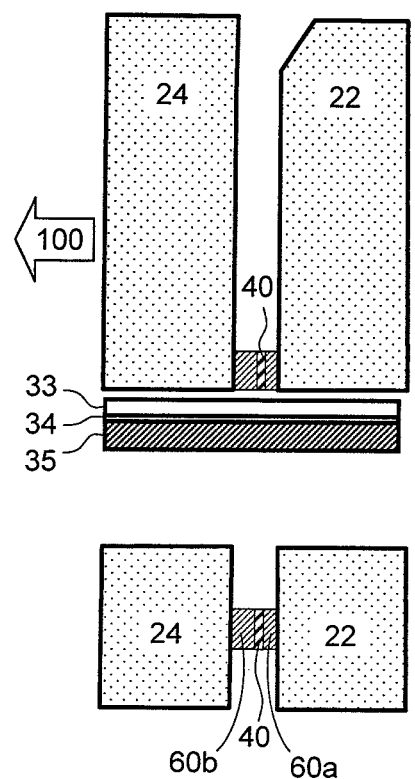
FIG. 28 illustrates a structural example in the vicinity of the write gap of the microwave assisted magnetic head according to an embodiment.
Figure 29:
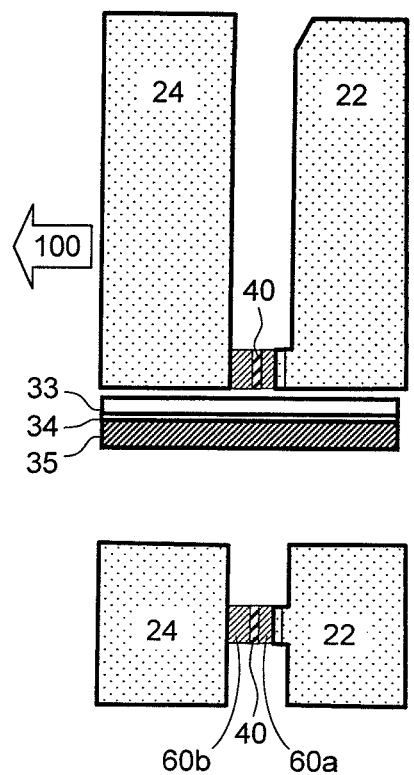
FIG. 29 illustrates a structural example in the vicinity of the write gap of the microwave assisted magnetic head according to an embodiment.
Figure 30:
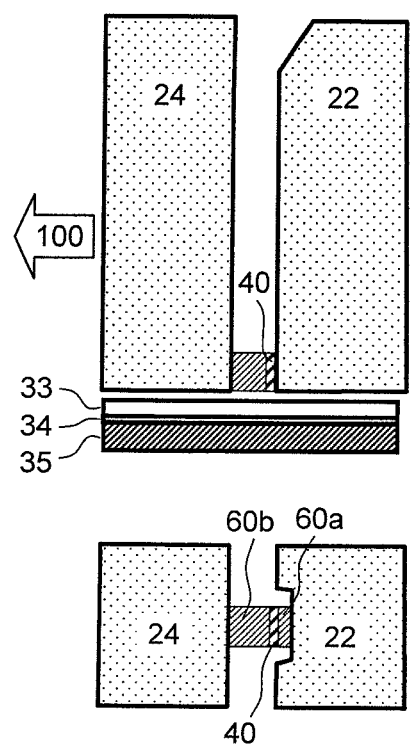
FIG. 30 illustrates a structural example in the vicinity of the write gap of the microwave assisted magnetic head according to an embodiment.

The first and second recording magnetic poles 22 and 24 include a single layer of a CoFe soft-magnetic film with a high-saturation magnetic flux density formed by plating. FIG. 27 illustrates a structure in which the STO 40 (particularly the FGL) is disposed at substantially the center of the first and second magnetic poles 22 and 24 such that the symmetric characteristics of the recording field and the FGL can be utilized. FIG. 28 illustrates a structure in which the STO 40 (particularly the FGL) is disposed at an asymmetric position with respect to the center of the gap. For example, the FGL is disposed in the vicinity of the first magnetic pole 22. FIG. 29 illustrates a structure in which the second magnetic pole has a protrusion with the same track width as that of the STO. In this structure, the STO 40 (particularly the FGL) is disposed in contact with the protrusion at substantially the center of the first and second magnetic pole or in the vicinity of the second magnetic pole such that the recording field region by a recording magnetization and the assist magnetic field region by the FGL are substantially aligned with each other. FIG. 30 illustrates a structure in which the second magnetic pole has a recess wider than the width of the STO, and in which the STO 40 (particularly the FGL) is disposed substantially surrounded by the recess such that the side magnetic field of the FGL can be made sharper. The STO and the magnetic pole are electrically connected to each other via conductive material 60a and 60b and yet electrically insulated from each other at the back gap portion of the magnetic head (in the vicinity of 27 in FIG. 1) so that the first and second magnetic poles can be shared with STO drive terminals. The width $W_{FGL}$ of the FGL is 40 nm, the reproduction element width $T_{wr}$ is 33 nm, and the width $T_{WW}$ of the ring-type recording magnetic pole 22a is 120 nm.

The magnetic recording apparatuses included a 2.5-type HDD measuring approximately 5 mm in height for 5400 rpm, with one perpendicular magnetic recording medium and one magnetic head; and a 3.5 inch-type HDD measuring 26.1 cm in height for 5400 rpm, with five perpendicular magnetic recording media and 10 magnetic heads. The magnetic recording apparatuses were adjusted in accordance with the flowchart of FIG. 23, including the servo track writing by the magnetic recording apparatuses. An evaluation of the characteristics of the magnetic recording apparatuses indicated that the recorded track width was determined by the width of the FGL in any of the structures of FIGS. 27 to 30, as in the case of the fifth embodiment. Specifically, the recorded track widths were 44 nm, 43 nm, 42 nm, and 42 nm, respectively. Thus, it has been confirmed that good narrow track microwave assisted recording can be performed. Particularly, in the structures of FIGS. 29 and 30, a greater effect of suppressing the increase in recording field width was observed, thus indicating a greater effect in achieving a narrow track. Compared with the structure of FIG. 27, the S/N in the structures of FIGS. 29 and 30 was higher by 1 dB, thus indicating the best characteristics, and in the structure of FIG. 28, the S/N was higher by 0.5 dB, thus indicating slightly better characteristics.

Further, an apparatus was assembled which included a magnetic head with the above recording unit configuration which had a 20% narrower width of the reproduction element 12 and of which the reproduction element characteristics had been strictly selected; a high coercive force perpendicular magnetic recording medium with the configuration described with reference to FIG. 15 with the coercive force increased by 10%; and the magnetic head drive control apparatus according to the embodiment and adjusted on the basis of a combination of the shingled write recording system with the track pitch narrowed by 20% and the adjusting method according to the flowchart of FIG. 23. As a result, it was confirmed that recording can be performed with a narrower recorded track width than the track width of the FGL, and that an approximately 20% increase in track density and an approximately 10% increase in linear recording density can be achieved compared with the foregoing apparatuses. By combining this apparatus with a damper-equipped high-rigidity suspension arm, and an apparatus shroud for suppressing the rotation vibration of the perpendicular magnetic recording medium, for example, an increase in positioning accuracy of 15% was achieved, enabling high-accuracy positioning suitable for the shingled write recording system.

[Eighth Embodiment]

According to the present embodiment, a magnetic recording apparatus that has excellent characteristics not only for operation at room temperature but also in the entire apparatus-guaranteed temperature area range will be described.

The coercive force of the perpendicular magnetic recording medium varies at approximately 20 Oe/° C. Thus, in the high coercive force perpendicular magnetic recording medium of approximately 6 kOe at room temperature, the coercive force is changed by as much as 2 kOe when the ambient temperature of the magnetic recording apparatus is changed from 80° C. to −20° C., for example. Thus, if the coercive force is changed by approximately 30% by an external environment change, the magnetization reversal asteroid curve is greatly changed. Accordingly, as described in detail with reference to FIG. 9, the proper values for the effective magnetic field and the magneto-motive force as the basis for determining the magnetization reversal such that high track density recording can be performed suitably are also greatly changed. Thus, it is particularly important to adjust the magneto-motive force in accordance with the temperature change in order to enable narrow track recording according to the second-generation microwave assisted recording system.

The magnetic recording apparatus according to the present embodiment includes the magnetic head and the perpendicular magnetic recording medium described with reference to the first to the seventh embodiments and is assembled similarly to the fifth and the sixth embodiments. The magnetic recording apparatus is additionally provided with an external/internal environment detection function and a correction function for readjusting the various parameters on the basis of information about a change in the outside or inside of the apparatus detected by the external/internal environment detection function. According to the present embodiment, these functions are implemented by, in the case of a magnetic disk drive HDD, for example, providing the magnetic recording apparatus of FIG. 18 with the magnetic head drive control apparatus (R/W-IC) having the function of adjusting, particularly, the bias write current $I_{WB}$, the STO drive control current (or control voltage as needed), and the TFC drive power in accordance with the ambient temperature detected by a temperature sensor and the like disposed in the signal supply wiring portion FPC 507, which is installed within the HDD disk enclosure illustrated in FIG. 18.

Figure 31:
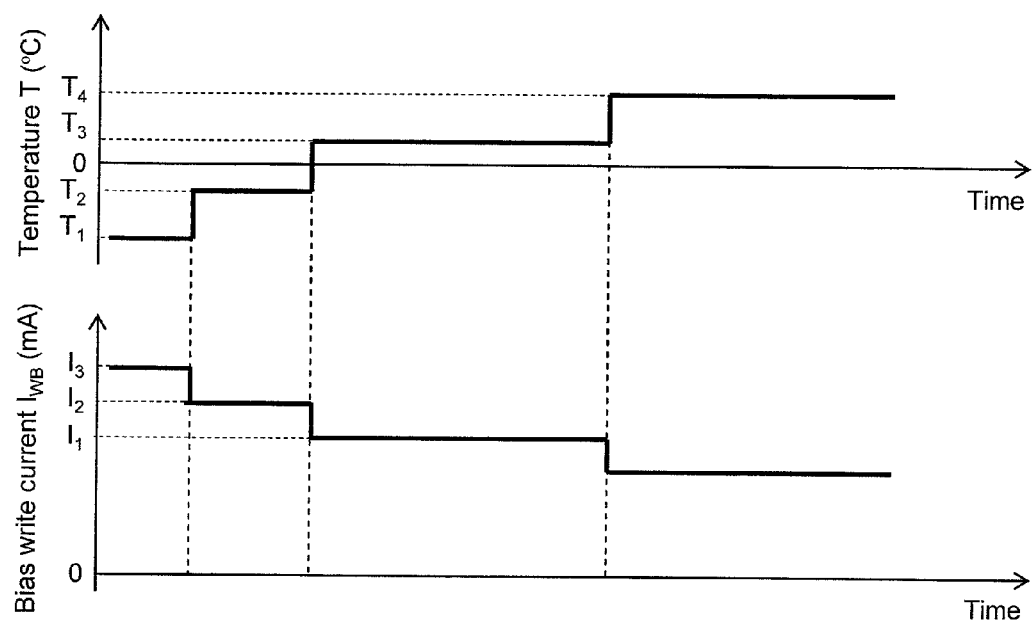
FIG. 31 illustrates an example of the adjustment of write current relative to ambient temperature according to an embodiment.

The bias write current may be adjusted by the above function as follows. During the manufacture of the apparatus, the write current is optimized for each temperature at the time of initial manufacturing test, for example, when the ambient temperature is changed. Then, the apparatus-specific parameters are extracted and stored in the memory 518 or 519 in the form of a temperature parameter table. In an environment in which the apparatus is used after shipping, when the internal ambient temperature of the apparatus is changed by a predetermined amount, the parameters are set in the register of the magnetic head drive control apparatus (R/W-IC) such that the recording conditions can be changed as needed. In a simpler method, the bias write current $I_{WB}$, for example, may be adjusted in each of five separate temperature regions, as illustrated in FIG. 31, in which the region dividing temperatures are −10° C., 10° C., 30° C., and 55° C. according to the present embodiment.

Figure 32:
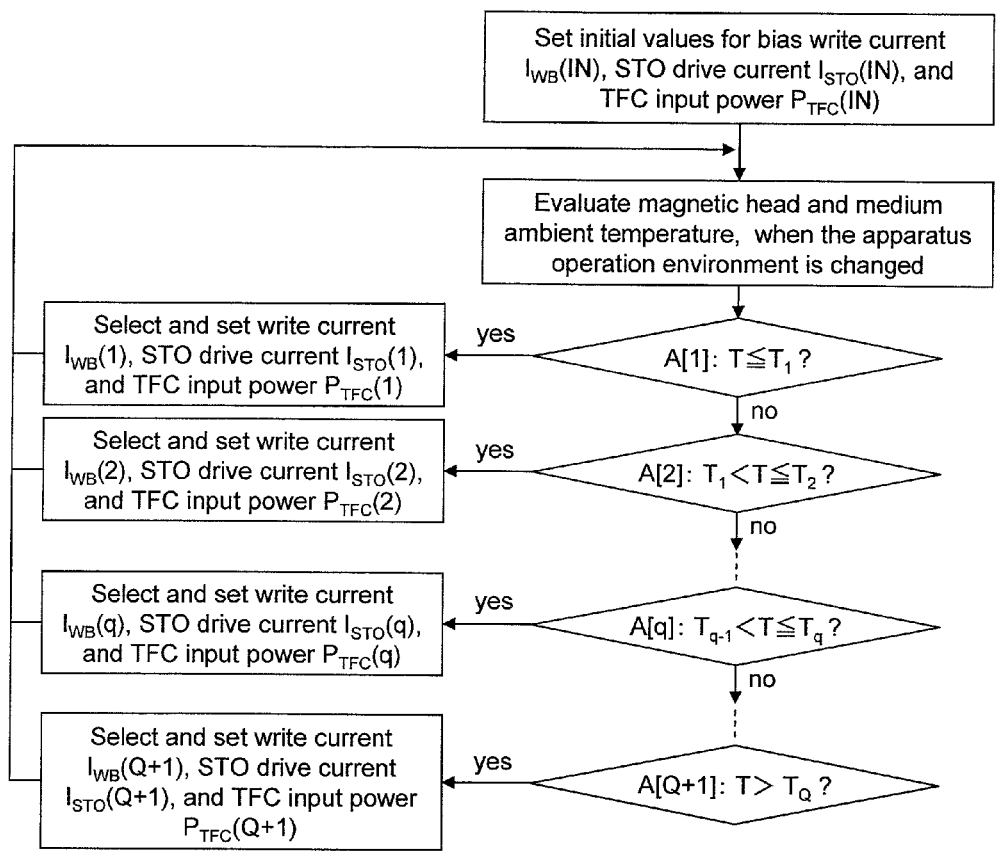
FIG. 32 is a flowchart for adjusting write current, STO drive current, and TFC input power in accordance with a change in ambient temperature.

FIG. 32 is a flowchart of a more general example of the parameter setting according to the present embodiment, in which, when the apparatus operation environment is changed, the bias write current, the STO drive current, and the TFC input power are adjusted in Q+1 separate temperature regions.

First, the entire temperature range is divided into Q+1 (Q: 0, 1, 2, . . . ) regions by the boundary temperatures of $T_1$, $T_2$, . . . , and $T_Q$. When Q=0, the range is not divided. The temperature regions $T \le T_1$, . . . , $T_{q-1} < T \le T_q$, . . . , $T_Q < T$ are defined as the temperature regions A[1], . . . , A[q], . . . , A[Q+1].

Initially, the parameters are determined by the flow of FIG. 23 during the manufacture of the magnetic recording apparatus, and the initial values for the bias write current, the STO drive current, and the TFC input power are set to $I_{WB}$ (IN), $I_{STO}$ (IN), and $P_{TFC}$ (IN), respectively. Further, appropriate representative points for the temperature regions are determined in a predetermined step, such as the manufacturing step or inspection step, and optimum parameters at the representative temperatures are determined in advance in accordance with the flow of FIG. 23 and stored in the memory 518 and the like in the form of the parameter table. Then, when the temperature is changed beyond the predetermined setting value, the parameters are set in the register of the magnetic head drive control apparatus (R/W-IC) so as to optimize the recording condition as needed. Preferably, the parameters at the respective temperatures may be determined by registering the parameters for the normal apparatus internal temperature of 30° C. in the parameter table, reading an internal apparatus temperature T from a temperature sensor at the time of recording or reproduction, calculating a temperature difference ΔT from the normal temperature, and performing a temperature correction by adding a temperature correction value obtained by multiplying an average conversion coefficient per unit temperature, which may be determined in advance through an experiment based on a number of samples.

When the external ambient temperature is changed in the actual operation environment of the magnetic recording apparatus on the field such that the apparatus internal ambient temperature T surrounding the magnetic recording head of the magnetic recording apparatus and the perpendicular magnetic recording medium enters the temperature region A [q], recording or reproduction is performed by changing the bias write current supplied to the recording magnetic pole to the current value $I_{WB}$ (q) in accordance with the respective temperature region. Generally, the optimum values for TFC setting value, the STO drive current and the like are also changed depending on the temperature. Thus, preferably, the TFC input power $P_{TFC}$ and the STO drive current $I_{STO}$ may also be adjusted correspondingly. When making an adjustment, it is extremely important to change the parameters while shifting the operation timing, such as changing the TFC control power first, which has a long time constant on the order of 0.1 to 0.2 ms before stabilizing.

The foregoing example involves an operation using a single representative parameter in each region. More preferably, a parameter may be interpolated or extrapolated, or the respective parameters may be approximated by an approximate curve, and the parameter value for a particular temperature may be determined in accordance with the approximation formula, and the operation conditions may be set for the value. While according to the present embodiment the setting values are changed when the ambient temperature is changed by 2° C. or more in view of performance, the initial setting may be changed depending on the purpose, or a learning effect may be provided as needed.

A ring-type microwave assisted magnetic head of the magnetic pole structure of FIG. 27 with the high recording field width expansion suppressing effect, including the FGL width of 30 nm and the recording magnetic pole width of 80 nm, and a microwave assisted magnetic head including a conventional main magnetic pole type magnetic pole with both the FGL and main magnetic pole measuring 30 nm in width were mounted on a magnetic disk drive provided with the head drive control apparatus according to the present embodiment, and the characteristics of the apparatus were evaluated by using the perpendicular magnetic recording medium illustrated in FIG. 41 with the effective anisotropy magnetic field of 12 kOe at each temperature. The result of the evaluation showed a greater microwave assist effect in each head in a low temperature region in which the coercive force is increased. For example, at −10° C., the recorded track width for the conventional main magnetic pole type magnetic head and the ring-type longitudinal recording head according to the present embodiment was 35 nm and 33 nm, respectively, indicating an improvement in the SER by 1.5 and 3 orders of magnitude, respectively. However, in the conventional main magnetic pole type magnetic head, approximately ten points of examples were present in which, even for an evaluation acceptable product at room temperature, the microwave oscillation operation at low temperature was defective or no significant improvement in performance was observed, depending on the manufacturing process variation (such as the STO height). This is due to the fact that the apparent temperature dependency of the FGL oscillation characteristics is increased because of the large direction distribution of the STO drive magnetic field within the write gap portion. In contrast, in the ring-type microwave assisted magnetic head according to the present embodiment, no such defect or degradation was observed. At high temperature, no problem was observed in both heads. Thus, it has been confirmed that the ring-type head according to the present embodiment has excellent characteristics with respect to a temperature environment change as well.

Next, a similar evaluation was conducted by using the perpendicular magnetic recording medium of FIG. 3 with the effective anisotropy magnetic field $H_k$ of 16 kOe. As a result, it was confirmed that, while the overwrite (O/W) was 20 dB or less in the case of the microwave assisted magnetic head with the main magnetic pole type magnetic pole according to the comparative example and sufficient recording could not be performed, an extremely high O/W of 40 dB or more was ensured in the case of the ring-type microwave assisted magnetic head according to the present embodiment, as described with reference to the second embodiment, so that sufficient recording can be performed.

Thus, an average SER was evaluated in all of the zones of the perpendicular magnetic disk on a magnetic disk drive provided with the ring-type microwave assisted magnetic head according to the present embodiment, in the case in which the adjustment according to the present embodiment was made at each temperature and the case in which the adjustment was not made. As a result, sufficient recording could not be performed with only the magnetic field from the ring-type head with only the magnitude of the magnetic field adjusted, in which case the O/W was on the order of 20 dB (55° C.) to 10 dB (−10° C.) at a maximum. In contrast, when the bias current and the bias magnetic field of the ring-type head as well as the microwave were adjusted in accordance with the adjusting method according to the present embodiment, the SER was improved by two orders of magnitude at −10° C. At higher temperatures, when the adjustments are not made, the magnetic pole may protrude due to heating by the energization of the magnetic head such that, in the case of the magnetic head in which the clearance is at the lower limit of variation, the perpendicular magnetic recording medium may contact the head at the ratio of 3 to 5%, thus wearing the head or the medium and resulting in a characteristics degradation or reliability problem. In contrast, by performing the present adjusting method, sufficient clearance can be ensured without causing any degradation in the SER or the O/W or reliability problems.

Normally, the temperature change in the magnetic recording apparatus is slow and may be dealt with by the adjustment according to the foregoing embodiment. However, a rapid ambient temperature change in an adverse environment may not be successfully dealt with. In such a case, a problem may be caused more often in regards the recording function, which is more temperature-sensitive than the reproduction function, in the perpendicular recording magnetic recording apparatus, and therefore providing a countermeasure for the problem may be effective. Thus, an external ambient temperature change was detected by using a temperature sensor disposed outside the disk enclosure and compared with the internal ambient temperature so as to calculate a characteristics change inside the disk enclosure as predicted from the temperature change by a prediction formula that is experimentally prepared in advance, and a required parameter a predetermined time later. Then, degradation in performance due to a rotation standby operation (a loss on the order of 5 ms) for performing recording again after a characteristics change, for example, was minimized by storing an appropriate parameter from the memory into the register of the magnetic head drive control apparatus as needed for compensation, changing at least the bias write current and the STO drive current, and controlling the bias write current and the STO drive current to setting values corresponding to a steady temperature by using a parameter table as needed until the characteristics are transiently changed and stabilized. Further, the problem of a decrease in clearance, head wear, reliability degradation and the like, which may be caused by a failure to track a speed change and the resultant excessive bias current, can be addressed, so that the robustness of the apparatus can be greatly increased.

Similarly, performance degradation in the case of a rapid atmospheric pressure change can be minimized by storing a predicted appropriate parameter from the memory into the register of the magnetic head drive control apparatus in accordance with a clearance change predicted from the atmospheric pressure change detected by atmospheric pressure sensors provided inside and outside the enclosure, changing the bias write current, the STO drive current, and the TFC input power, and appropriately controlling the bias write current and the STO drive current as needed until the clearance is transiently changed such that the atmospheric pressure change can be tracked, as described above with reference to the foregoing embodiments. In this way, the robustness of the magnetic recording apparatus can be greatly increased.

Further, when a phenomenon in which recording performance is suddenly degraded is repeated within a certain period, which may suggest a state in which organic smear is attached such that the floating amount of the HGA or the clearance is temporarily changed, the robustness of the magnetic recording apparatus can be greatly increased by removing the foreign matter by withdrawing the HGA into a predetermined region, or adjusting the bias write current or the STO drive current to a value corresponding to the clearance until the original state is resumed.

While in foregoing embodiment has been described with reference to the magnetic disk drive (HDD), the concept of the present embodiment may be applied to other magnetic recording apparatuses, such as a magnetic tape apparatus.

[Ninth Embodiment]

Figure 33:
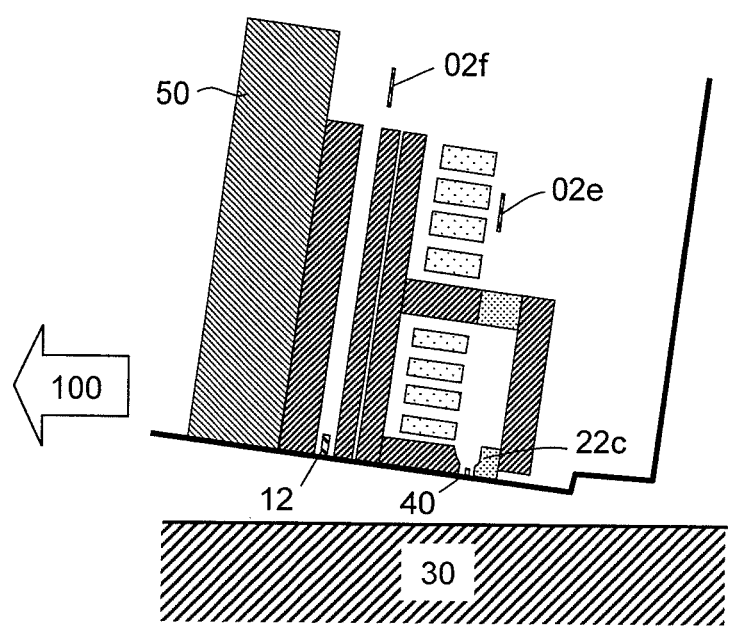
FIG. 33 illustrates the microwave assisted magnetic head according to another embodiment.

FIG. 33 illustrates a microwave assisted magnetic head according to an embodiment. According to the present embodiment, the magnetic head and the perpendicular magnetic recording medium described with reference to FIG. 15 are built in the magnetic disk drive of FIG. 18. The bias write current $I_{WB}$, the TFC input power $P_{TFC}$, and the STO drive current $I_{STO}$ are adjusted in accordance with an ambient temperature change detected by a temperature sensor and the like disposed in a signal supply wiring unit FPC installed in the disk enclosure.

The magnetic head according to the present embodiment has the basic configuration of FIG. 15 with the number of coil turns of 4, and includes TFC elements 02e and 02f disposed on the recording element side and the reproduction element side, respectively, such that the clearance of the recording element and the reproduction element can be respectively adjusted. This is effective in improving performance because the clearance dependency of the high-frequency magnetic field is greater than the clearance dependency of the recording field from the ring-type magnetic pole in particular. The wiring for the two TFCs may be independently provided. Preferably, the number of terminals may be decreased by optimizing the position of each TFC element such that both the recording head and the reproducing head can be located at the lowest point during operation while adjusting the resistance value of the TFC elements by using different material with different resistance values, such as NiCr and W, or by varying their composition, line width, or film thickness, and by connecting and operating the TFC elements in series.

Figure 34:
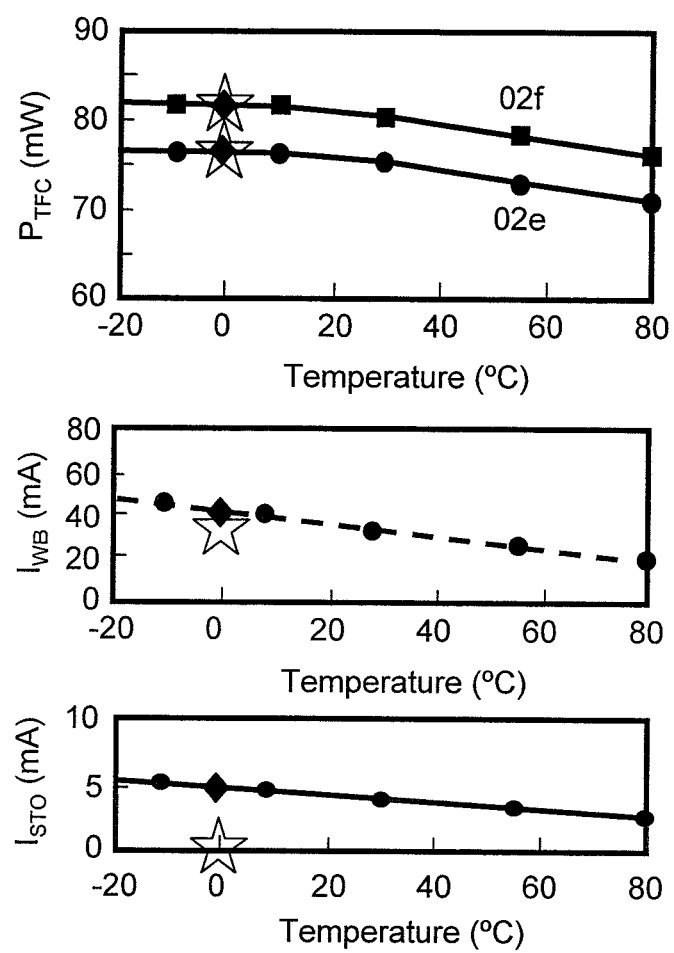
FIG. 34 illustrates the adjustment of write current, STO drive current, and TFC input power in accordance with a change in ambient temperature.

In the magnetic recording apparatus of FIG. 18, six HGAs including the slider and three of the 2.5 inch-type perpendicular magnetic recording media described with reference to FIG. 15 were built in a 3.5 inch-type casing for 15000 rpm, and the apparatus was adjusted by the method described with reference to the sixth embodiment. The present apparatus had been adjusted by the method described with reference to the fifth embodiment at the time of manufacture, and further the optimum TFC input power, bias write current $I_{WB}$, and STO drive current $I_{STO}$ for −10° C., 10° C., 30° C., 55° C., and 80° C. were determined by a method similar to the method of the sixth embodiment. Further, the coefficients of an approximate curve that connects the values smoothly, such as a quartic approximate curve, were stored in the parameter table. FIG. 34 illustrates the setting result for each temperature, from which it is seen that the bias write current $I_{WB}$, the TFC input power $P_{TFC}$, and the STO drive current $I_{STO}$ are all set to be increased with good linearity at low temperature, thus indicating the control system as a whole is stable. The data indicated by stars and rhombuses in the figure will be described with reference to the tenth embodiment. It is also seen that the TFCs 02e and 02f exhibit a similar temperature dependency, indicating that there is no problem in the series wiring. Preferably, as in the eighth embodiment, the parameters for each temperature may be determined by registering the parameters at the apparatus internal normal temperature of 30° C. in the parameter table, reading the apparatus internal temperature T from a temperature sensor during recording or reproduction, calculating a temperature difference ΔT from the normal temperature, and correcting the parameters for temperature by adding a temperature correction value that is determined by multiplying the temperature difference ΔT with a conversion coefficient per unit temperature, which may be experimentally determined in advance.

When the magnetic recording apparatus according to the present embodiment was evaluated while the temperature environment was varied, a good clearance balance was observed for the recording and reproduction elements at each temperature and proper recording/reproduction conditions were obtained, so that the average SER at all temperatures was improved by approximately one-half order of magnitude compared with the ninth embodiment with a single TFC element, thus indicating a good operation. Similar effects were also observed when the magnetic recording apparatus including the magnetic head drive apparatus according to the present embodiment was equipped with the magnetic head, according to the present embodiment and a perpendicular magnetic recording medium that is currently used as a standard.

[Tenth Embodiment]

In the conventional perpendicular magnetic recording apparatus, when the recording element is magnetized (high density recording) with a high-frequency wave, the recording element may be heated to the same level as the TFC due to magnetic loss, which may cause the magnetic pole unit to protrude. Thus, generally, the input power to the TFC (namely, the amount of protrusion of the main magnetic pole, or clearance) is adjusted and set in a thermal equilibrium state assuming such an energized recording operation. Accordingly, when the magnetic recording apparatus is in a low temperature pause state or a non-recording operation state in which the apparatus is performing a following operation at low temperature or normal temperature for a certain period of time, even if the recording element is energized and recording is started at the timing of the write gate outputted from the HDC on the basis of a recording or reproduction instruction from the host system, a recording failure tends to occur immediately after the start of recording because the main magnetic pole is relatively contracted and therefore the clearance from the medium is increased, which is a serious problem.

The high-frequency magnetic field from the FGL is small compared with the recording field from the main magnetic pole, and the clearance dependency of the high-frequency magnetic field from the FGL is more than that of the recording field from the main magnetic pole. An initial analysis of the microwave assisted recording by the main magnetic pole type magnetic head revealed that this phenomenon poses a more serious problem in the conventional microwave assisted system. In the magnetic recording apparatus according to the present embodiment, this problem is overcome by fully utilizing the feature that demagnetization of the perpendicular magnetic recording medium, for example, does not occur even when the ring-type magnetic core is energized with a bias write current. Specifically, according to the present embodiment, the bias write current is caused to flow at a predetermined timing prior to recording such that the element temperature and the clearance have practically acceptable values at the start of the recording operation.

In the following, an adjusting method according to the present embodiment will be described with reference to an example in which a recording or reproduction instruction is issued from the host system such as a computer when the magnetic recording apparatus for the second-generation microwave assisted recording according to the present embodiment is in a low temperature pause state or a non-recording operation state at low temperature or normal temperature.

In the conventional magnetic recording apparatus, a recording operation is started at the timing of the write gate outputted from the HDC. The write gate only has the standard function of supplying a write current corresponding to recording information to the magnetic head by being supplied to the magnetic head drive control apparatus. Thus, according to the present embodiment, the magnetic head drive control apparatus 508 of the magnetic recording apparatus described with reference to FIG. 18 is provided with the function of supplying a preliminary operation current and a bias write current directly in response to the recording or reproduction instruction from the host system such as a computer. Further, by using this function, an interface with the host system is provided as will be described below. In response to the instruction directly from the MPU 510, which, as the main control apparatus for the magnetic recording apparatus, performs recording or reproduction operation control, magnetic head positioning servo control and the like, the magnetic head drive control apparatus 508 supplies the preliminary operation current to the magnetic head. The recording operation is started in accordance with the timing of the write gate outputted from the HDC 511. The MPU sets in various registers included in the magnetic head drive control apparatus, information (parameters) necessary for the operation of the magnetic head drive control apparatus, such as the preliminary current value and a current pattern thereof, a bias write current value, an overshoot value, a STO drive current value (drive signal level) and the like independently.

The magnetic recording apparatus with the above function according to the present embodiment may be assembled and adjusted by the method described with reference to the fifth and the sixth embodiments. In the following, a basic operation of the present apparatus will be described. The apparatus operation is started by measuring the ambient temperature of the recording magnetic pole, the high-frequency magnetic field oscillator, and the perpendicular magnetic recording medium by using a temperature sensor in the enclosure, for example. The outline of an adjusting sequence according to the present embodiment for starting a recording operation from the recording operation pause state in which the magnetic recording apparatus has been in for a certain period of time will be described with reference to the apparatus configuration of FIG. 18, the setting parameters of FIG. 34, and the time chart of FIG. 25, assuming that the ambient temperature is 0° C. for simplicity's sake.

In response to the instruction issued from the host system such as a computer to the MPU 510, an optimum combination of the values of the current value $I_{WB}$ and $I_{STO}$ and the TFC input power $P_{TFC}$ for the ambient temperature is determined by using the parameter table of FIG. 26, which is determined by the adjusting method described with reference to the ninth embodiment, such that recording can be performed in a predetermined sector in the recording track of a predetermined zone $Z_j$ of the medium with the magnetic head $H_i$ (the stars in FIG. 34). This parameter determination operation may be performed when the apparatus has been in the pause state for a certain period of time. In the example of FIG. 25, the TFC is supplied with the power for standby also at the time of following. Preferably, however, when the standby time exceeds a predetermined time, the input power may be decreased in a stepwise manner in accordance with the standby time, and $P_{TFC}$ may be supplied simultaneously with the recording instruction. In this way, degradation in slide-resistance reliability due to head contact wear and the like at the time of following can be prevented. However, it is necessary to delay the start of the recording operation by the predetermined time because it takes approximately 0.1 ms before a thermal steady state is achieved and the amount of protrusion of the magnetic pole becomes constant after the TFC is operated.

The MPU 510 issues an instruction to the magnetic head drive control apparatus 508 such that the TFCs 02e and 02f are energized with the TFC input power $P_{TFC}$ for 0° C. (stars in FIG. 34) while the ring-type magnetic core is energized with the preliminary operation current $I_{PR}$ corresponding to a predetermined value of the bias write current $I_{WB}$ (a star in FIG. 34). In the example of FIG. 25, $I_{PR}$ is 75% of $I_{WB}$. While the signal pattern for the preliminary operation current may have any pattern as long as it is an average recording pattern, the recording frequency may preferably be increased so as to minimize the absolute value of the write current. In the present example, a minimum bit pattern of 1T (101010 . . . ) is used. The overshoot may be as per the setting for recording, or may be adjusted as needed depending on the situation. The signal STO drive current $I_{STO}$ may be zero or applied in a very small amount in the opposite direction (indicated by a star in FIG. 34). Preferably, these predetermined values may be evaluated and determined experimentally in advance and then determined by learning as needed in accordance with a program.

Further, the HDC 511 is instructed to output the write gate indicating the timing for recording at an appropriate timing and with the delay time $T_{WG}$ to the R/W channel 509. The STO is energized with a predetermined value of $I_{STO}$ in accordance with the recording timing. Further, the ring-type magnetic core is energized with the bias write current $I_{WB}$ including recording information at the recording timing so as to perform recording. The time before the temperature reaches a steady state after the record core is energized may be on the order of 0.01 ms to 0.1 ms, depending on the recording condition. Thus, the problem of record failure can be completely avoided by adjusting the delay time $T_{WG}$ for enabling the temperature around the recording or reproduction elements to reach a substantially steady state for stable recording in the range on the order of several sectors (0.1 ms at a maximum) in accordance with the external environment, peripheral speed, and transfer rate of the apparatus. While the example of FIG. 25 involves a delay of two sectors in the case of a 4 kB sector format, the delay may be one sector. Preferably, the timing of $I_{STO}$ energization may be earlier than the timing of the record bias current $I_{WB}$ energization by $t_B$ for stable oscillation of the STO. Conversely, the timing for ending the $I_{STO}$ energization may be delayed by $t_A$ for preventing writing failure. For the delay time or the timings, certain proper values may be initially set at the time of manufacturing process setting depending on the purpose of the apparatus. The delay time or the timings may be adjusted as needed depending on the apparatus use environment. Obviously, such adjustment is not particularly required in the steady state. It is not preferable to attempt to overcome the problem by adjusting the amount of protrusion via the TFC because the time before the amount of protrusion can reach a steady state after the TFC is energized is long, such as on the order of 0.1 ms to 0.2 ms, and, if a recording operation is performed in addition to the adjustment by the TFC, the magnetic pole may protrude excessively and wear the head even when the TFC power is finely adjusted.

Conventionally, the write current or the TFC input power may be set rather excessively so as to prevent the record failure at the start of low-temperature writing. As a result, the magnetic head may contact the perpendicular magnetic recording medium, thereby possibly causing a HDI (Head Disk Interface) problem, such as contamination or wearing of the magnetic head, or a head and medium crash. According to the present embodiment, this problem can also be overcome such that the failure rate can be halved.

Further, according to the present embodiment, when the magnetic recording apparatus starts a reproduction operation from a low temperature pause state or a non-operation state, the timing $t_{RG}$ of the recording information reproduction gate-on (apart from servo information) is adjusted in a sequence similar to the sequence described above. However, at the time of reproduction, $I_{STO}$ may be zero or a very small amount applied in the opposite direction. This is because the amount of heat generated by STO energization is extremely small compared with the amount of heat from the recording magnetic pole at the time of recording. When the apparatus is in rotation standby because of failure to perform recording and reproduction at the predetermined timing, the average wait time may be as much as 6.7 ms at 4500 rpm (revolutions per minute), 5.6 ms at 5400 rpm, 4.2 ms at 7200 rpm, 3 ms at 10000 rpm, or 2 ms at 15000 rpm. According to the present embodiment, a stable operation of the apparatus can be performed without excessive degradation in performance by delaying the write gate until steady state is reached.

While the foregoing examples are related to the countermeasures for low-temperature situations which are more problematic, normal- or high-temperature situations, which may not be as problematic, may be addressed similarly. Preferably, the present adjusting method may be combined with the adjusting method according to the eighth or ninth embodiment, whereby overall robustness with respect to various types of environment changes can be improved, and the degree of freedom in apparatus design can be significantly increased. While the foregoing embodiments are related to magnetic disk drives (HDD), obviously an embodiment may be applied to other magnetic recording apparatuses, such as a magnetic tape apparatus.

The foregoing detailed description has been presented for the purposes of illustration and description. Many modifications and variations are possible in light of the above teaching. It is not intended to be exhaustive or to limit the subject matter described herein to the precise form disclosed. For example, part of the configuration of one embodiment may be substituted by the configuration of another embodiment, or the configuration of one embodiment may be incorporated into the configuration of another embodiment. Further, with respect to part of the configuration of each embodiment, addition, deletion, or substitution may be made on the basis of another configuration.

REFERENCE SIGNS LIST

01: Clearance between magnetic head and perpendicular magnetic recording medium
02: Thermal expansion element unit (TFC)
10: Reproduction head unit
11: Magnetic shield layer
12: Sensor element
13: Upper magnetic shield
14: Lower magnetic shield
20: Recording head unit (Ring type magnetic core unit)
21: Recording field
22: First recording magnetic pole
23: Coil
24: Second recording magnetic pole
25: Recording gap portion
26: STO oscillation control magnetic field
27: Rear-end portion of recording magnetic pole (ring-type magnetic core)
30: Perpendicular magnetic recording medium
31: Lubricant layer
32: Overcoat layer
33: Second magnetic layer
34: First magnetic layer
35: Soft magnetic underlayer
36: Non-magnetic substrate
37: Upward magnetization
38: Downward magnetization
39: High frequency magnetic field from STO at uppermost surface position on magnetic layer of medium
40: High-frequency oscillator unit (STO)
41: High frequency magnetic field generation layer (FGL)
42: Intermediate layer
43: Spin injection layer
44: DC power supply for driving STO
45: High frequency magnetic field (microwave)
46a, 46b: Magnetization of spin injection layer
47a, 47b: Magnetization of FGL
48a, 48b: Rotation direction of magnetization of FGL
49: STO drive current
50: Slider
51: Head protection film
52: Air bearing surface (ABS) of magnetic recording and reproducing head
60: Conductive electrode for supplying current to STO
91: Opposite-direction effective recording field from recording magnetic pole
92: Opposite-direction effective assist magnetic field from FGL
93: Recording-direction effective recording field from recording magnetic pole (0.12 AT)
94: Recording direction effective assist magnetic field from FGL 95: Switching field of perpendicular magnetic recording medium
100: Direction of travel of magnetic head
101: Clearance
102: Thermal expansion element unit (TFC)
110: Reproduction head unit
111: Magnetic shield layer
112: Sensor element
113: Upper magnetic shield
114: Lower magnetic shield
120: Recording head unit
121: Recording field
122: Main magnetic pole
123: Coil
124: Magnetic shield
125: Recording gap portion
126: STO oscillation control magnetic field
130: Perpendicular magnetic recording medium
131: Lubricant layer
132: Overcoat layer
133: Cap layer
134: High $H_k$ magnetic layer
135: Soft magnetic underlayer
136: Non-magnetic substrate
137: Upward magnetization
138: Downward magnetization
140: High-frequency oscillator unit (STO)
141: High frequency magnetic field generation layer (FGL)
142: Intermediate layer
143: Spin injection pinned layer
144: STO drive DC power supply
145: High frequency magnetic field
150: Slider
151: Head protection film
152: Air bearing surface (ABS)
160: Magnetization
161: Underlayer
162: First FGL
163: Coupling layer
164: Second FGL
165: Non-magnetic intermediate layer
166: Spin injection layer
167: Cap layer
168: Magnetization
171: Underlayer
172: FGL
173: Non-magnetic intermediate layer
174: Spin injection layer
175: Cap layer
176: Magnetization
177: Magnetization
180: Perpendicular magnetic recording medium
182: Foot print
183: Foot print
241, 242, 243: Suspension wiring
500: Spindle motor
501: Perpendicular magnetic recording medium
502: Arm
503: Slider mounting magnetic recording and reproduction element
504: High-rigidity suspension
505: HGA
506: High-rigidity actuator
507: Drive signal wiring (FPC)
508: Magnetic head drive control apparatus (R/W-IC)
509: Signal processing circuit (R/W channel)
510: Microprocessor (MPU)
511: Disk controller (HDC)
512: Control board
513: Encoded signal
514: Register
515: Bus
516: Buffer memory control unit
517: Host interface control unit
518: Memory unit
519: Nonvolatile memory unit
520: Drive unit
521: Buffer memory
522: Voice coil motor
600: Recording field analysis position
601: Effective recording field for finalizing recording magnetization state
602: Maximum value of effective recording field during recording

What is claimed is:

1. A microwave assisted magnetic recording head comprising:
a recording magnetic pole unit configured to produce a recording field for writing to a perpendicular magnetic recording medium; and
a high-frequency magnetic field oscillator configured to produce a high-frequency magnetic field,
wherein:
the recording magnetic pole unit includes a longitudinal recording magnetic core with a write gap in which a longitudinal magnetic recording field component is produced as a main magnetic recording field component substantially perpendicular to a surface of the magnetic recording medium;
the magnetic core is configured such that an oscillation control magnetic field is applied in the write gap substantially perpendicular to the high-frequency magnetic field oscillator and substantially parallel to the surface of the magnetic recording medium; and
the high-frequency magnetic field oscillator is disposed in the write gap.

2. The microwave assisted magnetic recording head according to claim 1, wherein a magnetization reversal region of a perpendicular magnetic recording medium statically recorded by magnetizing the magnetic core with a write current has a shape corresponding to the shape of the write gap.

3. The microwave assisted magnetic recording head according to claim 1, wherein the magnetic core includes a trailing side recording magnetic pole with a track width of 40 nm to 250 nm, a gap depth of 40 nm to 700 nm, and a write gap length of 20 nm to 200 nm.

4. The microwave assisted magnetic recording head according to claim 1, wherein the magnetic core has a yoke length of not less than 0.5 µm and not more than 4 µm.

5. The microwave assisted magnetic recording head according to claim 1, wherein the high-frequency magnetic field oscillator includes:
a formed member including two high-frequency magnetic field oscillation layers layered via a coupling layer of a non-magnetic material;
an intermediate layer; and
a spin injection layer,
wherein an electric current is caused to flow from the spin injection layer side toward the formed member side via the intermediate layer.

6. The microwave assisted magnetic recording head according to claim 5, wherein the coupling layer has a film thickness of not less than 0.1 nm and not more than 0.7 nm, not less than 1.2 nm and not more than 1.6 nm, or not less than 2.7 nm and not more than 3.2 nm.

7. The microwave assisted magnetic recording head according to claim 1, wherein:
the high-frequency magnetic field oscillator includes a high-frequency magnetic field oscillation layer of a magnetic film with a magnetic easy axis in a longitudinal direction, a non-magnetic intermediate layer, and a spin injection layer;
the spin injection layer includes a magnetic film configured to have a magnetization orientated effectively in a film surface longitudinal direction, and is layered with the high-frequency magnetic field oscillation layer via the non-magnetic intermediate layer such that the magnetization is antiferromagnetically coupled with magnetization of the high-frequency magnetic field oscillation layer; and
the magnetization of the high-frequency magnetic field oscillation layer and the magnetization of the spin injection layer are rotated at high speed while an antiparallel state is maintained when an electric current flows from the high-frequency magnetic field oscillation layer side toward the spin injection layer side.

8. The microwave assisted magnetic recording head according to claim 1, wherein the high-frequency magnetic field oscillator has a width of 3 nm to 100 nm.

9. A magnetic recording apparatus comprising:
a microwave assisted magnetic recording head including a recording magnetic pole including a longitudinal recording magnetic core with a write gap in which a longitudinal magnetic recording field component is produced as a main magnetic recording field component substantially perpendicular to a surface of the magnetic recording medium, the magnetic core is configured such that an oscillation control magnetic field is applied in the write gap substantially perpendicular to the high-frequency magnetic field oscillator and substantially parallel to the surface of the magnetic recording medium, a high-frequency magnetic field oscillator disposed in the write gap, a magnetic reproduction element configured to read information from a perpendicular magnetic recording medium, and a thermal flying height controller (TFC) element configured to adjust a clearance between the high-frequency magnetic field oscillator and the perpendicular magnetic recording medium;
a unit configured to control or process a recording operation by the recording magnetic pole and the high-frequency magnetic field oscillator, and a reproduction operation by the magnetic reproduction element; and
a TFC control unit configured to control an operation of the TFC element.

10. The magnetic recording apparatus according to claim 9, wherein:
at least at the time of the recording operation, a write current smaller than a lower limit value enabling the perpendicular magnetic recording medium to be recorded is supplied to the magnetic core; and
at least during a manufacturing process, the values of the write current, the high-frequency oscillator drive current, and power supplied to the TFC element are adjusted to be values such that the recording/reproduction characteristics in a predetermined region of the magnetic recording apparatus are optimized.

11. The magnetic recording apparatus according to claim 9, comprising a
temperature sensor and/or an atmospheric pressure sensor in the apparatus,
wherein, when the environment of the magnetic recording apparatus is changed, the values of a write current supplied to the magnetic core, a drive current for the high-frequency oscillator, and an input power to the TFC element are readjusted.

12. The magnetic recording apparatus according to claim 9, wherein, when recording or reproduction is started in response to a recording or reproduction instruction from a pause state in which no recording or reproduction instruction is received from a higher-level system for a predetermined time:
predetermined energization of the magnetic core is started in advance under a predetermined condition;
the high-frequency magnetic field oscillator is operated in accordance with the input of a write gate indicating information recording after a predetermined delay time; and
a recording operation is started by operating the magnetic core.

13. The magnetic recording apparatus according to claim 9, wherein, when a characteristics degradation due to a clearance change by a rapid atmospheric pressure change or contamination is confirmed, a write current supplied to the magnetic core, a drive current for the high-frequency magnetic field oscillator, and input power to the TFC element are changed in accordance with the amount of clearance change predicted on the basis of an output change and the like, until the clearance returns to an initial value.

14. The magnetic recording apparatus according to claim 9, wherein, when a characteristics degradation due to a rapid temperature change is confirmed, a write current supplied to the magnetic core and a drive current for the high-frequency magnetic field oscillator are adjusted in such a manner as to compensate for a characteristics change predicted on the basis of the temperature change, and
the write current supplied to the magnetic core and the drive current for the high-frequency magnetic field oscillator are shifted to a setting value corresponding to an ambient temperature by a predetermined method until the characteristics are stabilized.

15. The magnetic recording apparatus according to claim 12, further comprising:
a recording magnetic pole unit configured to produce a recording field for writing to a perpendicular magnetic recording medium;
the high-frequency magnetic field oscillator is configured to produce a high-frequency magnetic field,
wherein:
the recording magnetic pole unit includes a magnetic core with a write gap portion at which a main recording field component is concentrated; and
the high-frequency magnetic field oscillator is disposed in the write gap, and
wherein:
a magnetization reversal region of a perpendicular magnetic recording medium statically recorded by magnetizing the magnetic core with a write current has a shape corresponding to the shape of the write gap.

16. The magnetic recording apparatus according to claim 9, comprising a magnetic head drive control apparatus that includes:
a recording signal supply unit configured to supply a recording signal to the recording magnetic pole;
a drive control unit configured to supply a drive signal to the high-frequency magnetic field oscillator; and
a unit configured to supply a preliminary operation current to a ring-type magnetic core in accordance with a direct instruction from a microprocessor (MPU), and configured to cause the recording signal and the high-frequency oscillator drive signal to be supplied a predetermined time later as needed in accordance with the timing of a write gate outputted from a disc controller (HDC).

17. A recording/reproducing head drive control apparatus comprising:
   a recording signal supply unit configured to supply a recording signal to a recording magnetic pole;
   a drive control unit configured to supply a drive signal to a high-frequency magnetic field oscillator; and
   a unit configured to supply a preliminary operation current to a ring-type magnetic core in accordance with a direct instruction from a microprocessor (MPU), and configured to cause the recording signal and the high-frequency oscillator drive signal to be supplied a predetermined time later as needed in accordance with the timing of a write gate outputted from a disk controller (HDC);
   wherein the recording magnetic pole includes a longitudinal recording magnetic core with a write gap in which a longitudinal magnetic recording field component is produced as a main magnetic recording field component substantially perpendicular to a surface of the magnetic recording medium; and
   wherein the magnetic core is configured such that an oscillation control magnetic field is applied in the write gap substantially perpendicular to the high-frequency magnetic field oscillator and substantially parallel to the surface of the magnetic recording medium.

18. The magnetic head drive control apparatus according to claim 17, comprising a register configured to retain the value of power supplied to a thermal flying height controller (TFC) element for adjusting a clearance between the high-frequency magnetic field oscillator and a perpendicular magnetic recording medium, the value of the high-frequency magnetic field oscillator drive signal, the value of the preliminary operation current, the value of the recording signal, and an operation timing value thereof.

* * * * *